United States Patent
Sobotka et al.

(10) Patent No.: US 12,478,806 B2
(45) Date of Patent: *Nov. 25, 2025

(54) CATHETER-BASED DEVICES AND ASSOCIATED METHODS FOR IMMUNE SYSTEM NEUROMODULATION

(71) Applicant: Medtronic Ireland Manufacturing Unlimited Company, Dublin (IE)

(72) Inventors: Paul Sobotka, West St. Paul, MN (US); Neil Barman, Menlo Park, CA (US)

(73) Assignee: Medtronic Ireland Manufacturing Unlimited Company, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,248

(22) Filed: May 4, 2023

(65) Prior Publication Data
US 2023/0302301 A1 Sep. 28, 2023

Related U.S. Application Data

(63) Continuation of application No. 17/018,625, filed on Sep. 11, 2020, now Pat. No. 11,673,006, which is a
(Continued)

(51) Int. Cl.
*A61N 7/00* (2006.01)
*A61B 17/32* (2006.01)
(Continued)

(52) U.S. Cl.
CPC ........ *A61N 7/00* (2013.01); *A61B 17/320068* (2013.01); *A61B 18/02* (2013.01);
(Continued)

(58) Field of Classification Search
CPC .......... A61N 7/00; A61N 1/0551; A61N 1/40; A61N 5/045; A61N 5/0601; A61N 5/0622;
(Continued)

(56) References Cited

U.S. PATENT DOCUMENTS

| | | | |
|---|---|---|---|
| 4,033,331 A | 7/1977 | Guss et al. | |
| 5,295,038 A | 3/1994 | Matsushita et al. | |

(Continued)

FOREIGN PATENT DOCUMENTS

| | | |
|---|---|---|
| CN | 1817382 | 8/2006 |
| EP | 0643601 B1 | 8/2001 |

(Continued)

OTHER PUBLICATIONS

Abdel-Misih et al., "Liver Anatomy", Surgical Clinics of North America, vol. 90, No. 4, Elsevier Inc, May 30, 2014, pp. 643-653.
(Continued)

*Primary Examiner* — James M Kish
*Assistant Examiner* — Natasha Patel
(74) *Attorney, Agent, or Firm* — Shumaker & Sieffert, P.A.

(57) ABSTRACT

Catheter-based devices and associated methods for immune system neuromodulation of human patients are disclosed herein. One aspect of the present technology is directed to methods of treating a human patient diagnosed with an immune system condition. The methods can include intravascularly positioning a neuromodulation catheter within a blood vessel proximate to neural fibers innervating an immune system organ of the patient. The method also includes reducing sympathetic neural activity in the patient by delivering energy to the neural fibers innervating the immune system organ via the neuromodulation catheter. Reducing sympathetic neural activity improves a measurable physiological parameter corresponding to the immune system condition of the patient.

19 Claims, 4 Drawing Sheets

Related U.S. Application Data continuation of application No. 15/788,161, filed on Oct. 19, 2017, now abandoned, which is a continuation of application No. 15/372,305, filed on Dec. 7, 2016, now abandoned, which is a continuation of application No. 14/379,886, filed as application No. PCT/US2013/029685 on Mar. 7, 2013, now abandoned.

(60) Provisional application No. 61/608,422, filed on Mar. 8, 2012.

(51) Int. Cl.
| | |
|---|---|
| *A61B 18/02* | (2006.01) |
| *A61B 18/14* | (2006.01) |
| *A61B 18/18* | (2006.01) |
| *A61B 18/20* | (2006.01) |
| *A61N 1/05* | (2006.01) |
| *A61N 1/40* | (2006.01) |
| *A61N 5/04* | (2006.01) |
| *A61N 5/06* | (2006.01) |
| *A61N 7/02* | (2006.01) |
| *A61B 18/00* | (2006.01) |
| *A61N 1/20* | (2006.01) |
| *A61N 1/36* | (2006.01) |

(52) U.S. Cl.
CPC .......... *A61B 18/14* (2013.01); *A61B 18/1492* (2013.01); *A61B 18/1815* (2013.01); *A61B 18/20* (2013.01); *A61N 1/0551* (2013.01); *A61N 1/40* (2013.01); *A61N 5/045* (2013.01); *A61N 5/0601* (2013.01); *A61N 5/0622* (2013.01); *A61N 7/02* (2013.01); *A61B 2018/0016* (2013.01); *A61B 2018/00214* (2013.01); *A61B 2018/00404* (2013.01); *A61B 2018/00434* (2013.01); *A61B 2018/00577* (2013.01); *A61B 2018/00642* (2013.01); *A61B 2018/0212* (2013.01); *A61B 2018/1861* (2013.01); *A61N 1/205* (2013.01); *A61N 1/36017* (2013.01); *A61N 2005/0612* (2013.01); *A61N 2007/0017* (2013.01); *A61N 2007/0021* (2013.01); *A61N 2007/003* (2013.01); *A61N 2007/0043* (2013.01)

(58) Field of Classification Search
CPC ...... A61N 7/02; A61N 1/205; A61N 1/36017; A61N 2005/0612; A61N 2007/0017; A61N 2007/0021; A61N 2007/003; A61N 2007/0043; A61B 17/320068; A61B 18/02; A61B 18/14; A61B 18/1492; A61B 18/1815; A61B 18/20; A61B 2018/0016; A61B 2018/00214; A61B 2018/00404; A61B 2018/00434; A61B 2018/00577; A61B 2018/00642; A61B 2018/0212; A61B 2018/1861

See application file for complete search history.

(56) References Cited

U.S. PATENT DOCUMENTS

| | | |
|---|---|---|
| 5,447,497 A | 9/1995 | Sogard et al. |
| 5,561,165 A | 10/1996 | Lautt et al. |
| 5,680,860 A | 10/1997 | Imran |
| 5,683,366 A | 11/1997 | Eggers et al. |
| 5,707,400 A | 1/1998 | Terry, Jr. et al. |
| 5,893,885 A | 4/1999 | Webster et al. |
| 6,012,457 A | 1/2000 | Lesh |
| 6,113,593 A | 9/2000 | Tu et al. |
| 6,142,994 A | 11/2000 | Swanson et al. |
| 6,161,049 A | 12/2000 | Rudie et al. |
| 6,178,354 B1 | 1/2001 | Gibson |
| 6,183,468 B1 | 2/2001 | Swanson et al. |
| 6,235,022 B1 | 5/2001 | Hallock et al. |
| 6,283,959 B1 | 9/2001 | Lalonde et al. |
| 6,290,697 B1 | 9/2001 | Tu et al. |
| 6,292,695 B1 | 9/2001 | Webster, Jr. et al. |
| 6,381,499 B1 | 4/2002 | Taylor et al. |
| 6,425,877 B1 | 7/2002 | Edwards |
| 6,428,537 B1 | 8/2002 | Swanson et al. |
| 6,451,011 B2 | 9/2002 | Tu et al. |
| 6,491,710 B2 | 12/2002 | Satake |
| 6,494,880 B1 | 12/2002 | Swanson et al. |
| 6,496,737 B2 | 12/2002 | Rudie et al. |
| 6,511,478 B1 | 1/2003 | Burnside et al. |
| 6,542,781 B1 | 4/2003 | Koblish et al. |
| 6,551,274 B2 | 4/2003 | Heiner |
| 6,564,096 B2 | 5/2003 | Mest |
| 6,575,932 B1 | 6/2003 | O'Brien et al. |
| 6,582,423 B1 | 6/2003 | Thapliyal et al. |
| 6,585,638 B1 | 7/2003 | Yamamoto |
| 6,589,238 B2 | 7/2003 | Edwards et al. |
| 6,605,084 B2 | 8/2003 | Acker et al. |
| 6,623,504 B2 | 9/2003 | Vrba et al. |
| 6,623,736 B2 | 9/2003 | Tobinick |
| 6,626,855 B1 | 9/2003 | Weng et al. |
| 6,635,054 B2 | 10/2003 | Fjield et al. |
| 6,638,278 B2 | 10/2003 | Falwell et al. |
| 6,648,879 B2 | 11/2003 | Lafontaine |
| 6,666,858 B2 | 12/2003 | Joye et al. |
| 6,666,862 B2 | 12/2003 | Jain et al. |
| 6,669,655 B1 | 12/2003 | Acker et al. |
| 6,676,675 B2 | 1/2004 | Mallapragada et al. |
| 6,690,971 B2 | 2/2004 | Schauerte et al. |
| 6,699,242 B2 | 3/2004 | Heggeness |
| 6,719,694 B2 | 4/2004 | Weng et al. |
| 6,728,563 B2 | 4/2004 | Rashidi |
| 6,730,078 B2 | 5/2004 | Simpson et al. |
| 6,745,080 B2 | 6/2004 | Koblish |
| 6,796,979 B2 | 9/2004 | Lentz |
| 6,832,114 B1 | 12/2004 | Whitehurst |
| 6,837,885 B2 | 1/2005 | Koblish et al. |
| 6,845,267 B2 | 1/2005 | Harrison et al. |
| 6,878,273 B2 | 4/2005 | Kawaguchi |
| 6,885,888 B2 | 4/2005 | Rezai |
| 6,887,236 B2 | 5/2005 | Gilboa |
| 6,893,433 B2 | 5/2005 | Lentz |
| 6,926,669 B1 | 8/2005 | Stewart et al. |
| 6,936,047 B2 | 8/2005 | Nasab et al. |
| 6,937,896 B1 | 8/2005 | Kroll |
| 6,952,615 B2 | 10/2005 | Satake |
| 6,955,675 B2 | 10/2005 | Jain |
| 6,972,015 B2 | 12/2005 | Joye et al. |
| 6,972,016 B2 | 12/2005 | Hill, III et al. |
| 6,978,174 B2 | 12/2005 | Gelfand et al. |
| 7,004,961 B2 | 2/2006 | Wong et al. |
| 7,013,170 B2 | 3/2006 | Bowe |
| 7,037,269 B2 | 5/2006 | Nix et al. |
| 7,048,716 B1 | 5/2006 | Kucharczyk et al. |
| 7,054,689 B1 | 5/2006 | Whitehurst et al. |
| 7,058,447 B2 | 6/2006 | Hill et al. |
| 7,063,666 B2 | 6/2006 | Weng et al. |
| 7,083,614 B2 | 8/2006 | Fjield et al. |
| 7,089,063 B2 | 8/2006 | Lesh et al. |
| 7,101,368 B2 | 9/2006 | Lafontaine |
| 7,112,198 B2 | 9/2006 | Satake |
| 7,144,407 B1 | 12/2006 | Lasersohn |
| 7,149,574 B2 | 12/2006 | Yun et al. |
| 7,150,745 B2 | 12/2006 | Stern et al. |
| 7,155,278 B2 | 12/2006 | King et al. |
| 7,155,284 B1 | 12/2006 | Whitehurst et al. |
| 7,160,292 B2 | 1/2007 | Moorman et al. |
| 7,162,303 B2 | 1/2007 | Levin et al. |
| 7,184,828 B2 | 2/2007 | Hill et al. |
| 7,195,625 B2 | 3/2007 | Lentz |
| 7,195,629 B2 | 3/2007 | Behl et al. |
| 7,220,257 B1 | 5/2007 | Lafontaine |
| 7,277,757 B2 | 10/2007 | Casavant et al. |

(56) References Cited

U.S. PATENT DOCUMENTS

| | | |
|---|---|---|
| 7,288,089 B2 | 10/2007 | Yon et al. |
| 7,309,310 B2 | 12/2007 | Milbocker |
| 7,322,973 B2 | 1/2008 | Nahon |
| 7,326,201 B2 | 2/2008 | Fjield et al. |
| 7,327,951 B2 | 2/2008 | Chaput |
| 7,340,306 B2 | 3/2008 | Barrett et al. |
| 7,363,076 B2 | 4/2008 | Yun et al. |
| 7,371,231 B2 | 5/2008 | Rioux et al. |
| 7,373,204 B2 | 5/2008 | Gelfand et al. |
| 7,387,628 B1 | 6/2008 | Behl et al. |
| 7,416,549 B2 | 8/2008 | Young et al. |
| 7,419,487 B2 | 9/2008 | Johnson et al. |
| 7,470,241 B2 | 12/2008 | Weng et al. |
| 7,477,944 B1 | 1/2009 | Whitehurst et al. |
| 7,477,945 B2 | 1/2009 | Rezai et al. |
| 7,494,661 B2 | 2/2009 | Sanders |
| 7,510,536 B2 | 3/2009 | Foley et al. |
| 7,517,349 B2 | 4/2009 | Truckai et al. |
| 7,524,318 B2 | 4/2009 | Young et al. |
| 7,529,582 B1 | 5/2009 | DiLorenzo |
| 7,540,846 B2 | 6/2009 | Harhen et al. |
| 7,556,628 B2 | 7/2009 | Utley et al. |
| 7,591,816 B2 | 9/2009 | Wang et al. |
| 7,599,736 B2 | 10/2009 | DiLorenzo |
| 7,599,737 B2 | 10/2009 | Yomtov et al. |
| 7,617,005 B2 | 11/2009 | Demarais et al. |
| 7,620,451 B2 | 11/2009 | Demarais et al. |
| 7,620,454 B2 | 11/2009 | Dinsmoor et al. |
| 7,630,760 B2 | 12/2009 | Libbus |
| 7,647,115 B2 | 1/2010 | Levin et al. |
| 7,653,438 B2 | 1/2010 | Deem et al. |
| 7,653,440 B1 | 1/2010 | Bornzin et al. |
| 7,655,006 B2 | 2/2010 | Sauvageau et al. |
| 7,660,631 B2 | 2/2010 | Whitehurst et al. |
| 7,670,337 B2 | 3/2010 | Young |
| 7,689,276 B2 | 3/2010 | Dobak |
| 7,689,277 B2 | 3/2010 | Dobak, III |
| 7,702,386 B2 | 4/2010 | Dobak et al. |
| 7,706,875 B2 | 4/2010 | Buras et al. |
| 7,717,948 B2 | 5/2010 | Demarais et al. |
| 7,727,228 B2 | 6/2010 | Abboud et al. |
| 7,738,952 B2 | 6/2010 | Yun et al. |
| 7,756,583 B2 | 7/2010 | Demarais et al. |
| 7,758,623 B2 | 7/2010 | Dzeng et al. |
| 7,765,007 B2 | 7/2010 | Martino et al. |
| 7,769,442 B2 | 8/2010 | Shafer |
| 7,769,469 B2 | 8/2010 | Carr et al. |
| 7,769,470 B1 | 8/2010 | Rezai et al. |
| 7,778,704 B2 | 8/2010 | Rezai |
| 7,797,050 B2 | 9/2010 | Libbus et al. |
| 7,819,826 B2 | 10/2010 | Diederich et al. |
| 7,819,870 B2 | 10/2010 | Thao et al. |
| 7,831,308 B2 | 11/2010 | Rezai et al. |
| 7,837,676 B2 | 11/2010 | Sinelnikov et al. |
| 7,850,685 B2 | 12/2010 | Kunis et al. |
| 7,853,333 B2 | 12/2010 | Demarais |
| 7,856,273 B2 | 12/2010 | Maschino et al. |
| 7,862,563 B1 | 1/2011 | Cosman et al. |
| 7,865,237 B2 | 1/2011 | Machado et al. |
| 7,873,417 B2 | 1/2011 | Demarais et al. |
| 7,877,146 B2 | 1/2011 | Rezai |
| 7,881,784 B2 | 2/2011 | Pasricha et al. |
| 7,904,175 B2 | 3/2011 | Scott et al. |
| 7,917,230 B2 | 3/2011 | Bly |
| 7,925,351 B2 | 4/2011 | Khawaled et al. |
| 7,931,647 B2 | 4/2011 | Wizeman |
| 7,937,143 B2 | 5/2011 | Demarais et al. |
| 7,937,144 B2 | 5/2011 | Dobak |
| 7,937,145 B2 | 5/2011 | Dobak |
| 7,938,828 B2 | 5/2011 | Koblish |
| 7,963,287 B2 | 6/2011 | Lanphere et al. |
| 7,991,474 B2 | 8/2011 | Aldrich et al. |
| 8,000,764 B2 | 8/2011 | Rashidi |
| 8,010,199 B2 | 8/2011 | Sunagawa et al. |
| 8,021,361 B2 | 9/2011 | Paul et al. |
| 8,021,384 B2 | 9/2011 | Weiss et al. |
| 8,042,251 B2 | 10/2011 | Asmus et al. |
| 8,043,289 B2 | 10/2011 | Behl et al. |
| 8,043,351 B2 | 10/2011 | Yon et al. |
| RE42,961 E | 11/2011 | Rahme |
| 8,052,672 B2 | 11/2011 | Laufer et al. |
| 8,060,209 B2 | 11/2011 | Jaax et al. |
| 8,066,702 B2 | 11/2011 | Rittman, III et al. |
| 8,075,498 B2 | 12/2011 | Leo et al. |
| 8,095,218 B2 | 1/2012 | Gross et al. |
| 8,116,883 B2 | 2/2012 | Williams et al. |
| 8,123,741 B2 | 2/2012 | Marrouche et al. |
| 8,123,742 B2 | 2/2012 | Berger |
| 8,123,789 B2 | 2/2012 | Khanna |
| 8,128,617 B2 | 3/2012 | Bencini et al. |
| 8,131,362 B2 | 3/2012 | Moffitt et al. |
| 8,131,371 B2 | 3/2012 | Demarais et al. |
| 8,131,372 B2 | 3/2012 | Levin et al. |
| 8,137,342 B2 | 3/2012 | Crossman |
| 8,140,170 B2 | 3/2012 | Rezai et al. |
| 8,145,299 B2 | 3/2012 | Dobak, III |
| 8,145,316 B2 | 3/2012 | Deem et al. |
| 8,145,317 B2 | 3/2012 | Demarais et al. |
| 8,150,518 B2 | 4/2012 | Levin et al. |
| 8,150,519 B2 | 4/2012 | Demarais et al. |
| 8,150,520 B2 | 4/2012 | Demarais et al. |
| 8,155,744 B2 | 4/2012 | Rezai |
| 8,160,690 B2 | 4/2012 | Wilfley et al. |
| 8,162,935 B2 | 4/2012 | Paul et al. |
| 8,172,693 B1 | 5/2012 | Guerzini et al. |
| 8,175,711 B2 | 5/2012 | Demarais et al. |
| 8,182,433 B2 | 5/2012 | Leo et al. |
| 8,197,409 B2 | 6/2012 | Foley et al. |
| 8,207,138 B2 | 6/2012 | Thakker et al. |
| 8,211,017 B2 | 7/2012 | Foley et al. |
| 8,211,102 B2 | 7/2012 | Paul et al. |
| 8,216,228 B2 | 7/2012 | Mateos et al. |
| 8,216,231 B2 | 7/2012 | Behl et al. |
| 8,219,189 B2 | 7/2012 | Knoblich |
| 8,224,416 B2 | 7/2012 | De la Rama et al. |
| 8,226,602 B2 | 7/2012 | Quijana et al. |
| 8,226,648 B2 | 7/2012 | Paul et al. |
| 8,229,564 B2 | 7/2012 | Rezai |
| 8,257,413 B2 | 9/2012 | Danek et al. |
| 8,265,745 B2 | 9/2012 | Hauck et al. |
| 8,267,926 B2 | 9/2012 | Paul et al. |
| 8,277,398 B2 | 10/2012 | Weng et al. |
| 8,285,374 B2 | 10/2012 | Hamdan |
| 8,295,902 B2 | 10/2012 | Salahieh et al. |
| 8,295,912 B2 | 10/2012 | Gertner |
| 8,295,926 B2 | 10/2012 | Dobak |
| 8,313,482 B2 | 11/2012 | McIntyre et al. |
| 8,317,783 B2 | 11/2012 | Cao et al. |
| 8,321,030 B2 | 11/2012 | Maniak et al. |
| 8,323,274 B2 | 12/2012 | Jakus |
| 8,326,428 B2 | 12/2012 | Wenzel et al. |
| 8,337,492 B2 | 12/2012 | Kunis et al. |
| 8,340,772 B2 | 12/2012 | Vase et al. |
| 8,343,031 B2 | 1/2013 | Gertner |
| 8,348,884 B2 | 1/2013 | Hildebrand et al. |
| 8,352,029 B2 | 1/2013 | Ternes et al. |
| 8,364,237 B2 | 1/2013 | Stone et al. |
| 8,364,285 B2 | 1/2013 | Rezai |
| 8,369,943 B2 | 2/2013 | Shuros et al. |
| 8,372,009 B2 | 2/2013 | Emery et al. |
| 8,374,674 B2 | 2/2013 | Gertner |
| 8,386,053 B2 | 2/2013 | Kornet |
| 8,391,970 B2 | 3/2013 | Tracey et al. |
| 8,401,641 B2 | 3/2013 | Peters et al. |
| 8,401,667 B2 | 3/2013 | Gustus et al. |
| 8,403,925 B2 | 3/2013 | Miller et al. |
| 8,406,866 B2 | 3/2013 | Deno et al. |
| 8,409,195 B2 | 4/2013 | Young |
| 8,410,140 B2 | 4/2013 | Brummett |
| 8,412,350 B2 | 4/2013 | Bly |
| 8,414,508 B2 | 4/2013 | Thapliyal et al. |
| 8,417,331 B2 | 4/2013 | Pasricha et al. |
| 8,417,354 B2 | 4/2013 | Zhang et al. |
| 8,435,232 B2 | 5/2013 | Aeby et al. |

(56) References Cited

U.S. PATENT DOCUMENTS

| | | |
|---|---|---|
| 8,439,909 B2 | 5/2013 | Wang et al. |
| 8,444,640 B2 | 5/2013 | Demarais et al. |
| 8,447,394 B2 | 5/2013 | Libbus et al. |
| 8,449,535 B2 | 5/2013 | Deno et al. |
| 8,454,594 B2 | 6/2013 | Demarais et al. |
| 8,463,376 B2 | 6/2013 | Curtis |
| 8,465,486 B2 | 6/2013 | Danek et al. |
| 8,469,904 B2 | 6/2013 | Gertner |
| 8,475,449 B2 | 7/2013 | Werneth et al. |
| 8,483,830 B2 | 7/2013 | Tweden et al. |
| 8,489,184 B2 | 7/2013 | Wilfley et al. |
| 8,492,442 B2 | 7/2013 | Beppu et al. |
| 8,504,132 B2 | 8/2013 | Friedman et al. |
| 8,504,147 B2 | 8/2013 | Deem et al. |
| 8,504,161 B1 | 8/2013 | Kornet et al. |
| 8,512,262 B2 | 8/2013 | Gertner |
| 8,512,335 B2 | 8/2013 | Cheng et al. |
| 8,517,962 B2 | 8/2013 | Gertner et al. |
| 8,521,291 B1 | 8/2013 | Cholette et al. |
| 8,536,667 B2 | 9/2013 | De Graff et al. |
| 8,556,834 B2 | 10/2013 | Gertner |
| 8,560,072 B2 | 10/2013 | Caparso et al. |
| 8,568,399 B2 | 10/2013 | Azamian et al. |
| 8,577,447 B2 | 11/2013 | Tegg et al. |
| 8,579,891 B2 | 11/2013 | Coe et al. |
| 8,583,229 B2 | 11/2013 | Rezai et al. |
| 8,585,696 B2 | 11/2013 | Young |
| 8,588,886 B2 | 11/2013 | De la Rama et al. |
| 8,609,082 B2 | 12/2013 | Ben-David et al. |
| 8,612,022 B1 | 12/2013 | Morero et al. |
| 8,617,156 B2 | 12/2013 | Werneth et al. |
| 8,622,937 B2 | 1/2014 | Weng et al. |
| 8,634,930 B2 | 1/2014 | Dalal et al. |
| 8,641,704 B2 | 2/2014 | Werneth et al. |
| 8,641,705 B2 | 2/2014 | Leo et al. |
| 8,641,711 B2 | 2/2014 | Kelly et al. |
| 8,652,129 B2 | 2/2014 | Wu et al. |
| 8,672,930 B2 | 3/2014 | Wittenberger |
| 8,672,936 B2 | 3/2014 | Thao et al. |
| 8,676,309 B2 | 3/2014 | Deem et al. |
| 8,676,322 B2 | 3/2014 | Whitehurst et al. |
| 8,679,109 B2 | 3/2014 | Paul |
| 8,700,161 B2 | 4/2014 | Harel et al. |
| 8,702,619 B2 | 4/2014 | Wang |
| 8,712,550 B2 | 4/2014 | Grunewald |
| 8,715,209 B2 | 5/2014 | Gertner |
| 8,718,764 B2 | 5/2014 | Stahmann |
| 8,721,637 B2 | 5/2014 | Zarins et al. |
| 8,728,068 B2 | 5/2014 | Nye et al. |
| 8,728,069 B2 | 5/2014 | Azamian et al. |
| 8,728,070 B2 | 5/2014 | Azamian et al. |
| 8,728,075 B2 | 5/2014 | Wu et al. |
| 8,728,077 B2 | 5/2014 | Kunis et al. |
| 8,731,677 B2 | 5/2014 | Pastore et al. |
| 8,738,127 B1 | 5/2014 | Lebovitz et al. |
| 8,740,896 B2 | 6/2014 | Zarins et al. |
| 8,755,907 B2 | 6/2014 | Kieval et al. |
| 8,758,334 B2 | 6/2014 | Coe et al. |
| 8,764,742 B2 | 7/2014 | Pappone et al. |
| 8,771,267 B2 | 7/2014 | Kunis et al. |
| 8,774,942 B2 | 7/2014 | Lund et al. |
| 8,777,943 B2 | 7/2014 | Mayse et al. |
| 8,790,281 B2 | 7/2014 | Diederich et al. |
| 8,792,986 B2 | 7/2014 | Cigaina |
| 8,805,466 B2 | 8/2014 | Salahieh et al. |
| 8,808,345 B2 | 8/2014 | Clark et al. |
| 8,818,501 B2 | 8/2014 | Machado et al. |
| 8,818,514 B2 | 8/2014 | Zarins et al. |
| 8,819,928 B2 | 9/2014 | Nix et al. |
| 8,834,464 B2 | 9/2014 | Stewart et al. |
| 8,838,231 B2 | 9/2014 | Dobak |
| 8,838,239 B2 | 9/2014 | Libbus et al. |
| 8,845,629 B2 | 9/2014 | Demarais et al. |
| 8,845,707 B2 | 9/2014 | Lafontaine |
| 8,855,778 B2 | 10/2014 | Rezai |
| 8,868,188 B2 | 10/2014 | Hershey |
| 8,870,773 B2 | 10/2014 | Narouze |
| 8,874,216 B2 | 10/2014 | Kim et al. |
| 8,876,815 B2 | 11/2014 | Coe et al. |
| 8,880,185 B2 | 11/2014 | Hastings et al. |
| 8,888,699 B2 | 11/2014 | Buschman et al. |
| 8,888,773 B2 | 11/2014 | Chang et al. |
| 8,894,639 B2 | 11/2014 | Azamian et al. |
| 8,894,642 B2 | 11/2014 | Gibson et al. |
| 8,894,859 B2 | 11/2014 | Leo et al. |
| 8,897,882 B2 | 11/2014 | Nakatomi et al. |
| 8,903,501 B2 | 12/2014 | Perryman |
| 8,909,316 B2 | 12/2014 | Ng |
| 8,911,485 B2 | 12/2014 | Brian, III et al. |
| 8,920,414 B2 | 12/2014 | Stone et al. |
| 8,929,990 B2 | 1/2015 | Moffitt et al. |
| 8,934,968 B2 | 1/2015 | Whitehurst et al. |
| 8,934,978 B2 | 1/2015 | Deem et al. |
| 8,939,970 B2 | 1/2015 | Stone et al. |
| 8,940,010 B2 | 1/2015 | Lee et al. |
| 8,945,110 B2 | 2/2015 | Fish et al. |
| 8,951,296 B2 | 2/2015 | Melder et al. |
| 8,956,352 B2 | 2/2015 | Mauch et al. |
| 8,961,436 B2 | 2/2015 | Leo et al. |
| 8,974,445 B2 | 3/2015 | Warnking et al. |
| 8,974,451 B2 | 3/2015 | Smith |
| 8,975,233 B2 | 3/2015 | Stein et al. |
| 8,979,839 B2 | 3/2015 | De La Rama et al. |
| 8,979,841 B2 | 3/2015 | Kunis et al. |
| 8,983,601 B2 | 3/2015 | Fukamachi et al. |
| 8,983,609 B2 | 3/2015 | Rezai et al. |
| 8,986,211 B2 | 3/2015 | Gertner et al. |
| 8,986,231 B2 | 3/2015 | Gertner et al. |
| 8,986,294 B2 | 3/2015 | Demarais et al. |
| 8,989,862 B2 | 3/2015 | Rezai et al. |
| 8,992,447 B2 | 3/2015 | Gertner et al. |
| 8,996,091 B2 | 3/2015 | De la Rama et al. |
| 9,002,446 B2 | 4/2015 | Wenzel et al. |
| 9,005,143 B2 | 4/2015 | Gertner |
| 9,005,190 B2 | 4/2015 | Azamian et al. |
| 9,005,191 B2 | 4/2015 | Azamian et al. |
| 9,011,422 B2 | 4/2015 | Azamian et al. |
| 9,014,821 B2 | 4/2015 | Wang |
| 9,023,010 B2 | 5/2015 | Chiu et al. |
| 9,023,023 B2 | 5/2015 | McKay et al. |
| 9,023,037 B2 | 5/2015 | Zarins et al. |
| 9,028,391 B2 | 5/2015 | Gnanashanmugam et al. |
| 9,028,470 B2 | 5/2015 | Marrouche et al. |
| 9,028,472 B2 | 5/2015 | Mathur et al. |
| 9,033,966 B2 | 5/2015 | McKay |
| 9,033,969 B2 | 5/2015 | Azamian et al. |
| 9,037,244 B2 | 5/2015 | Sharma |
| 9,037,259 B2 | 5/2015 | Mathur |
| 9,039,700 B2 | 5/2015 | Kirschenman |
| 9,044,245 B2 | 6/2015 | Condie et al. |
| 9,050,106 B2 | 6/2015 | Hill et al. |
| 9,055,950 B2 | 6/2015 | Beani et al. |
| 9,060,755 B2 | 6/2015 | Buckley et al. |
| 9,060,756 B2 | 6/2015 | Bencini et al. |
| 9,060,761 B2 | 6/2015 | Hastings et al. |
| 9,060,784 B2 | 6/2015 | Coe et al. |
| 9,061,153 B1 | 6/2015 | Lebovitz |
| 9,066,713 B2 | 6/2015 | Turovskiy |
| 9,066,725 B2 | 6/2015 | Christian |
| 9,066,726 B2 | 6/2015 | Srivastava |
| 9,067,070 B2 | 6/2015 | Connor |
| 9,072,902 B2 | 7/2015 | Mathur et al. |
| 9,084,609 B2 | 7/2015 | Smith |
| 9,084,610 B2 | 7/2015 | Goshgarian et al. |
| 9,084,611 B2 | 7/2015 | Amirana et al. |
| 9,089,341 B2 | 7/2015 | Chomas et al. |
| 9,089,350 B2 | 7/2015 | Willard |
| 9,089,541 B2 | 7/2015 | Azamian et al. |
| 9,089,542 B2 | 7/2015 | Azamian et al. |
| 9,095,719 B2 | 8/2015 | Farazi |
| 9,101,365 B2 | 8/2015 | Highsmith |
| 9,114,123 B2 | 8/2015 | Azamian et al. |
| 9,114,124 B2 | 8/2015 | Azamian et al. |
| 9,119,600 B2 | 9/2015 | Richardson et al. |

(56) References Cited

U.S. PATENT DOCUMENTS

| | | |
|---|---|---|
| 9,119,951 B2 | 9/2015 | Gertner et al. |
| 9,119,952 B2 | 9/2015 | Gertner |
| 9,125,642 B2 | 9/2015 | Gertner |
| 9,125,666 B2 | 9/2015 | Steinke et al. |
| 9,126,046 B2 | 9/2015 | Feldman et al. |
| 9,126,048 B2 | 9/2015 | Ransbury et al. |
| 9,131,975 B2 | 9/2015 | McKay |
| 9,131,982 B2 | 9/2015 | VanScoy et al. |
| 9,138,292 B2 | 9/2015 | Chang et al. |
| 9,138,575 B2 | 9/2015 | Osypka |
| 9,144,678 B2 | 9/2015 | Marsh et al. |
| 9,149,328 B2 | 10/2015 | Dimmer et al. |
| 9,149,329 B2 | 10/2015 | Azamian et al. |
| 9,155,589 B2 | 10/2015 | Jenson |
| 9,162,073 B2 | 10/2015 | Rezai et al. |
| 9,168,093 B2 | 10/2015 | Mihalik et al. |
| 9,168,094 B2 | 10/2015 | Lee et al. |
| 9,173,586 B2 | 11/2015 | Deno et al. |
| 9,173,696 B2 | 11/2015 | Schauer et al. |
| 9,174,050 B2 | 11/2015 | Mathur et al. |
| 9,174,065 B2 | 11/2015 | Gertner |
| 9,179,974 B2 | 11/2015 | Wu et al. |
| 9,186,060 B2 | 11/2015 | De Graff et al. |
| 9,186,209 B2 | 11/2015 | Weber et al. |
| 9,186,210 B2 | 11/2015 | Jenson |
| 9,186,211 B2 | 11/2015 | Mathur |
| 9,192,435 B2 | 11/2015 | Jenson |
| 9,192,790 B2 | 11/2015 | Hastings et al. |
| 9,199,097 B2 | 12/2015 | Gertner |
| 9,204,929 B2 | 12/2015 | Solis |
| 9,216,289 B2 | 12/2015 | Libbus et al. |
| 9,220,433 B2 | 12/2015 | Ditter et al. |
| 9,220,558 B2 | 12/2015 | Willard |
| 9,220,561 B2 | 12/2015 | Crow et al. |
| 9,220,899 B2 | 12/2015 | Cattaneo et al. |
| 9,237,920 B2 | 1/2016 | Leo et al. |
| 9,241,754 B2 | 1/2016 | McKay |
| 9,254,163 B2 | 2/2016 | Paul et al. |
| 9,259,568 B2 | 2/2016 | Zhao et al. |
| 9,265,563 B2 | 2/2016 | Racz et al. |
| 9,265,575 B2 | 2/2016 | Coe et al. |
| 9,271,782 B2 | 3/2016 | Paul et al. |
| 9,272,132 B2 | 3/2016 | Laufer et al. |
| 9,277,955 B2 | 3/2016 | Herscher et al. |
| 9,283,026 B2 | 3/2016 | Paul et al. |
| 9,283,035 B2 | 3/2016 | Lanphere |
| 9,283,374 B2 | 3/2016 | Hollett et al. |
| 9,289,255 B2 | 3/2016 | Deem et al. |
| 9,314,208 B1 | 4/2016 | Altmann et al. |
| 9,314,300 B2 | 4/2016 | Nabutovsky et al. |
| 9,320,565 B2 | 4/2016 | Schneider et al. |
| 9,326,816 B2 | 5/2016 | Srivastava |
| 9,327,123 B2 | 5/2016 | Yamasaki et al. |
| 9,333,031 B2 | 5/2016 | Salahieh et al. |
| 9,333,033 B2 | 5/2016 | Gliner |
| 9,333,113 B2 | 5/2016 | Abunassar et al. |
| 9,339,325 B2 | 5/2016 | Miller et al. |
| 9,339,331 B2 | 5/2016 | Tegg et al. |
| 9,345,538 B2 | 5/2016 | Deem et al. |
| 9,345,540 B2 | 5/2016 | Maillin et al. |
| 9,345,880 B1 | 5/2016 | DiLorenzo |
| 9,352,171 B2 | 5/2016 | Gertner |
| 9,358,020 B2 | 6/2016 | Smith |
| 9,358,076 B2 | 6/2016 | Moll et al. |
| 9,358,401 B2 | 6/2016 | Gertner et al. |
| 9,364,284 B2 | 6/2016 | Groff et al. |
| 9,364,668 B2 | 6/2016 | Marsh et al. |
| 9,364,671 B2 | 6/2016 | Pless et al. |
| 9,375,154 B2 | 6/2016 | Wang |
| 9,381,063 B2 | 7/2016 | Gang et al. |
| 9,386,927 B2 | 7/2016 | Kaiser |
| 9,386,990 B2 | 7/2016 | Muir et al. |
| 9,393,068 B1 | 7/2016 | Leo et al. |
| 9,402,684 B2 | 8/2016 | Mathur et al. |
| 9,403,007 B2 | 8/2016 | Mokelke et al. |
| 9,408,661 B2 | 8/2016 | Haverkost |
| 9,408,663 B2 | 8/2016 | Hall et al. |
| 9,414,885 B2 | 8/2016 | Willard |
| 9,427,579 B2 | 8/2016 | Fain et al. |
| 9,433,428 B2 | 9/2016 | Hakala et al. |
| 9,439,598 B2 | 9/2016 | Shimada et al. |
| 9,446,240 B2 | 9/2016 | Masson et al. |
| 9,452,017 B2 | 9/2016 | Chang et al. |
| 9,463,062 B2 | 10/2016 | Smith et al. |
| 9,463,065 B2 | 10/2016 | Sugimoto et al. |
| 9,463,066 B2 | 10/2016 | Deem et al. |
| 9,504,518 B2 | 11/2016 | Condie et al. |
| 9,510,777 B2 | 12/2016 | Hezi-Yamit et al. |
| 9,510,901 B2 | 12/2016 | Steinke et al. |
| 9,511,228 B2 | 12/2016 | Amurthur et al. |
| 9,522,036 B2 | 12/2016 | Panescu et al. |
| 9,526,572 B2 | 12/2016 | Kunis |
| 9,526,893 B2 | 12/2016 | Averina et al. |
| 9,545,216 B2 | 1/2017 | D'Angelo et al. |
| 9,554,848 B2 | 1/2017 | Stewart et al. |
| 9,554,850 B2 | 1/2017 | Lee et al. |
| 9,555,020 B2 | 1/2017 | Pasricha et al. |
| 9,561,370 B2 | 2/2017 | Rezai et al. |
| 9,566,114 B2 | 2/2017 | Mathur |
| 9,572,982 B2 | 2/2017 | Burnes et al. |
| 9,579,149 B2 | 2/2017 | Kelly et al. |
| 9,579,507 B2 | 2/2017 | Cakmak |
| 9,579,518 B2 | 2/2017 | Gertner |
| 9,585,587 B2 | 3/2017 | Roy et al. |
| 9,586,046 B2 | 3/2017 | Knudson et al. |
| 9,592,386 B2 | 3/2017 | Mathur et al. |
| 9,597,148 B2 | 3/2017 | Olson |
| 9,616,226 B2 | 4/2017 | Lockwood et al. |
| 9,616,228 B2 | 4/2017 | Shuros et al. |
| 9,616,231 B2 | 4/2017 | Tweden et al. |
| 9,629,675 B2 | 4/2017 | Kleshinski et al. |
| 9,649,156 B2 | 5/2017 | Jenson et al. |
| 9,655,677 B2 | 5/2017 | Salahieh et al. |
| 9,656,080 B2 | 5/2017 | Chiu et al. |
| 9,662,171 B2 | 5/2017 | Dimmer et al. |
| 9,662,490 B2 | 5/2017 | Tracey et al. |
| 9,668,811 B2 | 6/2017 | Sogard et al. |
| 9,687,166 B2 | 6/2017 | Subramaniam et al. |
| 9,693,821 B2 | 7/2017 | Hanson et al. |
| 9,700,372 B2 | 7/2017 | Schaer |
| 9,707,000 B2 | 7/2017 | Hoke et al. |
| 9,707,034 B2 | 7/2017 | Schaer |
| 9,707,391 B2 | 7/2017 | Ahmed |
| 9,713,730 B2 | 7/2017 | Mathur et al. |
| 9,717,557 B2 | 8/2017 | Salahich et al. |
| 9,717,559 B2 | 8/2017 | Ditter et al. |
| 9,723,998 B2 | 8/2017 | Wang |
| 9,743,984 B1 | 8/2017 | Curley et al. |
| 9,750,560 B2 | 9/2017 | Ballakur et al. |
| 9,750,568 B2 | 9/2017 | Sobotka |
| 9,757,193 B2 | 9/2017 | Zarins et al. |
| 9,789,275 B2 | 10/2017 | Iyer et al. |
| 9,795,442 B2 | 10/2017 | Salahieh et al. |
| 9,795,780 B2 | 10/2017 | Serna et al. |
| 9,801,557 B2 | 10/2017 | Ghaffari et al. |
| 9,808,303 B2 | 11/2017 | Ryba et al. |
| 9,808,616 B2 | 11/2017 | Cederna et al. |
| 9,820,799 B2 | 11/2017 | Serna et al. |
| 9,821,003 B2 | 11/2017 | Yun |
| 9,827,041 B2 | 11/2017 | Zarins et al. |
| 9,833,283 B2 | 12/2017 | Hanson et al. |
| 9,833,623 B2 | 12/2017 | Gnanashanmugam et al. |
| 9,844,405 B2 | 12/2017 | Weber et al. |
| 9,844,668 B2 | 12/2017 | Ahmed |
| 9,848,795 B2 | 12/2017 | Zarins et al. |
| 9,848,948 B2 | 12/2017 | Mareckim et al. |
| 9,855,096 B2 | 1/2018 | Chang et al. |
| 9,855,317 B2 | 1/2018 | Bright |
| 9,861,504 B2 | 1/2018 | Abunassar et al. |
| 9,861,547 B2 | 1/2018 | Crunick et al. |
| 9,872,717 B2 | 1/2018 | Bencini et al. |
| 9,872,985 B2 | 1/2018 | Butera et al. |
| 9,883,909 B2 | 2/2018 | Brennan |
| 9,895,543 B2 | 2/2018 | Lian et al. |

(56) References Cited

U.S. PATENT DOCUMENTS

| | | |
|---|---|---|
| 9,918,822 B2 | 3/2018 | Abunassar et al. |
| 9,919,144 B2 | 3/2018 | Meyer |
| 9,925,001 B2 | 3/2018 | Willard et al. |
| 9,943,354 B2 | 4/2018 | Yamit et al. |
| 9,943,365 B2 | 4/2018 | Haverkost et al. |
| 9,943,666 B2 | 4/2018 | Warnking |
| 9,950,099 B2 | 4/2018 | Romero-Ortega et al. |
| 9,950,164 B2 | 4/2018 | Lipani |
| 9,955,892 B2 | 5/2018 | Arora et al. |
| 9,956,033 B2 | 5/2018 | Squire et al. |
| 9,956,034 B2 | 5/2018 | Toth et al. |
| 9,974,477 B2 | 5/2018 | Cholette et al. |
| 9,981,108 B2 | 5/2018 | Warnking |
| 9,999,461 B2 | 6/2018 | Azamian et al. |
| 9,999,532 B2 | 6/2018 | Mische |
| 10,004,557 B2 | 6/2018 | Gross |
| 10,010,364 B2 | 7/2018 | Harrington |
| 10,022,182 B2 | 7/2018 | Willard et al. |
| 10,022,516 B2 | 7/2018 | Papay |
| 10,039,901 B2 | 8/2018 | Warnking |
| 10,052,495 B2 | 8/2018 | Ben-Haim |
| 10,058,372 B1 | 8/2018 | Shadduck |
| 10,064,674 B2 | 9/2018 | Azamian et al. |
| 10,065,037 B2 | 9/2018 | Nelson et al. |
| 10,070,911 B2 | 9/2018 | Azamian et al. |
| 10,076,384 B2 | 9/2018 | Kasprzyk et al. |
| 10,085,799 B2 | 10/2018 | Smith |
| 10,092,352 B2 | 10/2018 | Rudie |
| 10,092,756 B2 | 10/2018 | Bonnet et al. |
| 10,118,004 B2 | 11/2018 | Fischell et al. |
| 10,123,896 B2 | 11/2018 | Farrugia et al. |
| 10,124,173 B2 | 11/2018 | Bonnet et al. |
| 10,179,029 B2 | 1/2019 | Rudie et al. |
| 10,195,467 B2 | 2/2019 | Tran et al. |
| 10,201,705 B2 | 2/2019 | Bharmi et al. |
| 10,201,706 B2 | 2/2019 | Schwab et al. |
| 10,207,110 B1 | 2/2019 | Gelfand et al. |
| 10,230,041 B2 | 3/2019 | Taylor et al. |
| 10,231,778 B2 | 3/2019 | Highsmith et al. |
| 10,232,180 B2 | 3/2019 | Kramer et al. |
| 10,238,875 B2 | 3/2019 | Masiach |
| 10,265,122 B2 | 4/2019 | Wang et al. |
| 10,271,898 B2 | 4/2019 | Cao et al. |
| 10,272,269 B2 | 4/2019 | Garrison et al. |
| 10,286,191 B2 | 5/2019 | Wang et al. |
| 10,292,610 B2 | 5/2019 | Srivastava |
| 10,307,324 B2 | 6/2019 | Osorio |
| 10,321,946 B2 | 6/2019 | Horn et al. |
| 10,328,258 B2 | 6/2019 | Gittard et al. |
| 10,335,280 B2 | 7/2019 | Keogh et al. |
| 10,350,005 B2 | 7/2019 | Mathur et al. |
| 10,350,440 B2 | 7/2019 | Taylor et al. |
| 10,363,362 B2 | 7/2019 | Osorio |
| 10,368,944 B2 | 8/2019 | Schaer |
| 10,376,310 B2 | 8/2019 | Fain et al. |
| 10,376,516 B2 | 8/2019 | Gelfand et al. |
| 10,376,694 B2 | 8/2019 | Sharma |
| 10,383,685 B2 | 8/2019 | Gross et al. |
| 10,390,881 B2 | 8/2019 | Rudie |
| 10,426,956 B2 | 10/2019 | Williamson et al. |
| 10,449,002 B2 | 10/2019 | Wybo |
| 10,456,573 B1 | 10/2019 | Feinstein |
| 10,463,423 B2 | 11/2019 | Sutton et al. |
| 10,463,858 B2 | 11/2019 | Perryman et al. |
| 10,470,837 B2 | 11/2019 | Lin et al. |
| 10,471,257 B2 | 11/2019 | Ahmad et al. |
| 10,478,249 B2 | 11/2019 | Gross et al. |
| 10,478,633 B2 | 11/2019 | Schwarz et al. |
| 10,492,713 B2 | 12/2019 | Haber et al. |
| 10,499,937 B2 | 12/2019 | Warnking |
| 10,512,498 B2 | 12/2019 | Saadat |
| 10,512,504 B2 | 12/2019 | Chang et al. |
| 10,517,672 B2 | 12/2019 | Long |
| 10,518,112 B2 | 12/2019 | Gilad |
| 10,524,859 B2 | 1/2020 | Vrba et al. |
| 10,531,913 B2 | 1/2020 | Haverkost |
| 10,537,375 B2 | 1/2020 | Wang |
| 10,537,387 B2 | 1/2020 | Ben Oren et al. |
| 10,543,034 B2 | 1/2020 | Azamian et al. |
| 10,543,037 B2 | 1/2020 | Shah |
| 10,543,039 B2 | 1/2020 | Lindquist et al. |
| 10,561,461 B2 | 2/2020 | Panescu et al. |
| 10,561,846 B2 | 2/2020 | Tracey et al. |
| 10,575,893 B2 | 3/2020 | Mayse |
| 10,583,286 B2 | 3/2020 | Swanson et al. |
| 10,583,295 B2 | 3/2020 | Gupte et al. |
| 10,617,460 B2 | 4/2020 | Azamian et al. |
| 10,646,710 B2 | 5/2020 | Feinstein |
| 10,646,713 B2 | 5/2020 | Hettrick et al. |
| 10,660,703 B2 | 5/2020 | Rizq et al. |
| 10,674,963 B2 | 6/2020 | Toth |
| 10,675,085 B2 | 6/2020 | Clark et al. |
| 10,695,124 B2 | 6/2020 | Groff et al. |
| 10,702,533 B2 | 7/2020 | Yun et al. |
| 10,709,490 B2 | 7/2020 | Turovskiy |
| 10,716,749 B2 | 7/2020 | Yun et al. |
| 10,722,714 B2 | 7/2020 | Thornton et al. |
| 10,722,716 B2 | 7/2020 | Waldhauser et al. |
| 10,729,365 B2 | 8/2020 | Beasley et al. |
| 10,743,933 B2 | 8/2020 | Smith et al. |
| 10,751,536 B1 | 8/2020 | Heit et al. |
| 10,751,539 B2 | 8/2020 | Zitzewitz et al. |
| 10,758,713 B2 | 9/2020 | Wang et al. |
| 10,765,482 B2 | 9/2020 | Hastings |
| 10,772,681 B2 | 9/2020 | Gertner |
| 10,772,759 B2 | 9/2020 | Khanna |
| 10,786,295 B2 | 9/2020 | Buelna |
| 10,792,098 B2 | 10/2020 | Ku et al. |
| 10,799,289 B2 | 10/2020 | Alas et al. |
| 10,828,090 B2 | 11/2020 | Haverkost et al. |
| 10,828,460 B2 | 11/2020 | Chang |
| 10,828,491 B2 | 11/2020 | Schepis et al. |
| 10,835,305 B2 | 11/2020 | Sutermeister et al. |
| 10,842,494 B2 | 11/2020 | Agarwal et al. |
| 10,842,556 B1 | 11/2020 | Tandri et al. |
| 10,849,685 B2 | 12/2020 | Denison et al. |
| 10,849,879 B2 | 12/2020 | Seward |
| 10,850,100 B2 | 12/2020 | Cakmak et al. |
| 10,856,926 B2 | 12/2020 | Azamian et al. |
| 10,857,352 B2 | 12/2020 | Ransbury et al. |
| 10,869,997 B2 | 12/2020 | Mayse |
| 10,874,454 B2 | 12/2020 | Chen |
| 10,888,377 B2 | 1/2021 | Ben-Oren et al. |
| 10,905,495 B2 | 2/2021 | Toth et al. |
| 10,933,259 B2 | 3/2021 | Sverdlik et al. |
| 10,952,790 B2 | 3/2021 | Haverkost et al. |
| 10,959,669 B2 | 3/2021 | Neidert et al. |
| 10,960,209 B2 | 3/2021 | Sridhar et al. |
| 10,974,041 B2 | 4/2021 | Chew et al. |
| 10,987,163 B2 | 4/2021 | Pike |
| 11,007,001 B1 | 5/2021 | Carignan et al. |
| 11,007,329 B2 | 5/2021 | Fischell et al. |
| 11,013,459 B2 | 5/2021 | Toth et al. |
| 11,013,549 B2 | 5/2021 | Barman et al. |
| 11,013,938 B2 | 5/2021 | Konofagou et al. |
| 11,040,197 B2 | 6/2021 | Ludwig et al. |
| 11,052,253 B2 | 7/2021 | Cakmak |
| 11,058,484 B2 | 7/2021 | Asirvatham et al. |
| 11,065,046 B2 | 7/2021 | Edidin |
| 11,083,877 B2 | 8/2021 | Seward |
| 11,103,692 B2 | 8/2021 | Cakmak |
| 11,116,561 B2 | 9/2021 | Melder |
| 11,129,673 B2 | 9/2021 | Barry et al. |
| 11,129,674 B2 | 9/2021 | Naga et al. |
| 11,134,998 B2 | 10/2021 | Cross et al. |
| 11,154,351 B2 | 10/2021 | Rothman et al. |
| 11,154,356 B2 | 10/2021 | Gertner |
| 11,154,547 B2 | 10/2021 | Bright et al. |
| 11,154,712 B2 | 10/2021 | Sullivan et al. |
| 11,160,975 B2 | 11/2021 | Mercanzini et al. |
| 11,179,195 B2 | 11/2021 | Sobotka |
| 11,179,196 B2 | 11/2021 | Cao et al. |
| 11,185,361 B2 | 11/2021 | Toth et al. |
| 11,185,662 B2 | 11/2021 | Warnking |

(56) References Cited

U.S. PATENT DOCUMENTS

| | | |
|---|---|---|
| 11,185,699 B2 | 11/2021 | Masson et al. |
| 11,202,671 B2 | 12/2021 | Hanson et al. |
| 11,207,070 B2 | 12/2021 | Berman et al. |
| 11,213,340 B2 | 1/2022 | Su et al. |
| 11,213,345 B2 | 1/2022 | Willard |
| 11,213,674 B2 | 1/2022 | Barman et al. |
| 11,235,154 B2 | 2/2022 | Phillips et al. |
| 11,246,654 B2 | 2/2022 | Weber et al. |
| 11,247,057 B1 | 2/2022 | Gliner |
| 11,304,633 B2 | 4/2022 | Koya et al. |
| 11,305,115 B2 | 4/2022 | Caldwell et al. |
| 11,318,310 B1 | 5/2022 | Bradley |
| 11,318,331 B2 | 5/2022 | Shabtay et al. |
| 11,324,408 B2 | 5/2022 | Wang |
| 11,324,673 B2 | 5/2022 | Velis et al. |
| 11,337,748 B2 | 5/2022 | Wang et al. |
| 11,338,120 B2 | 5/2022 | Yun et al. |
| 11,344,364 B2 | 5/2022 | Herth et al. |
| 11,344,731 B2 | 5/2022 | Toth et al. |
| 11,350,992 B2 | 6/2022 | Pilcher et al. |
| 11,357,447 B2 | 6/2022 | Sverdlik et al. |
| 11,382,515 B2 | 7/2022 | Buelna et al. |
| 11,382,689 B2 | 7/2022 | Wang |
| 11,389,534 B2 | 7/2022 | Yun et al. |
| 11,413,090 B2 | 8/2022 | Iranitalab et al. |
| 11,419,681 B2 | 8/2022 | Coates et al. |
| 11,433,235 B2 | 9/2022 | Narayan et al. |
| 11,433,237 B2 | 9/2022 | Lovett |
| 11,439,809 B2 | 9/2022 | Whipple et al. |
| 11,439,819 B2 | 9/2022 | Imran |
| 11,446,359 B2 | 9/2022 | Bright |
| 11,446,498 B2 | 9/2022 | Schepis et al. |
| 11,446,502 B2 | 9/2022 | Donega et al. |
| 11,457,819 B2 | 10/2022 | Trudel |
| 11,464,971 B2 | 10/2022 | Schepis et al. |
| 11,464,976 B2 | 10/2022 | Hunsberger et al. |
| 11,471,208 B2 | 10/2022 | Waldstreicher et al. |
| 11,471,210 B2 | 10/2022 | Pellegrino et al. |
| 11,478,297 B2 | 10/2022 | Viswanadha et al. |
| 11,478,582 B2 | 10/2022 | Toth et al. |
| 11,490,844 B2 | 11/2022 | Imran et al. |
| 11,497,775 B2 | 11/2022 | Lefer et al. |
| 11,497,915 B2 | 11/2022 | Tehrani |
| 11,504,185 B2 | 11/2022 | Iranitalab et al. |
| 11,510,731 B2 | 11/2022 | Puryear et al. |
| 11,515,029 B2 | 11/2022 | Sullivan et al. |
| 11,517,499 B2 | 12/2022 | Spector |
| 11,517,754 B2 | 12/2022 | Sridhar et al. |
| 11,524,159 B2 | 12/2022 | Caban et al. |
| 11,534,611 B2 | 12/2022 | Baldoni et al. |
| 11,534,631 B2 | 12/2022 | Gilad |
| 11,547,480 B2 | 1/2023 | Weiss |
| 11,559,687 B2 | 1/2023 | Goedeke et al. |
| 11,564,616 B2 | 1/2023 | Toth et al. |
| 11,564,743 B1 | 1/2023 | Ben Oren et al. |
| 11,565,113 B2 | 1/2023 | Curtis |
| 11,589,919 B2 | 2/2023 | Long |
| 11,596,468 B2 | 3/2023 | Pellegrino et al. |
| 11,596,469 B2 | 3/2023 | Nair |
| 11,607,176 B2 | 3/2023 | Brockway et al. |
| 11,607,275 B2 | 3/2023 | Brar et al. |
| 11,622,805 B2 | 4/2023 | Salazar et al. |
| 11,623,093 B2 | 4/2023 | Cuchiara et al. |
| 11,633,601 B2 | 4/2023 | Vervoordeldonk et al. |
| 11,638,745 B2 | 5/2023 | Jackson et al. |
| 11,660,474 B2 | 5/2023 | Puleo et al. |
| 11,672,456 B2 | 6/2023 | Dubhashi |
| 11,672,595 B1 | 6/2023 | Melton et al. |
| 11,672,597 B2 | 6/2023 | Tajima et al. |
| 11,673,006 B2 | 6/2023 | Sobotka et al. |
| 11,691,015 B2 | 7/2023 | Minassian et al. |
| 11,701,172 B2 | 7/2023 | Asirvatham et al. |
| 11,712,283 B2 | 8/2023 | Mayse et al. |
| 11,712,296 B2 | 8/2023 | Panescu et al. |
| 11,723,719 B2 | 8/2023 | Sachs et al. |
| 11,724,102 B2 | 8/2023 | Donega et al. |
| 11,724,108 B2 | 8/2023 | Chew et al. |
| 11,730,506 B2 | 8/2023 | Sverdlik et al. |
| 11,738,196 B2 | 8/2023 | Vervoordeldonk et al. |
| 11,744,640 B2 | 9/2023 | Amaoua et al. |
| 11,759,608 B2 | 9/2023 | Fischell et al. |
| 11,771,497 B2 | 10/2023 | Townley et al. |
| 11,779,392 B2 | 10/2023 | Hezi-Yamit et al. |
| 11,794,001 B2 | 10/2023 | Imran |
| 11,801,092 B2 | 10/2023 | Levin et al. |
| 11,806,070 B2 | 11/2023 | Wright et al. |
| 11,806,072 B2 | 11/2023 | Hakimimehr |
| 11,806,073 B2 | 11/2023 | Bapna et al. |
| 11,826,569 B2 | 11/2023 | Mishra et al. |
| 11,832,965 B2 | 12/2023 | Wang |
| 11,839,766 B2 | 12/2023 | Scheltienne et al. |
| 11,844,558 B2 | 12/2023 | Lazarus et al. |
| 11,844,565 B2 | 12/2023 | Asirvatham et al. |
| 11,844,569 B1 | 12/2023 | Panescu et al. |
| 11,857,249 B2 | 1/2024 | Ku et al. |
| 11,857,778 B2 | 1/2024 | Hamner et al. |
| 11,857,783 B2 | 1/2024 | Lo et al. |
| 11,864,826 B2 | 1/2024 | Levin et al. |
| 11,864,904 B2 | 1/2024 | Dubhashi et al. |
| 11,865,343 B2 | 1/2024 | Gallagher et al. |
| 11,883,087 B2 | 1/2024 | Tunev et al. |
| 11,883,091 B2 | 1/2024 | Townley |
| 11,883,103 B2 | 1/2024 | Toth et al. |
| 11,890,393 B2 | 2/2024 | Bright et al. |
| 11,896,818 B2 | 2/2024 | Townley |
| 11,911,634 B2 | 2/2024 | Puleo et al. |
| 11,918,362 B2 | 3/2024 | Fagin et al. |
| 11,918,595 B2 | 3/2024 | Bright et al. |
| 11,923,063 B2 | 3/2024 | Georgiou et al. |
| 11,937,868 B2 | 3/2024 | Mayse et al. |
| 12,011,212 B2 | 6/2024 | Azamian et al. |
| 12,029,466 B2 | 7/2024 | Azamian et al. |
| 2001/0029393 A1 | 10/2001 | Tierney et al. |
| 2001/0037081 A1 | 11/2001 | Heiner |
| 2002/0016565 A1 | 2/2002 | Zadno-Azizi et al. |
| 2002/0026228 A1 | 2/2002 | Schauerte |
| 2002/0087208 A1 | 7/2002 | Koblish et al. |
| 2002/0122815 A1 | 9/2002 | Peroutka |
| 2002/0147480 A1 | 10/2002 | Mamayek |
| 2002/0183735 A1 | 12/2002 | Edwards et al. |
| 2003/0060813 A1 | 3/2003 | Loeb et al. |
| 2003/0065371 A1 | 4/2003 | Satake |
| 2003/0088240 A1 | 5/2003 | Saadat |
| 2003/0120271 A1 | 6/2003 | Burnside et al. |
| 2003/0144708 A1 | 7/2003 | Starkebaum |
| 2003/0149368 A1 | 8/2003 | Hennemann et al. |
| 2003/0152637 A1 | 8/2003 | Chasin et al. |
| 2003/0195501 A1 | 10/2003 | Sherman et al. |
| 2004/0019364 A1 | 1/2004 | Kieval et al. |
| 2004/0082859 A1 | 4/2004 | Schaer |
| 2004/0082947 A1 | 4/2004 | Oral et al. |
| 2004/0087936 A1 | 5/2004 | Stern |
| 2004/0254572 A1 | 12/2004 | Mcintyre et al. |
| 2004/0260328 A1 | 12/2004 | Zvuloni et al. |
| 2004/0267191 A1 | 12/2004 | Gifford, III et al. |
| 2004/0267250 A1 | 12/2004 | Yon et al. |
| 2005/0004563 A1 | 1/2005 | Racz et al. |
| 2005/0015084 A1 | 1/2005 | Hill, III et al. |
| 2005/0021092 A1 | 1/2005 | Yun et al. |
| 2005/0027328 A1 | 2/2005 | Greenstein |
| 2005/0033136 A1 | 2/2005 | Govari et al. |
| 2005/0033137 A1 | 2/2005 | Oral et al. |
| 2005/0049293 A1 | 3/2005 | Lautt |
| 2005/0075701 A1* | 4/2005 | Shafer .............. A61B 5/416 607/72 |
| 2005/0075702 A1 | 4/2005 | Shafer et al. |
| 2005/0113295 A1 | 5/2005 | Dolle |
| 2005/0215990 A1 | 9/2005 | Govari |
| 2005/0240170 A1 | 10/2005 | Zhang et al. |
| 2005/0288661 A1 | 12/2005 | Sauvageau et al. |
| 2005/0288730 A1 | 12/2005 | Deem et al. |
| 2006/0009815 A1 | 1/2006 | Boveja et al. |
| 2006/0009832 A1 | 1/2006 | Fisher |
| 2006/0025821 A1 | 2/2006 | Gelfand et al. |

(56) References Cited

U.S. PATENT DOCUMENTS

| | | |
|---|---|---|
| 2006/0034847 A1* | 2/2006 | Yun ............... A61K 31/165 514/10.2 |
| 2006/0047326 A1 | 3/2006 | Wheeler |
| 2006/0089637 A1 | 4/2006 | Werneth et al. |
| 2006/0089678 A1 | 4/2006 | Shalev |
| 2006/0111704 A1 | 5/2006 | Brenneman et al. |
| 2006/0111754 A1 | 5/2006 | Rezai et al. |
| 2006/0121085 A1 | 6/2006 | Warren et al. |
| 2006/0122508 A1 | 6/2006 | Slayton et al. |
| 2006/0161217 A1 | 7/2006 | Jaax et al. |
| 2006/0167498 A1 | 7/2006 | DiLorenzo |
| 2006/0212076 A1 | 9/2006 | Demarais et al. |
| 2006/0217698 A1 | 9/2006 | Starkebaum et al. |
| 2006/0235286 A1 | 10/2006 | Stone et al. |
| 2006/0235300 A1 | 10/2006 | Weng et al. |
| 2006/0258978 A1 | 11/2006 | Vanney |
| 2006/0265014 A1 | 11/2006 | Demarais et al. |
| 2006/0271111 A1 | 11/2006 | Demarais et al. |
| 2007/0016274 A1 | 1/2007 | Boveja et al. |
| 2007/0021786 A1 | 1/2007 | Parnis et al. |
| 2007/0027484 A1 | 2/2007 | Guzman et al. |
| 2007/0027497 A1 | 2/2007 | Parnis |
| 2007/0060971 A1 | 3/2007 | Glasberg et al. |
| 2007/0083239 A1 | 4/2007 | Demarais et al. |
| 2007/0100380 A1 | 5/2007 | Fukui |
| 2007/0106293 A1 | 5/2007 | Oral et al. |
| 2007/0106337 A1 | 5/2007 | Errico et al. |
| 2007/0129720 A1 | 6/2007 | Demarais et al. |
| 2007/0129760 A1 | 6/2007 | Demarais et al. |
| 2007/0142879 A1 | 6/2007 | Greenberg |
| 2007/0156179 A1 | 7/2007 | S.E. |
| 2007/0197970 A1 | 8/2007 | Shen-Gunther |
| 2007/0208388 A1 | 9/2007 | Jahns et al. |
| 2007/0225781 A1 | 9/2007 | Saadat et al. |
| 2007/0265563 A1 | 11/2007 | Heuser |
| 2007/0265687 A1 | 11/2007 | Deem et al. |
| 2007/0287994 A1 | 12/2007 | Patel |
| 2007/0299476 A1 | 12/2007 | Park et al. |
| 2007/0299488 A1 | 12/2007 | Carr |
| 2008/0004596 A1 | 1/2008 | Yun et al. |
| 2008/0009917 A1 | 1/2008 | Rossing et al. |
| 2008/0009925 A1 | 1/2008 | Abboud et al. |
| 2008/0015642 A1 | 1/2008 | Johnson et al. |
| 2008/0027346 A1 | 1/2008 | Litt et al. |
| 2008/0027358 A1 | 1/2008 | Gregersen et al. |
| 2008/0044392 A1 | 2/2008 | Kues et al. |
| 2008/0077165 A1 | 3/2008 | Murphy |
| 2008/0086180 A1 | 4/2008 | Ben-Ezra et al. |
| 2008/0140074 A1 | 6/2008 | Horne et al. |
| 2008/0147137 A1 | 6/2008 | Cohen et al. |
| 2008/0161803 A1 | 7/2008 | Oral et al. |
| 2008/0161865 A1 | 7/2008 | Hagen |
| 2008/0183237 A1 | 7/2008 | Errico et al. |
| 2008/0188912 A1 | 8/2008 | Stone et al. |
| 2008/0195171 A1 | 8/2008 | Sharma |
| 2008/0208305 A1 | 8/2008 | Rezai et al. |
| 2008/0213331 A1 | 9/2008 | Gelfand et al. |
| 2008/0243071 A1 | 10/2008 | Quijano et al. |
| 2008/0249419 A1 | 10/2008 | Sekins et al. |
| 2008/0255642 A1 | 10/2008 | Zarins et al. |
| 2008/0275424 A1 | 11/2008 | Doshi et al. |
| 2008/0294096 A1 | 11/2008 | Uber, III et al. |
| 2008/0300587 A1 | 12/2008 | Anderson |
| 2008/0312642 A1 | 12/2008 | Kania et al. |
| 2008/0312643 A1 | 12/2008 | Kania et al. |
| 2008/0312714 A1 | 12/2008 | Pasricha et al. |
| 2009/0036948 A1 | 2/2009 | Levin et al. |
| 2009/0060873 A1 | 3/2009 | Sporn et al. |
| 2009/0062697 A1 | 3/2009 | Zhang et al. |
| 2009/0062871 A1 | 3/2009 | Tracey et al. |
| 2009/0062873 A1 | 3/2009 | Wu et al. |
| 2009/0076409 A1 | 3/2009 | Wu et al. |
| 2009/0093801 A1 | 4/2009 | Crossman |
| 2009/0118777 A1 | 5/2009 | Iki et al. |
| 2009/0118780 A1 | 5/2009 | DiLorenzo |
| 2009/0131993 A1 | 5/2009 | Rousso et al. |
| 2009/0182303 A1 | 7/2009 | Walak et al. |
| 2009/0192570 A1 | 7/2009 | Jaax et al. |
| 2009/0234345 A1 | 9/2009 | Hon |
| 2009/0240306 A1 | 9/2009 | Kapoor |
| 2009/0247933 A1 | 10/2009 | Maor et al. |
| 2009/0247934 A1* | 10/2009 | Tracey ............... A61P 29/00 604/20 |
| 2009/0253974 A1 | 10/2009 | Rahme |
| 2009/0254142 A1 | 10/2009 | Edwards et al. |
| 2009/0254143 A1 | 10/2009 | Tweden et al. |
| 2009/0275827 A1 | 11/2009 | Aiken et al. |
| 2009/0275996 A1 | 11/2009 | Burnes et al. |
| 2009/0275997 A1* | 11/2009 | Faltys ............... A61N 1/36053 607/2 |
| 2009/0312690 A1 | 12/2009 | Kim |
| 2009/0324701 A1 | 12/2009 | Williams |
| 2010/0010597 A1 | 1/2010 | Deem et al. |
| 2010/0030210 A1 | 2/2010 | Paulus |
| 2010/0057161 A1 | 3/2010 | Machado et al. |
| 2010/0068739 A1 | 3/2010 | Tisi et al. |
| 2010/0076425 A1 | 3/2010 | Carroux |
| 2010/0076519 A1 | 3/2010 | Kornet et al. |
| 2010/0106207 A1 | 4/2010 | Dobak, III |
| 2010/0114195 A1 | 5/2010 | Burnes et al. |
| 2010/0114244 A1 | 5/2010 | Manda et al. |
| 2010/0125268 A1 | 5/2010 | Gustus et al. |
| 2010/0137860 A1 | 6/2010 | Demarais et al. |
| 2010/0137952 A1 | 6/2010 | Demarais et al. |
| 2010/0152731 A1 | 6/2010 | De la Rama et al. |
| 2010/0168731 A1* | 7/2010 | Wu ............... A61B 18/1206 606/33 |
| 2010/0168739 A1 | 7/2010 | Wu et al. |
| 2010/0174282 A1 | 7/2010 | Demaris et al. |
| 2010/0191112 A1 | 7/2010 | Demarais et al. |
| 2010/0222851 A1 | 9/2010 | Deem et al. |
| 2010/0228310 A1 | 9/2010 | Shuros et al. |
| 2010/0249773 A1 | 9/2010 | Clark et al. |
| 2010/0249859 A1 | 9/2010 | DiLorenzo |
| 2010/0255123 A1 | 10/2010 | Lohajoti et al. |
| 2010/0256629 A1 | 10/2010 | Wylie et al. |
| 2010/0268288 A1 | 10/2010 | Hunter et al. |
| 2010/0268307 A1 | 10/2010 | Demarais et al. |
| 2010/0286684 A1 | 11/2010 | Hata et al. |
| 2010/0303617 A1 | 12/2010 | Chen |
| 2011/0029037 A1 | 2/2011 | Rezai et al. |
| 2011/0060324 A1 | 3/2011 | Wu et al. |
| 2011/0066085 A1 | 3/2011 | Weng et al. |
| 2011/0092781 A1 | 4/2011 | Gertner |
| 2011/0092880 A1 | 4/2011 | Gertner |
| 2011/0098762 A1 | 4/2011 | Gertner |
| 2011/0112400 A1 | 5/2011 | Emery et al. |
| 2011/0118600 A1 | 5/2011 | Gertner |
| 2011/0118632 A1 | 5/2011 | Sinelnikov et al. |
| 2011/0118726 A1 | 5/2011 | De la rama et al. |
| 2011/0118747 A1 | 5/2011 | Pasricha et al. |
| 2011/0118812 A1 | 5/2011 | Pasricha et al. |
| 2011/0137298 A1 | 6/2011 | Nguyen et al. |
| 2011/0144637 A1 | 6/2011 | Pageard et al. |
| 2011/0152855 A1 | 6/2011 | Mayse |
| 2011/0152857 A1 | 6/2011 | Ingle |
| 2011/0152974 A1 | 6/2011 | Rezai et al. |
| 2011/0160514 A1 | 6/2011 | Long et al. |
| 2011/0166499 A1 | 7/2011 | Demarais et al. |
| 2011/0168739 A1 | 7/2011 | Brouwer |
| 2011/0172527 A1 | 7/2011 | Gertner |
| 2011/0172528 A1 | 7/2011 | Gertner |
| 2011/0178570 A1 | 7/2011 | Demarais |
| 2011/0200171 A1 | 8/2011 | Beetel et al. |
| 2011/0202098 A1 | 8/2011 | Demarais et al. |
| 2011/0207758 A1 | 8/2011 | Sobotka et al. |
| 2011/0208096 A1 | 8/2011 | Demarais et al. |
| 2011/0208173 A1 | 8/2011 | Sobotka et al. |
| 2011/0208175 A1 | 8/2011 | Sobotka et al. |
| 2011/0230939 A1 | 9/2011 | Weinstock |
| 2011/0257523 A1 | 10/2011 | Hastings et al. |
| 2011/0257561 A1 | 10/2011 | Gertner et al. |
| 2011/0257562 A1 | 10/2011 | Schaer |
| 2011/0257641 A1 | 10/2011 | Hastings et al. |

(56) References Cited

U.S. PATENT DOCUMENTS

| | | |
|---|---|---|
| 2011/0257647 A1 | 10/2011 | Mayse et al. |
| 2011/0258564 A1 | 10/2011 | Demaris et al. |
| 2011/0263921 A1 | 10/2011 | Vrba et al. |
| 2011/0264011 A1 | 10/2011 | Wu et al. |
| 2011/0264075 A1 | 10/2011 | Leung et al. |
| 2011/0264086 A1 | 10/2011 | Ingle |
| 2011/0264116 A1 | 10/2011 | Kocur et al. |
| 2011/0270046 A1 | 11/2011 | Paul et al. |
| 2011/0270238 A1 | 11/2011 | Rizq et al. |
| 2011/0275891 A1 | 11/2011 | Shemi |
| 2011/0276047 A1 | 11/2011 | Sklar et al. |
| 2011/0301664 A1 | 12/2011 | Rezai |
| 2011/0306851 A1 | 12/2011 | Wang |
| 2011/0307034 A1 | 12/2011 | Hastings et al. |
| 2011/0313417 A1 | 12/2011 | De La Rama et al. |
| 2011/0319765 A1 | 12/2011 | Gertner et al. |
| 2011/0319809 A1 | 12/2011 | Smith |
| 2012/0006256 A1 | 1/2012 | Choi et al. |
| 2012/0016226 A1 | 1/2012 | Gertner |
| 2012/0022409 A1 | 1/2012 | Gertner et al. |
| 2012/0029496 A1 | 2/2012 | Smith |
| 2012/0029505 A1 | 2/2012 | Jenson |
| 2012/0029511 A1 | 2/2012 | Smith |
| 2012/0029512 A1 | 2/2012 | Willard et al. |
| 2012/0035601 A1 | 2/2012 | Wittenberger |
| 2012/0059286 A1 | 3/2012 | Hastings et al. |
| 2012/0065493 A1 | 3/2012 | Gertner |
| 2012/0065494 A1 | 3/2012 | Gertner et al. |
| 2012/0065506 A1 | 3/2012 | Smith |
| 2012/0065554 A1 | 3/2012 | Pikus |
| 2012/0089047 A1 | 4/2012 | Ryba et al. |
| 2012/0095461 A1 | 4/2012 | Herscher et al. |
| 2012/0101413 A1 | 4/2012 | Beetel et al. |
| 2012/0101538 A1 | 4/2012 | Ballakur et al. |
| 2012/0116382 A1 | 5/2012 | Ku et al. |
| 2012/0116383 A1 | 5/2012 | Mauch et al. |
| 2012/0116486 A1 | 5/2012 | Naga et al. |
| 2012/0123261 A1 | 5/2012 | Jenson et al. |
| 2012/0123276 A1 | 5/2012 | Govari et al. |
| 2012/0130269 A1 | 5/2012 | Rea |
| 2012/0130289 A1 | 5/2012 | Demarais et al. |
| 2012/0130345 A1 | 5/2012 | Levin et al. |
| 2012/0130359 A1 | 5/2012 | Turovskiy |
| 2012/0130360 A1 | 5/2012 | Buckley et al. |
| 2012/0130368 A1 | 5/2012 | Jenson |
| 2012/0130458 A1 | 5/2012 | Ryba et al. |
| 2012/0136344 A1 | 5/2012 | Buckley et al. |
| 2012/0136346 A1 | 5/2012 | Condie et al. |
| 2012/0136348 A1 | 5/2012 | Condie et al. |
| 2012/0136417 A1 | 5/2012 | Buckley et al. |
| 2012/0136418 A1 | 5/2012 | Buckley et al. |
| 2012/0143177 A1 | 6/2012 | Avitall |
| 2012/0143179 A1 | 6/2012 | Avitall |
| 2012/0143181 A1 | 6/2012 | Demarais et al. |
| 2012/0143293 A1 | 6/2012 | Mauch et al. |
| 2012/0143294 A1 | 6/2012 | Clark et al. |
| 2012/0150267 A1 | 6/2012 | Buckley et al. |
| 2012/0157986 A1 | 6/2012 | Stone et al. |
| 2012/0157987 A1 | 6/2012 | Steinke et al. |
| 2012/0157988 A1 | 6/2012 | Stone et al. |
| 2012/0157992 A1 | 6/2012 | Smith et al. |
| 2012/0158101 A1 | 6/2012 | Stone et al. |
| 2012/0158104 A1 | 6/2012 | Huynh et al. |
| 2012/0172680 A1 | 7/2012 | Gelfand et al. |
| 2012/0172723 A1 | 7/2012 | Gertner |
| 2012/0191083 A1 | 7/2012 | Moll et al. |
| 2012/0197246 A1 | 8/2012 | Mauch |
| 2012/0209118 A1 | 8/2012 | Warnking |
| 2012/0221082 A1 | 8/2012 | Khanna |
| 2012/0232436 A1 | 9/2012 | Warnking |
| 2012/0238918 A1 | 9/2012 | Gertner |
| 2012/0245494 A1 | 9/2012 | Gertner |
| 2012/0253239 A1 | 10/2012 | Gertner et al. |
| 2012/0265198 A1 | 10/2012 | Crow et al. |
| 2012/0277781 A1 | 11/2012 | Gertner |
| 2012/0283756 A1 | 11/2012 | Moonly et al. |
| 2012/0303098 A1 | 11/2012 | Perryman |
| 2012/0310233 A1 | 12/2012 | Dimmer et al. |
| 2012/0310239 A1 | 12/2012 | Stewart et al. |
| 2012/0316451 A1 | 12/2012 | Province et al. |
| 2013/0006232 A1 | 1/2013 | Pellegrino et al. |
| 2013/0012866 A1 | 1/2013 | Deem et al. |
| 2013/0012867 A1 | 1/2013 | Demarais et al. |
| 2013/0023802 A1 | 1/2013 | McIntosh et al. |
| 2013/0035681 A1 | 2/2013 | Subramariam et al. |
| 2013/0035682 A1 | 2/2013 | Weil |
| 2013/0041424 A1 | 2/2013 | Neisz |
| 2013/0053732 A1 | 2/2013 | Heuser |
| 2013/0053792 A1 | 2/2013 | Fischell et al. |
| 2013/0053821 A1 | 2/2013 | Fischell et al. |
| 2013/0066308 A1 | 3/2013 | Landman |
| 2013/0066316 A1 | 3/2013 | Steinke et al. |
| 2013/0090563 A1 | 4/2013 | Weber |
| 2013/0090578 A1 | 4/2013 | Smith et al. |
| 2013/0090637 A1 | 4/2013 | Sliwa |
| 2013/0090647 A1 | 4/2013 | Smith |
| 2013/0090649 A1 | 4/2013 | Smith et al. |
| 2013/0090650 A1 | 4/2013 | Jenson et al. |
| 2013/0090651 A1 | 4/2013 | Smith |
| 2013/0096471 A1 | 4/2013 | Slayton et al. |
| 2013/0096550 A1 | 4/2013 | Hill |
| 2013/0096553 A1 | 4/2013 | Hill et al. |
| 2013/0096554 A1 | 4/2013 | Groff et al. |
| 2013/0110012 A1 | 5/2013 | Gertner |
| 2013/0110106 A1 | 5/2013 | Richardson |
| 2013/0116505 A1 | 5/2013 | Seidel |
| 2013/0116683 A1 | 5/2013 | Shadduck et al. |
| 2013/0116685 A1 | 5/2013 | Deem et al. |
| 2013/0116737 A1 | 5/2013 | Edwards et al. |
| 2013/0123770 A1 | 5/2013 | Smith |
| 2013/0144283 A1 | 6/2013 | Barman |
| 2013/0165921 A1 | 6/2013 | Sutermeister et al. |
| 2013/0165923 A1 | 6/2013 | Mathur et al. |
| 2013/0172875 A1 | 7/2013 | Govari et al. |
| 2013/0172877 A1 | 7/2013 | Subramaniam et al. |
| 2013/0172880 A1 | 7/2013 | Willard |
| 2013/0178910 A1 | 7/2013 | Azamian et al. |
| 2013/0184703 A1 | 7/2013 | Shireman et al. |
| 2013/0184789 A1 | 7/2013 | Stett et al. |
| 2013/0190716 A1 | 7/2013 | Gertner |
| 2013/0197499 A1 | 8/2013 | Lalonde et al. |
| 2013/0197555 A1 | 8/2013 | Schaer |
| 2013/0197614 A1 | 8/2013 | Gustus et al. |
| 2013/0211396 A1 | 8/2013 | Sverdlik et al. |
| 2013/0218029 A1 | 8/2013 | Cholette et al. |
| 2013/0225973 A1 | 8/2013 | Gertner |
| 2013/0231658 A1 | 9/2013 | Wang et al. |
| 2013/0231659 A1 | 9/2013 | Hill et al. |
| 2013/0237948 A1 | 9/2013 | Donders et al. |
| 2013/0245622 A1 | 9/2013 | Wang et al. |
| 2013/0253381 A1 | 9/2013 | Gertner |
| 2013/0253628 A1 | 9/2013 | Smith et al. |
| 2013/0274658 A1 | 10/2013 | Steinke et al. |
| 2013/0274730 A1 | 10/2013 | Anderson et al. |
| 2013/0274731 A1 | 10/2013 | Anderson et al. |
| 2013/0289678 A1 | 10/2013 | Clark et al. |
| 2013/0289686 A1 | 10/2013 | Masson et al. |
| 2013/0296965 A1 | 11/2013 | Mokelke et al. |
| 2013/0301054 A1 | 11/2013 | Zarins et al. |
| 2013/0304052 A1 | 11/2013 | Rizq et al. |
| 2013/0310823 A1 | 11/2013 | Gelfand et al. |
| 2013/0331739 A1 | 12/2013 | Gertner |
| 2013/0345670 A1 | 12/2013 | Rajagopalan et al. |
| 2014/0005591 A1 | 1/2014 | Melder et al. |
| 2014/0012251 A1 | 1/2014 | Himmelstein et al. |
| 2014/0012253 A1 | 1/2014 | Mathur |
| 2014/0018788 A1 | 1/2014 | Engelman et al. |
| 2014/0018794 A1 | 1/2014 | Anderson et al. |
| 2014/0025069 A1 | 1/2014 | Willard et al. |
| 2014/0031727 A1 | 1/2014 | Warnking |
| 2014/0039358 A1 | 2/2014 | Zhou et al. |
| 2014/0039479 A1 | 2/2014 | Gertner |
| 2014/0046313 A1 | 2/2014 | Pederson et al. |
| 2014/0058188 A1 | 2/2014 | Gertner |

(56) References Cited

U.S. PATENT DOCUMENTS

| | | |
|---|---|---|
| 2014/0058372 A1 | 2/2014 | Belson |
| 2014/0065107 A1 | 3/2014 | Lockwood et al. |
| 2014/0066915 A1 | 3/2014 | Zhou et al. |
| 2014/0067003 A1 | 3/2014 | Vase et al. |
| 2014/0067029 A1 | 3/2014 | Schauer et al. |
| 2014/0074076 A1 | 3/2014 | Gertner |
| 2014/0081254 A1 | 3/2014 | Rudie |
| 2014/0081301 A1 | 3/2014 | Tran et al. |
| 2014/0088575 A1 | 3/2014 | Loeb |
| 2014/0088584 A1 | 3/2014 | Royer et al. |
| 2014/0088585 A1 | 3/2014 | Hill et al. |
| 2014/0094688 A1 | 4/2014 | Tegg et al. |
| 2014/0094787 A1 | 4/2014 | Reynolds |
| 2014/0094789 A1 | 4/2014 | Brannan |
| 2014/0094797 A1 | 4/2014 | Brannan |
| 2014/0107482 A1 | 4/2014 | Warnking |
| 2014/0110296 A1 | 4/2014 | Terzibashian |
| 2014/0114215 A1 | 4/2014 | Melder et al. |
| 2014/0121537 A1 | 5/2014 | Aeby et al. |
| 2014/0121568 A1 | 5/2014 | Weng et al. |
| 2014/0128859 A1 | 5/2014 | Lee |
| 2014/0135715 A1 | 5/2014 | Lambert et al. |
| 2014/0163372 A1 | 6/2014 | Deladi et al. |
| 2014/0163540 A1 | 6/2014 | Iyer et al. |
| 2014/0163652 A1 | 6/2014 | Witzel et al. |
| 2014/0171936 A1 | 6/2014 | Govari et al. |
| 2014/0180196 A1 | 6/2014 | Stone et al. |
| 2014/0187619 A1 | 7/2014 | Pasricha et al. |
| 2014/0188103 A1 | 7/2014 | Millett |
| 2014/0194784 A1 | 7/2014 | Gertner |
| 2014/0194785 A1 | 7/2014 | Gertner |
| 2014/0194786 A1 | 7/2014 | Gertner et al. |
| 2014/0200478 A1 | 7/2014 | Phan et al. |
| 2014/0200489 A1 | 7/2014 | Behar et al. |
| 2014/0200578 A1 | 7/2014 | Groff et al. |
| 2014/0207136 A1 | 7/2014 | De la rama et al. |
| 2014/0213971 A1 | 7/2014 | Dolan et al. |
| 2014/0214018 A1 | 7/2014 | Behar et al. |
| 2014/0228713 A1 | 8/2014 | Thao et al. |
| 2014/0243807 A1 | 8/2014 | Margolis |
| 2014/0243809 A1 | 8/2014 | Gelfand et al. |
| 2014/0249524 A1 | 9/2014 | Kocur |
| 2014/0257266 A1 | 9/2014 | Kasprzyk et al. |
| 2014/0271717 A1 | 9/2014 | Goshayeshgar et al. |
| 2014/0275993 A1 | 9/2014 | Ballakur |
| 2014/0276707 A1 | 9/2014 | Jaax |
| 2014/0276752 A1 | 9/2014 | Wang et al. |
| 2014/0276756 A1 | 9/2014 | Hill |
| 2014/0276764 A1 | 9/2014 | Shuman et al. |
| 2014/0276787 A1 | 9/2014 | Wang et al. |
| 2014/0276789 A1 | 9/2014 | Dandler et al. |
| 2014/0276811 A1 | 9/2014 | Koblish et al. |
| 2014/0277310 A1 | 9/2014 | Beetel et al. |
| 2014/0288015 A1 | 9/2014 | Venkateswara-Rao |
| 2014/0296846 A1 | 10/2014 | Huszar et al. |
| 2014/0296902 A1 | 10/2014 | Huszar et al. |
| 2014/0303617 A1 | 10/2014 | Shimada |
| 2014/0309579 A1 | 10/2014 | Rubinsky et al. |
| 2014/0316254 A1 | 10/2014 | Eversull et al. |
| 2014/0316269 A1 | 10/2014 | Zhang et al. |
| 2014/0330068 A1 | 11/2014 | Partsch et al. |
| 2014/0336497 A1 | 11/2014 | Gertner |
| 2014/0336639 A1 | 11/2014 | Young et al. |
| 2014/0350327 A1 | 11/2014 | Poon et al. |
| 2014/0350551 A1 | 11/2014 | Raatikka et al. |
| 2014/0350553 A1 | 11/2014 | Okuyama |
| 2014/0358136 A1 | 12/2014 | Kelly et al. |
| 2014/0364715 A1 | 12/2014 | Hauck |
| 2014/0364848 A1 | 12/2014 | Heimbecher et al. |
| 2014/0378962 A1 | 12/2014 | Anderson et al. |
| 2014/0378966 A1 | 12/2014 | Haverkost et al. |
| 2014/0378967 A1 | 12/2014 | Willard et al. |
| 2014/0378968 A1 | 12/2014 | Sutermeister et al. |
| 2015/0005764 A1 | 1/2015 | Hanson et al. |
| 2015/0005766 A1 | 1/2015 | Rioux et al. |
| 2015/0018817 A1 | 1/2015 | Willard |
| 2015/0018818 A1 | 1/2015 | Willard et al. |
| 2015/0018819 A1 | 1/2015 | Sutermeister |
| 2015/0018820 A1 | 1/2015 | Cao et al. |
| 2015/0018821 A1 | 1/2015 | Zarins et al. |
| 2015/0018904 A1 | 1/2015 | Lafontaine |
| 2015/0025525 A1 | 1/2015 | Willard et al. |
| 2015/0025533 A1 | 1/2015 | Groff et al. |
| 2015/0025605 A1 | 1/2015 | Kaplan et al. |
| 2015/0045728 A1 | 2/2015 | Heuser |
| 2015/0045787 A1 | 2/2015 | Bloom |
| 2015/0051595 A1 | 2/2015 | Margolis |
| 2015/0057654 A1 | 2/2015 | Leung et al. |
| 2015/0057655 A1 | 2/2015 | Osypka |
| 2015/0057656 A1 | 2/2015 | Gupta et al. |
| 2015/0065783 A1 | 3/2015 | Buelna |
| 2015/0065945 A1 | 3/2015 | Zarins et al. |
| 2015/0066017 A1 | 3/2015 | Desai |
| 2015/0066023 A1 | 3/2015 | Anderson et al. |
| 2015/0066118 A1 | 3/2015 | O'Connell |
| 2015/0073409 A1 | 3/2015 | Anderson et al. |
| 2015/0080875 A1 | 3/2015 | Kasprzyk et al. |
| 2015/0080882 A1 | 3/2015 | Skinner et al. |
| 2015/0080883 A1 | 3/2015 | Haverkost et al. |
| 2015/0080926 A1 | 3/2015 | Emery |
| 2015/0094787 A1 | 4/2015 | Madhavan et al. |
| 2015/0105770 A1 | 4/2015 | Amit |
| 2015/0105772 A1 | 4/2015 | Hill et al. |
| 2015/0105773 A1 | 4/2015 | Weber et al. |
| 2015/0105774 A1 | 4/2015 | Lindquist et al. |
| 2015/0112234 A1 | 4/2015 | McCaffrey et al. |
| 2015/0112326 A1 | 4/2015 | Li |
| 2015/0112328 A1 | 4/2015 | Willard et al. |
| 2015/0112329 A1 | 4/2015 | Ng |
| 2015/0112331 A1 | 4/2015 | Olson et al. |
| 2015/0119870 A1 | 4/2015 | Rudie |
| 2015/0119875 A1 | 4/2015 | Fischell et al. |
| 2015/0119876 A1 | 4/2015 | Willard |
| 2015/0119877 A1 | 4/2015 | Jameson |
| 2015/0119878 A1 | 4/2015 | Heisel et al. |
| 2015/0119882 A1 | 4/2015 | Cao et al. |
| 2015/0126992 A1 | 5/2015 | Mogul |
| 2015/0126996 A1 | 5/2015 | Tegg |
| 2015/0126997 A1 | 5/2015 | Beetel et al. |
| 2015/0141785 A1 | 5/2015 | Hayam et al. |
| 2015/0141978 A1 | 5/2015 | Subramaniam et al. |
| 2015/0141982 A1 | 5/2015 | Lee |
| 2015/0141985 A1 | 5/2015 | Mayse et al. |
| 2015/0148794 A1 | 5/2015 | Squire et al. |
| 2015/0150624 A1 | 6/2015 | Petersohn |
| 2015/0151077 A1 | 6/2015 | Harrington |
| 2015/0157382 A1 | 6/2015 | Avitall et al. |
| 2015/0157400 A1 | 6/2015 | Gelbart et al. |
| 2015/0157401 A1 | 6/2015 | Falwell et al. |
| 2015/0157402 A1 | 6/2015 | Kunis et al. |
| 2015/0157831 A1 | 6/2015 | Crall et al. |
| 2015/0173830 A1 | 6/2015 | Johnson et al. |
| 2015/0190194 A1 | 7/2015 | Weber et al. |
| 2015/0190195 A1 | 7/2015 | Hanson et al. |
| 2015/0196354 A1 | 7/2015 | Haverkost et al. |
| 2015/0196356 A1 | 7/2015 | Kauphusman et al. |
| 2015/0196783 A1 | 7/2015 | Emery et al. |
| 2015/0202466 A1 | 7/2015 | Gertner |
| 2015/0209107 A1 | 7/2015 | Rudie et al. |
| 2015/0216561 A1 | 8/2015 | Cao et al. |
| 2015/0223866 A1 | 8/2015 | Buelna et al. |
| 2015/0223877 A1 | 8/2015 | Behar et al. |
| 2015/0224089 A1 | 8/2015 | Saltiel |
| 2015/0230859 A1 | 8/2015 | Mauch |
| 2015/0238247 A1 | 8/2015 | Shikhman et al. |
| 2015/0238249 A1 | 8/2015 | Edmunds et al. |
| 2015/0238251 A1 | 8/2015 | Shikhman et al. |
| 2015/0251008 A1 | 9/2015 | Rezai et al. |
| 2015/0257825 A1 | 9/2015 | Kelly et al. |
| 2015/0257929 A1 | 9/2015 | Brian, III et al. |
| 2015/0265334 A1 | 9/2015 | Franke et al. |
| 2015/0265339 A1 | 9/2015 | Lindquist et al. |
| 2015/0290427 A1 | 10/2015 | Warnking |
| 2015/0297281 A1 | 10/2015 | Sutermeister et al. |

(56) References Cited

U.S. PATENT DOCUMENTS

| | | |
|---|---|---|
| 2015/0297292 A1 | 10/2015 | Sutermeister et al. |
| 2015/0327923 A1 | 11/2015 | Just et al. |
| 2015/0335263 A1 | 11/2015 | Srivastava |
| 2015/0342491 A1 | 12/2015 | Marecki et al. |
| 2015/0342673 A1 | 12/2015 | Squire et al. |
| 2015/0342675 A1 | 12/2015 | Highsmith |
| 2015/0351652 A1 | 12/2015 | Marecki et al. |
| 2015/0359432 A1 | 12/2015 | Ehrenreich et al. |
| 2015/0359589 A1 | 12/2015 | Mauch et al. |
| 2015/0366508 A1 | 12/2015 | Chou et al. |
| 2015/0366608 A1 | 12/2015 | Weber et al. |
| 2015/0374427 A1 | 12/2015 | Goertzen et al. |
| 2016/0000498 A1 | 1/2016 | Zarins et al. |
| 2016/0008024 A1 | 1/2016 | Payne et al. |
| 2016/0008066 A1 | 1/2016 | Kaplan et al. |
| 2016/0016016 A1 | 1/2016 | Taylor et al. |
| 2016/0022353 A1 | 1/2016 | Forsyth et al. |
| 2016/0030773 A1 | 2/2016 | Burdette |
| 2016/0033144 A1 | 2/2016 | Larson |
| 2016/0045121 A1 | 2/2016 | Akingba et al. |
| 2016/0045257 A1 | 2/2016 | Fischell et al. |
| 2016/0051321 A1 | 2/2016 | Salahieh et al. |
| 2016/0058502 A1 | 3/2016 | Clark et al. |
| 2016/0058503 A1 | 3/2016 | Tunev et al. |
| 2016/0058505 A1 | 3/2016 | Condie et al. |
| 2016/0059044 A1 | 3/2016 | Gertner |
| 2016/0066988 A1 | 3/2016 | Chang et al. |
| 2016/0066992 A1 | 3/2016 | Mathur |
| 2016/0074112 A1 | 3/2016 | Himmelstein et al. |
| 2016/0074677 A1 | 3/2016 | Gertner |
| 2016/0081746 A1 | 3/2016 | Solis |
| 2016/0095642 A1 | 4/2016 | Deno et al. |
| 2016/0095656 A1 | 4/2016 | Peled et al. |
| 2016/0106984 A1 | 4/2016 | Mathur et al. |
| 2016/0113713 A1 | 4/2016 | Ku et al. |
| 2016/0128767 A1 | 5/2016 | Azamian et al. |
| 2016/0129223 A1 | 5/2016 | Kirschenman |
| 2016/0135878 A1 | 5/2016 | Warner et al. |
| 2016/0135879 A1 | 5/2016 | Beasley et al. |
| 2016/0143696 A1 | 5/2016 | Govari et al. |
| 2016/0175041 A1 | 6/2016 | Abunassar et al. |
| 2016/0175044 A1 | 6/2016 | Abunassar et al. |
| 2016/0184011 A1 | 6/2016 | Krishnan |
| 2016/0199116 A1 | 7/2016 | Jameson et al. |
| 2016/0199127 A1 | 7/2016 | Prutchi |
| 2016/0213262 A1 | 7/2016 | Ghaffari et al. |
| 2016/0223704 A1 | 8/2016 | Haverkost et al. |
| 2016/0249978 A1 | 9/2016 | Lee et al. |
| 2016/0256683 A1 | 9/2016 | Butera et al. |
| 2016/0262833 A1 | 9/2016 | Rudie |
| 2016/0278853 A1 | 9/2016 | Ogle et al. |
| 2016/0287114 A1 | 10/2016 | Srivastava |
| 2016/0296747 A1 | 10/2016 | Glenn et al. |
| 2016/0331294 A1 | 11/2016 | Imran et al. |
| 2016/0331459 A1 | 11/2016 | Townley et al. |
| 2016/0335263 A1 | 11/2016 | Yin et al. |
| 2016/0367316 A1 | 12/2016 | Smith et al. |
| 2016/0374754 A1 | 12/2016 | Asirvatham et al. |
| 2016/0375235 A1 | 12/2016 | Schoenle et al. |
| 2017/0000560 A1 | 1/2017 | Mathur et al. |
| 2017/0007157 A1 | 1/2017 | Gross et al. |
| 2017/0007810 A1 | 1/2017 | Parsons et al. |
| 2017/0014639 A1 | 1/2017 | Preston et al. |
| 2017/0035341 A1 | 2/2017 | Nagale et al. |
| 2017/0035497 A1 | 2/2017 | Nagale et al. |
| 2017/0042613 A1 | 2/2017 | Schultheis et al. |
| 2017/0049503 A1 | 2/2017 | Cosman |
| 2017/0049513 A1 | 2/2017 | Cosman, Jr. et al. |
| 2017/0049989 A1 | 2/2017 | Kapural |
| 2017/0056087 A1 | 3/2017 | Buckley et al. |
| 2017/0056105 A1 | 3/2017 | Steinke et al. |
| 2017/0065327 A1 | 3/2017 | Joyner et al. |
| 2017/0065818 A1 | 3/2017 | Ransbury et al. |
| 2017/0086907 A1 | 3/2017 | Satake |
| 2017/0105871 A1 | 4/2017 | Nierich |
| 2017/0112564 A1 | 4/2017 | Joyner et al. |
| 2017/0128129 A1 | 5/2017 | Kelly et al. |
| 2017/0135758 A1 | 5/2017 | Danek et al. |
| 2017/0143405 A1 | 5/2017 | Rooks et al. |
| 2017/0143412 A1 | 5/2017 | O'Fallon |
| 2017/0143421 A1 | 5/2017 | Mayse et al. |
| 2017/0157366 A1 | 6/2017 | Assif et al. |
| 2017/0164999 A1 | 6/2017 | Hettel |
| 2017/0189642 A1 | 7/2017 | Masson et al. |
| 2017/0231694 A1 | 8/2017 | Mathur et al. |
| 2017/0252560 A1 | 9/2017 | Imran |
| 2017/0259057 A1 | 9/2017 | Muessig et al. |
| 2017/0296254 A1 | 10/2017 | Mitsumune et al. |
| 2017/0296264 A1 | 10/2017 | Wang |
| 2017/0311829 A1 | 11/2017 | Beeckler et al. |
| 2017/0311893 A1 | 11/2017 | Beeckler et al. |
| 2017/0312026 A1 | 11/2017 | Harlev et al. |
| 2017/0312029 A1 | 11/2017 | Schaer |
| 2017/0333123 A1 | 11/2017 | Liu |
| 2017/0340383 A1 | 11/2017 | Bloom et al. |
| 2017/0354449 A1 | 12/2017 | Avitall et al. |
| 2017/0354462 A1 | 12/2017 | Dong et al. |
| 2017/0354463 A1 | 12/2017 | Mori |
| 2018/0028264 A1 | 2/2018 | Onik et al. |
| 2018/0036072 A1 | 2/2018 | Mathur et al. |
| 2018/0036073 A1 | 2/2018 | Kaplan et al. |
| 2018/0036075 A1 | 2/2018 | Gelbart et al. |
| 2018/0036076 A1 | 2/2018 | Gelbart et al. |
| 2018/0036077 A1 | 2/2018 | Gelbart et al. |
| 2018/0056074 A1 | 3/2018 | Clark et al. |
| 2018/0103992 A1 | 4/2018 | Guyuron |
| 2018/0153467 A1 | 6/2018 | Lichtenstein et al. |
| 2018/0154155 A1 | 6/2018 | Keaveney et al. |
| 2018/0177549 A1 | 6/2018 | Harrington et al. |
| 2018/0344517 A1 | 12/2018 | Nofzinger |
| 2019/0053847 A1 | 2/2019 | Tandri et al. |
| 2019/0069949 A1 | 3/2019 | Vrba et al. |
| 2019/0175243 A1 | 6/2019 | Keweloh |
| 2019/0223754 A1 | 7/2019 | Gunasekaran et al. |
| 2019/0274687 A1 | 9/2019 | Wang et al. |
| 2019/0307507 A1 | 10/2019 | Wang |
| 2019/0329042 A1 | 10/2019 | DiLorenzo |
| 2019/0343579 A1 | 11/2019 | Tandri et al. |
| 2019/0366130 A1 | 12/2019 | Sverdlik et al. |
| 2019/0388147 A1 | 12/2019 | Wang |
| 2020/0009355 A1 | 1/2020 | Wang et al. |
| 2020/0016379 A1 | 1/2020 | Wang et al. |
| 2020/0038096 A1 | 2/2020 | Schepis et al. |
| 2020/0046552 A1 | 2/2020 | Velis et al. |
| 2020/0046996 A1 | 2/2020 | Jo et al. |
| 2020/0069366 A1 | 3/2020 | Clark et al. |
| 2020/0086093 A1 | 3/2020 | Wang |
| 2020/0121357 A1 | 4/2020 | Gomez et al. |
| 2020/0121961 A1 | 4/2020 | Taylor et al. |
| 2020/0170702 A1 | 6/2020 | Warnking |
| 2020/0197088 A1 | 6/2020 | Vrba et al. |
| 2020/0215266 A1 | 7/2020 | Koya et al. |
| 2020/0238107 A1 | 7/2020 | Shabtay et al. |
| 2020/0253192 A1 | 8/2020 | Jiang et al. |
| 2020/0268536 A1 | 8/2020 | DiLorenzo |
| 2020/0306496 A1 | 10/2020 | Radha et al. |
| 2020/0315700 A1 | 10/2020 | Petitpierre et al. |
| 2020/0337765 A1 | 10/2020 | Smith |
| 2020/0360671 A1 | 11/2020 | Wang et al. |
| 2020/0368528 A1 | 11/2020 | Sridhar et al. |
| 2020/0368531 A1 | 11/2020 | Sridhar et al. |
| 2020/0375658 A1 | 12/2020 | Qian et al. |
| 2020/0397804 A1 | 12/2020 | Hellstrom |
| 2020/0398032 A1 | 12/2020 | Wang et al. |
| 2021/0007799 A1 | 1/2021 | Tajima et al. |
| 2021/0022948 A1 | 1/2021 | Musallam |
| 2021/0023375 A1 | 1/2021 | Holland et al. |
| 2021/0045711 A1 | 2/2021 | Brattain et al. |
| 2021/0093378 A1 | 4/2021 | Mori |
| 2021/0128051 A1 | 5/2021 | Li et al. |
| 2021/0146136 A1 | 5/2021 | Waataja et al. |
| 2021/0205013 A1 | 7/2021 | Meyer et al. |
| 2021/0205501 A1 | 7/2021 | Bright |
| 2021/0251681 A1 | 8/2021 | Salahieh et al. |

(56) References Cited

U.S. PATENT DOCUMENTS

| | | |
|---|---|---|
| 2021/0275241 A1 | 9/2021 | Fahey et al. |
| 2021/0275784 A1 | 9/2021 | Wang |
| 2021/0275785 A1 | 9/2021 | Wang |
| 2021/0275786 A1 | 9/2021 | Wang |
| 2021/0275787 A1 | 9/2021 | Wang |
| 2021/0275810 A1 | 9/2021 | Caban |
| 2021/0301306 A1 | 9/2021 | Kaplitt et al. |
| 2021/0315638 A1 | 10/2021 | Townley et al. |
| 2021/0322718 A1 | 10/2021 | DiLorenzo |
| 2021/0322769 A1 | 10/2021 | Kim |
| 2021/0330977 A1 | 10/2021 | Sinha |
| 2021/0346625 A1 | 11/2021 | Rezai et al. |
| 2021/0369337 A1 | 12/2021 | Aklog et al. |
| 2021/0370066 A1 | 12/2021 | Caban et al. |
| 2022/0031389 A1 | 2/2022 | Fischell et al. |
| 2022/0054163 A1 | 2/2022 | Mansell |
| 2022/0096318 A1 | 3/2022 | Harper et al. |
| 2022/0104866 A1 | 4/2022 | Townley et al. |
| 2022/0126062 A1 | 4/2022 | Warnking |
| 2022/0151674 A1 | 5/2022 | Sharma |
| 2022/0152394 A1 | 5/2022 | Levin |
| 2022/0202483 A1 | 6/2022 | Gertner |
| 2022/0233856 A1 | 7/2022 | Gupta et al. |
| 2022/0233860 A1 | 7/2022 | Hamner et al. |
| 2022/0241590 A1 | 8/2022 | Gupta et al. |
| 2022/0249840 A1 | 8/2022 | Gupta et al. |
| 2022/0257298 A1 | 8/2022 | Fox et al. |
| 2022/0265302 A1 | 8/2022 | Thirumalai et al. |
| 2022/0265339 A1 | 8/2022 | Yin et al. |
| 2022/0296884 A1 | 9/2022 | Jeong et al. |
| 2022/0305259 A1 | 9/2022 | Gupta et al. |
| 2022/0305268 A1 | 9/2022 | Hassan et al. |
| 2022/0313995 A1 | 10/2022 | Cakmak |
| 2022/0347470 A1 | 11/2022 | Lai et al. |
| 2022/0378461 A1 | 12/2022 | Cheung et al. |
| 2022/0386935 A1 | 12/2022 | Yung et al. |
| 2023/0000564 A1 | 1/2023 | Rapoport et al. |
| 2023/0040877 A1 | 2/2023 | Reo et al. |
| 2023/0052520 A1 | 2/2023 | Mattison et al. |
| 2023/0054079 A1 | 2/2023 | Lakshmi |
| 2023/0062487 A1 | 3/2023 | Claude et al. |
| 2023/0140990 A1 | 5/2023 | Puleo et al. |
| 2023/0181245 A1 | 6/2023 | Cao et al. |
| 2023/0181251 A1 | 6/2023 | Melder et al. |
| 2023/0200637 A1 | 6/2023 | Hakimimehr et al. |
| 2023/0203582 A1 | 6/2023 | Snyder et al. |
| 2023/0218432 A1 | 7/2023 | Chabal et al. |
| 2023/0225791 A1 | 7/2023 | van der Horst |
| 2023/0233095 A1 | 7/2023 | Cezo |
| 2023/0233135 A1 | 7/2023 | Cezo et al. |
| 2023/0233251 A1 | 7/2023 | Cezo et al. |
| 2023/0255676 A1 | 8/2023 | Donovan et al. |
| 2023/0256252 A1 | 8/2023 | Brandner et al. |
| 2023/0277076 A1 | 9/2023 | Cezo |
| 2023/0277233 A1 | 9/2023 | Spranger et al. |
| 2023/0293229 A1 | 9/2023 | Barman et al. |
| 2023/0301700 A1 | 9/2023 | Nahama |
| 2023/0302301 A1 | 9/2023 | Sobotka et al. |
| 2023/0338083 A1 | 10/2023 | Nollert et al. |
| 2023/0338744 A1 | 10/2023 | Demazumder et al. |
| 2023/0389852 A1 | 12/2023 | Zhai |
| 2023/0414160 A1 | 12/2023 | Zhai et al. |
| 2024/0032801 A1 | 2/2024 | Coates et al. |
| 2024/0091387 A1 | 3/2024 | Berman |
| 2024/0099988 A1 | 3/2024 | Buelna |
| 2024/0130772 A1 | 4/2024 | Azamian et al. |
| 2024/0130773 A1 | 4/2024 | Azamian et al. |
| 2024/0130774 A1 | 4/2024 | Azamian et al. |
| 2024/0138896 A1 | 5/2024 | Azamian et al. |
| 2024/0173061 A1 | 5/2024 | Azamian et al. |
| 2024/0173062 A1 | 5/2024 | Azamian et al. |
| 2024/0206939 A1 | 6/2024 | Azamian et al. |
| 2024/0206968 A1 | 6/2024 | Smith et al. |
| 2024/0261016 A1 | 8/2024 | Azamian et al. |
| 2024/0261017 A1 | 8/2024 | Azamian et al. |
| 2024/0325078 A1 | 10/2024 | Azamian et al. |
| 2024/0325079 A1 | 10/2024 | Azamian et al. |
| 2024/0325080 A1 | 10/2024 | Smith |

FOREIGN PATENT DOCUMENTS

| | | |
|---|---|---|
| EP | 1233718 B1 | 8/2006 |
| EP | 1485034 B1 | 5/2009 |
| EP | 3023052 A1 | 5/2016 |
| EP | 3023069 A1 | 5/2016 |
| EP | 3040042 A1 | 7/2016 |
| JP | 2001037868 | 2/2001 |
| JP | 2009554123 | 9/2009 |
| JP | 2011518615 | 6/2011 |
| JP | 6076937 B2 | 2/2017 |
| RU | 2277381 C2 | 6/2006 |
| RU | 2421163 | 6/2011 |
| UA | 52875 U | 9/2010 |
| WO | 9302743 | 2/1993 |
| WO | 0010475 A1 | 3/2000 |
| WO | 0019992 A1 | 4/2000 |
| WO | 02007601 | 1/2002 |
| WO | 02070039 A2 | 9/2002 |
| WO | 2004112883 A2 | 12/2004 |
| WO | 2005023081 A2 | 3/2005 |
| WO | 2006029257 | 3/2006 |
| WO | 2007015139 | 2/2007 |
| WO | 2007018788 | 2/2007 |
| WO | 2007121424 A2 | 10/2007 |
| WO | 2008151001 A2 | 12/2008 |
| WO | 2009082569 | 7/2009 |
| WO | 2009090440 | 7/2009 |
| WO | 2009137819 | 11/2009 |
| WO | 2009149390 | 12/2009 |
| WO | 2010022071 A2 | 2/2010 |
| WO | 2010111400 | 9/2010 |
| WO | 2011046880 | 4/2011 |
| WO | 2011057157 | 5/2011 |
| WO | 2011060200 A1 | 5/2011 |
| WO | 2011130531 | 10/2011 |
| WO | 2011139589 | 11/2011 |
| WO | 2012002877 | 1/2012 |
| WO | 2012019156 | 2/2012 |
| WO | 2012025245 | 3/2012 |
| WO | 2012025246 | 3/2012 |
| WO | 2012061159 A1 | 5/2012 |
| WO | 2012099974 | 7/2012 |
| WO | 2012149205 | 11/2012 |
| WO | 2013086461 A1 | 6/2013 |
| WO | 2013111136 A2 | 8/2013 |
| WO | 2013130655 | 9/2013 |
| WO | 2013134133 | 9/2013 |
| WO | 2013134469 A1 | 9/2013 |
| WO | 2013134479 | 9/2013 |
| WO | 2013134541 | 9/2013 |
| WO | 2013134543 | 9/2013 |
| WO | 2013159066 | 10/2013 |
| WO | 2013162722 | 10/2013 |
| WO | 2014022436 | 2/2014 |
| WO | 2014026055 | 2/2014 |
| WO | 2014055997 | 4/2014 |
| WO | 2014091401 A2 | 6/2014 |
| WO | 2014102756 | 7/2014 |
| WO | 2014102760 | 7/2014 |
| WO | 2014176785 A1 | 11/2014 |
| WO | 2014197625 | 12/2014 |
| WO | 2015069446 | 5/2015 |
| WO | 2015069887 | 5/2015 |
| WO | 2015119624 A1 | 8/2015 |
| WO | 2015170281 | 11/2015 |
| WO | 2015183952 | 12/2015 |
| WO | 2015187386 | 12/2015 |
| WO | 2015191938 | 12/2015 |
| WO | 2016007851 | 1/2016 |
| WO | 2016054379 A1 | 4/2016 |
| WO | 2016075536 | 5/2016 |
| WO | 2016084081 | 6/2016 |
| WO | 2016090175 A1 | 6/2016 |
| WO | 2016118934 | 7/2016 |

(56) References Cited

FOREIGN PATENT DOCUMENTS

| | | |
|---|---|---|
| WO | 2016123390 | 8/2016 |
| WO | 2016151595 | 9/2016 |
| WO | 2016179527 | 11/2016 |
| WO | 2016183468 | 11/2016 |
| WO | 2016205431 | 12/2016 |
| WO | 2017062753 | 4/2017 |
| WO | 2017085102 | 5/2017 |
| WO | 2017095689 | 6/2017 |
| WO | 2017103105 | 6/2017 |
| WO | 2017118986 | 7/2017 |
| WO | 2017146660 A1 | 8/2017 |
| WO | 2017194557 | 11/2017 |
| WO | 2017203380 | 11/2017 |
| WO | 2020046839 A1 | 3/2020 |
| WO | 2020250417 A1 | 12/2020 |
| WO | 2021033275 A1 | 2/2021 |
| WO | 2021068471 A1 | 4/2021 |
| WO | 2021097448 A1 | 5/2021 |
| WO | 2021140421 A1 | 7/2021 |
| WO | 2021242231 A1 | 12/2021 |
| WO | 2022011222 A1 | 1/2022 |
| WO | 2022221452 A1 | 4/2022 |
| WO | 2022139971 A1 | 6/2022 |
| WO | 2022169712 A1 | 8/2022 |
| WO | 2022170275 A1 | 8/2022 |
| WO | 2022204008 A1 | 9/2022 |
| WO | 2022215760 A1 | 10/2022 |
| WO | 2022266327 A1 | 10/2022 |
| WO | 2022237233 A1 | 11/2022 |
| WO | 2022256218 A1 | 12/2022 |
| WO | 2022266261 A1 | 12/2022 |
| WO | 2022269617 A2 | 12/2022 |
| WO | 2023282396 A1 | 1/2023 |
| WO | 2023283568 A1 | 1/2023 |
| WO | 2023020544 A1 | 2/2023 |
| WO | 2023025590 A1 | 3/2023 |
| WO | 2023031056 A1 | 3/2023 |
| WO | 2023031802 A1 | 3/2023 |
| WO | 2023070128 A1 | 4/2023 |
| WO | 2023097261 A1 | 6/2023 |
| WO | 2023105061 A1 | 6/2023 |
| WO | 2023167343 A1 | 9/2023 |
| WO | 2023187510 A1 | 10/2023 |
| WO | 2023201415 A1 | 10/2023 |
| WO | 2023205654 A2 | 10/2023 |
| WO | 2023221710 A1 | 11/2023 |
| WO | 2023224382 A1 | 11/2023 |
| WO | 2023225084 A1 | 11/2023 |
| WO | 2023235474 A1 | 12/2023 |
| WO | 2023240154 A2 | 12/2023 |
| WO | 2023250370 A1 | 12/2023 |
| WO | 2023250426 A1 | 12/2023 |
| WO | 2024019391 A1 | 1/2024 |
| WO | 2024042216 A1 | 2/2024 |
| WO | 2024046967 A1 | 3/2024 |
| WO | 2024056505 A1 | 3/2024 |
| WO | 2024068920 A1 | 4/2024 |

OTHER PUBLICATIONS

Adkins-Marshall et al., "Role of hepatic nerves in response of liver to intraportal glucose delivery in dogs", The American Journal of Physiology - Endocrinology and Metabolism, vol. 262, No. 5, the American Physiological Society, May 1992, Pages E679-E686, doi.org/10.1152/ajpendo.1992.262.5.E679.

Advisory Action from U.S. Appl. No. 18/312,248 dated Jan. 29, 2025, 2 pp.

Agah et al., "Rate Process Model for Arterial Tissue Thermal Damage: Implications on Vessel Photocagulation", Lasers in Surgery and Medicine, vol. 15, Wiley-Liss, Inc., Jan. 1992, pp. 176-184.

Anderson et al., "Hyperinsulinemia Produces both Sympathetic Neural Activation and Vasodilation in Normal Humans", Journal of Clinical Investigation, vol. 87, No. 6, Jun. 1, 1991, pp. 2246-2252.

Anil et al., "Feeding in Sheep During Intraportal Infusions of Short-Chain Fatty Acids in the Effect of Liver Denervation", The Journal of Physiology, vol. 298, The Physiological Society, Apr. 12, 1979, pp. 407-416, doi: 10.1113/jphysiol.1980.sp013090.

Atherton et al., "Micro-anatomy of the Renal Sympathetic Nervous System: A Human Postmortem Histologic Study", Clinical Anatomy, vol. 25, No. 5, Whiley Periodicals Inc., Oct. 4, 2011, pp. 628-633.

Aytac et al., "Correlation Between the Diameter of the Main Renal Artery and the Presence of an Accessory Renal Artery", Journal of Ultrasound in Medicine, vol. 22, No. 5, American Institute of Ultrasound in Medicine, Jan. 7, 2003, pp. 433-439.

Bergman et al., "Direct enhancement of insulin secretion by vagal stimulation of the isolated pancreas", American Journal of Physiology, vol. 225, No. 2, Aug. 1, 1973, pp. 481-486.

Bernal-Mizrachi et al., "An Afferent Vagal Nerve Pathway Links Hepatic PPARa Activation to Glucocorticoid-Induced Insulin Resistance and Hypertension", Cell Metabolism, vol. 5, No. 2, Elsevier Inc., Feb. 7, 2007, pp. 91-102.

Berthoud et al., "Anatomy and Function of Sensory Hepatic Nerves", The Anatomical Record Part A, vol. 280A, No. 1, Wiley-Liss, Inc., Apr. 2004, pp. 827-835.

Berthoud et al., "Evidence for a role of the gastric, coeliac and hepatic branches in vagally stimulated insulin secretion in the rat", Journal of the Autonomic Nervous System, vol. 7, No. 2, Elsevier Biomedical Press, Feb. 1, 1983, pp. 97-110.

Borrelli et al., "Time-Temperature Analysis of Cell Killing of BHK Cells Heated at Temperatures in the Range of 43.5C to 57.0C", International Journal of Radiation Oncology, Biology and Physics, vol. 19, No. 2, Pergamon Press plc, Aug. 1, 1990, pp. 389-399.

Brace et al., "Temperature-dependent dielectric properties of liver tissue measured during thermal ablation: Toward an improved numerical model", 30th Annual International IEEE EMBS Conference, IEEE, Aug. 20, 2008, pp. 230-233.

Brandt et al., "Renal Sympathetic Denervation Reduces Left Ventricular Hypertrophy and Improves Cardiac Function in Patients With Resistant Hypertension", Journal of the American College of Cardiology, vol. 59, No. 10, Mar. 6, 2012, pp. 901-909.

Brashers-Krug et al., "Understanding Oral Diabetes Medications", Mar. 2, 2008, 5 pp., Retrieved from the Internet on Oct. 4, 2024 from URL: https://nfb.org/images/nfb/publications/vod/vod_22_4/vodfal0712.htm.

Bruce et al., "The effects of sympathetic nervous system activation and psychological stress on glucose metabolism and blood pressure in subjects with Type 2 (non-insulin-dependent) diabetes mellitus", Diabetologia, vol. 35, Springer-Verlag, Sep. 1992, pp. 835-843.

Bruinstroop et al., "Hypothalamic neuropeptide Y (NPY) controls hepatic VLDL-triglyceride secretion in rats via the sympathetic nervous system", Diabetes, vol. 61, No. 5, American Diabetes Association, May 1, 2012, pp. 1043-1050.

Buch et al., "A Novel Method to Prevent Phrenic Nerve Injury During Catheter Ablation", Heart Rhythm, vol. 4, No. 1, Jan. 2007, pp. 95-98.

Buijs et al., "The Suprachiasmatic Nucleus Balances Sympathetic and Parasympathetic Output to Peripheral Organs through Separate Preautonomic Neurons", Journal of Comparative Neurology, vol. 464, No. 1, Wiley-Liss, Inc., Sep. 8, 2003, pp. 36-48.

Bunch et al., "Mechanisms of Phrenic Nerve Injury During Radiofrequency Ablation at the Pulmonary Vein Orifice", Journal of Cardiovascular Electrophysiology, vol. 16, No. 12, Apr. 13, 2005, pp. 1318-1325.

Burdio et al., "Research and development of a new RF-assisted device for bloodless rapid transection of the liver: Computational modeling and in vivo experiments", BioMedical Engineering Online, vol. 8, No. 6, Mar. 18, 2009, 10 pp.

Cailotto et al., "The suprachiasmatic nucleus controls the daily variation of plasma glucose via the autonomic output to the liver: are the clock genes involved?", European Journal of Neuroscience, vol. 22, Federation of European Neuroscience Societies, Aug. 24, 2005, pp. 2531-2540.

Cardin et al., "Effect of hepatic vagotomy on hormonal response to exercise in gluconeogenesis-inhibited rats", American Journal of

(56) References Cited

OTHER PUBLICATIONS

Physiology—Regulatory Integrative Comparative Physiology, vol. 260, No. 1, American Physiological Society, Jan. 1, 1991, pp. R67-R72.

Cardin et al., "Involvement of the vagus nerves in the regulation of basal hepatic glucose production in conscious dogs", American Journal of Physiology—Endocrinology and Metabolism, vol. 283, Jun. 24, 2002, pp. E958-E964.

Carlson et al., "Hepatic Denervation Chronically Elevates Arterial Pressure in Wistar-Kyoto Rats", AHA Journals, American Heart Association, Inc., Feb. 6, 1998, pp. 46-51, URL: https://www.ahajournals.org/doi/10.1161/01.HYP.32.1.46.

Carnethon et al., "Prospective Investigation of Autonomic Nervous System Function and the Development of Type 2 Diabetes", Circulation, vol. 107, May 6, 2003, pp. 2190-2195.

Chang et al., "Thermal modeling of lesion growth with radiofrequency ablation", BioMedical Engineering Online, vol. 3, No. 27, Springer, Aug. 6, 2004, 19 pp.

Chen et al., "Development and application of rodent models for type 2 diabetes", Diabetes, Obesity and Metabolism, vol. 7, No. 4, Blackwell Publishing Ltd, Jul. 2007, pp. 307-317.

Chen et al., "Hepatic electrical stimulation reduces blood glucose in diabetic rats", Neurogatroentology & Motility, vol. 22, No. 10, Blackwell Publishing Ltd, May 31, 2010, pp. 1109-e286.

Cheng et al., "Optimal power deposition patterns for ideal high temperature therapy/hyperthermia treatments", International Journal of Hyperthermia, vol. 20, No. 1, Taylor&Francis, Feb. 2004, pp. 57-72.

Cherrington, "Banting Lecture 1997: Control of Glucose Uptake and Release by the Liver in Vivo", Diabetes, vol. 48, May 1999, pp. 1198-1214.

Chida et al., "The hepatic sympathetic nerve plays a critical role in preventing Fas induced liver injury in mice", National Library of Medicine, vol. 54, No. 7, Mar. 10, 2005, pp. 994-1002, Retrieved from the Internet on Jan. 2, 2024 from URL:https://www.ncbi.nlm.nih.gov/pmc/articles/PMC1774625/pdf/gut05400994.pdf.

Chinushi et al., "Blood Pressure and Autonomic Responses to Electrical Stimulation of the Renal Arterial Nerves Before and After Ablation of the Renal Artery", Hypertension, vol. 61, No. 2, Feb. 2013, pp. 450-456.

Coad et al., "Thermal Tissue Injury and Host response: A pathologist Perspective", Slide Presentation, Mar. 2008, pp. 135-138, Reference was previously cited on U.S. Appl. No. 17/108,351.

Coate et al., "Chronic Consumption of a High-Fat/High Fructose Diet Renders the Liver Incapable of Net Hepatic Glucose Uptake", American Journal of Physiology-Endocrinology and Metabolism, vol. 299, No. 6, Sep. 7, 2010, pp. E887-E898.

Coker et al., "Glucoregulation During Exercise: The Role of the Neuroendocrine System", Sports Medicine, vol. 35, No. 7, Adis Data Information BV, Sep. 2005, pp. 575-583.

Colle et al., "Transplanted Liver: Consequences of Denervation for Liver Functions", American Association for Anatomy, vol. 280, No. 1, John Wiley & Sons, Inc., Aug. 24, 2004, pp. 924-931, URL:https://anatomypubs.onlinelibrary.wiley.com/doi/pdfdirect/10.1002/ar.a.20097.

Consiglieri et al., "Theoretical analysis of the heat convection coefficient in large vessels and the significance for thermal ablative therapies", Physics in Medicine and Biology, vol. 487, Institute of Physics Publishing, Dec. 5, 2003, pp. 4125-4134.

Dancygier et al., "Clinical hepatology: Principles and practice of hepatobiliary diseases", vol. 44, No. 9, Springer, Oct. 2010, 1 pp.

Davies et al., "First-in-man safety evaluation of renal denervation for chronic systolic heart failure: Primary outcome from REACH-Pilot study", International Journal of Cardiology, vol. 162, No. 3, Elsevier Ireland Ltd., Sep. 9, 2012, pp. 189-192.

Defronzo et al., "From the Trumvirate to the Ominous Octet: A New Paradigm for the Treatment of Type 2 Diabetes Mellitus", Diabetes, vol. 58, Apr. 2009, pp. 773-795.

Despa et al., "The relative thermal stability of issue macromolecules and cellular structure in burn injury", Burns, vol. 31, No. 5, Elsevier Ltd. and ISBI, Aug. 1, 2005, pp. 568-577.

Dibona et al., "Neural Control of Renal Function", Physiological Reviews, vol. 77, No. 1, Jan. 1, 1997, pp. 75-197, URL:https://journals.physiology.org/doi/abs/10.1152/physrev.1997.77.1.75.

Dibona, "Renal Innervation and Denervation: Lessons from Renal Transplantation Reconsidered", International Society for Artificial Organs, vol. 11, No. 6, John Wiley & Sons, Inc., Dec. 1987, pp. 457-462, Retrieved from the Internet on Dec. 28, 2023 from URL:https://onlinelibrary.wiley.com/doi/abs/10.1111/j.1525-1594.1987.tb02710.x.

Dibona, "Sympathetic Nervous System and Hypertension", Recent Advances in Hypertension, American Heart Association, Inc., Dec. 27, 2012, pp. 556-560, URL:https://www.ahajournals.org/doi/pdf/10.1161/HYPERTENSIONAHA.111.00633..

Dicostanzo et al., "Role of the hepatic sympathetic nerves in the regulation of net hepaticglucose uptake and the mediation of the portal glucose signal", American Physiological Society, Aug. 16, 2005, pp. E9-E16, URL:https://journals.physiology.org/doi/epdf/10.1152/ajpendo.00184.2005.

Dodge et al., "Lumen diamter of normal human coronary arteries. Influence of age, sex, anatomic variation, and left ventricular hypertrophy or dilation", Circulation, vol. 86, Apr. 8, 1992, pp. 232-246.

Dolnikoff et al., "Neural mechanisms involved in the recovery from insulin hypoglycemia in dogs", Journal of the Autonomic Nervous System, vol. 8, No. 2, Elsevier, Jun. 1983, pp. 129-139, https://doi.org/10.1016/0165-1838(83)90099-1.

Doumas et al., "Renal sympathetic denervation in hypertension", Current Opinion in Nephrology and Hypertension, vol. 20, No. 6, Wolters Kluwer Health, Nov. 1, 2011, pp. 647-653.

Elser, Murray D. et al., "Renal sympatetic denervation in patients with treatment-resistant hypertension (The Symplicity HTN-2 Trial): a randomised controlled trial", Lancet, vol. 376, Nov. 17, 2010, 7 pp.

Erdine, "Celiac Ganglion Block", Interventional Treatment, vol. 17, No. 1, Agri, 2005, pp. 15-22, (Applicant points out, in accordance with MPEP 609.04(a), that the year of publication, 2005, is sufficiently earlier than the effective U.S. filing date, so that the particular month of publication is not an issue.).

Esler, "The Sympathetic System and Hypertension", American Journal of Hypertension, Ltd, vol. 13, No. 3, Elsevier Science, Inc., Jun. 1, 2000, pp. 99S-105S, URL:https://academic.oup.com/ajh/article/13/S4/99S/186509.

Evans, "The Place of Splanchnicectomy in the Treatment of Hypertension", Canadian Medical Association journal, vol. 64, No. 1, Jan. 1951, pp. 47-50, Retrieved from the Internet on Dec. 28, 2023 from URL:https://www.ncbi.nlm.nih.gov/pmc/articles/PMC1821460/pdf/canmedaj00652-0049.pdf.

Final Office Action from U.S. Appl. No. 18/312,248 dated Nov. 20, 2024, 10 pp.

Flaa Arnljot et al., "Increased sympathetic reactivity may predict insulin resistance: an 18-year follow-up study", Metabolism Clinical and Experimental, vol. 57, No. 10, May 28, 2008, pp. 1422-1427.

Foss et al., "Reversal of Genetic Salt-Sensitive Hypertension by Targeted Sympathetic Ablation", Nervous System, vol. 61, No. 4, American Heart Association, Inc., Jan. 11, 2013, pp. 806-811.

Franco-Colin et al., "The effects of sympathectomy and dexamethasone in rats ingesting sucrose", International Journal of Biological Sciences, vol. 2, No. 1, PubMed, Mar. 4, 2006, pp. 17-22, doi:10.7150/ijbs.2.17.

Gao et al., "Effects of High NaCl Diet on Arterial Pressure in SpragueDawley Rats with Hepatic and Sinoaortic Denervation", Japanese Journal of Physiology, vol. 55, No. 4, Oct. 26, 2005, pp. 229-234, URL:https://www.jstage.jst.go.jp/article/jjphysiol/55/4/55_4_229/_pdf/-char/en.

Grassi et al., "Neuroadrenergic and reflex abnormalities in patients with metabolic syndrome", Diabetologia, vol. 48, Jun. 3, 2005, pp. 1359-1365.

Grimson et al., "Total thoracic and partial to total lumbar sympathectomy and celiac ganglionectomy in the treatment of hypertension", Annals

(56) References Cited

OTHER PUBLICATIONS of Surgery, vol. 114, No. 4, Oct. 1941, pp. 532-547, Retrieved from the Internet on Dec. 29, 2023 from URL: https://www.ncbi.nlm.nih.gov/pmc/articles/PMC1609434/.
Guiot et al., "Collateral Nervous Damages After Cryoballoon Pulmonary Vein Isolation", Journal of Cardiovascular Electrophysiology, vol. 23, No. 4, Apr. 2012, pp. 346-351.
Haines et al., "Tissue Heating During Radiofrequency Catheter Ablation—A Thermodynamic Model", PACE, vol. 12, Jun. 1989, pp. 963-976.
Haque et al., "Role of the Sympathetic Nervous System and Insulin in Enchancing Glucose Uptake in Peripheral Tissues After Intrahypothalamic Injection of Leptin in Rats", Diabetes, vol. 48, No. 9, Sep. 1, 1999, pp. 1706-1712.
Hayes et al., "The common hepatic branch of the vagus is not required to mediate the glycemic and food intake suppressive effects of glucagon-like-peptide-1", American Journal of Physiology—Regulatory, Integrative and Comparative Physiology, vol. 301, No. 5, PubMed, Aug. 17, 2011, pp. R1479-R1485, doi:10.1152/ajpregu.00356.2011.
Hiatt et al., "Surgical Anatomy of the Hepatic Arteries in 1000 Cases", Annals of Surgery, vol. 220, No. 1, J.B. Lippincott Company, Oct. 21, 1993, pp. 50-52.
Holmin et al., "A Microsurgical Method for Denervation of the Liver in the Rat", European Surgical Research, vol. 16, No. 5, 1984, pp. 288-293, (Applicant points out, in accordance with MPEP 609.04(a), that the year of publication, 1984, is sufficiently earlier than the effective U.S. filing date, so that the particular month of publication is not an issue.).
Hoobler et al., "The Effects of Splanchuicectomy on the Blood Pressure in Hypertension A Controlled Study", vol. 4, Aug. 1951, pp. 173-183, Retrieved from the Internet on Dec. 28, 2023 from URL: https://www.ahajournals.org/doi/pdf/10.1161/01.CIR.4.2.173.
Huang et al., "Reneal denervation prevents and reverses hyperinsullinemia-induced hypertension in rats", Hypertension, vol. 32, No. 2, Aug. 1998, pp. 249-254.
Huggett et al., "Impact of Type 2 Diabetes Mellitus on Sympathetic Neural Mechanisms in Hypertension", Circulation, vol. 108, Dec. 15, 2003, pp. 3097-3101.
Hurr et al., "Liver sympathetic denervation reverses obesity-induced hepatic steatosis", The Journal of Physiology, vol. 597, No. 17, Jul. 6, 2019, p. 4565-4580.
Imai et al., "Regulation of Pancreatic ß Cell Mass by Neuronal Signals from the Liver", Science, vol. 322, Nov. 21, 2008, pp. 1250-1254.
Inomoto et al., "Experiences of 120 microsurgical reconstructions of hepatic artery in living related liver transplantation", Surgery, vol. 119, No. 1, Mosby-Year Book Inc., Mar. 30, 1995, pp. 20-26.
Irvine et al., "The Effect of Renal Denervation on Patients Suffering from Nephritis", The Journal of Clinical Investigation, vol. 14, No. 4, Feb. 27, 1935, pp. 443-458, URL: https://dm5migu4zj3pb.cloudfront.net/manuscripts/100000/100695/JCI35100695.pdf.
Jackson et al., "Effect of hepatic denervation on the counterregulatory response to insulin-induced hypoglycemia in the dog", American Journal of Physiology—Endocrinology and Metabolism, vol. 279, Jul. 19, 2000, pp. E1249-E1257.
Jackson et al., "Effects of vagal blockade on the counterregulatory response to insulin-induced hypoglycemia in the dog", American Journal of Physiology—Endocrinology and Metabolism, vol. 273, No. 6, The American Physiological Society, Dec. 1, 1997, pp. E1178-E1188, doi.org/10.1152/ajpendo.1997.273.6.E1178.
Johns et al., "Neural Control of Renal Function", Comprehensive Physiology, vol. 1, Elsevier, Apr. 1, 2011, pp. 731-767.
Jonassen et al., "Effects of renal denervation on tubular sodium handling in rats with CBL-induced liver cirrhosis", American Journal of Physiology-Renal Physiology, vol. 284, No. 3, Nov. 19, 2002, pp. F555-F563, URL:https://journals.physiology.org/doi/full/10.1152/ajprenal.00258.2002.
Jones et al., "The hepatic artery: a reminder of surgical anatomy", Journal of the Royal College of Surgeons of Edinburgh, vol. 46, No. 3, Jun. 1, 2001, pp. 168-170.
Kalsbeek et al., "Suprachiasmatic GABAergic inputs to the Paraventricular Nucleus Control Plasma Glucose Concentrations in the Rat via Sympathetic Innervation of the Liver", Journal of Neuroscience, vol. 24, No. 35, Society for Neuroscience, Sep. 1, 2004, pp. 7604-7613.
Kalsbeek, A. et al., "Hypothalamic control of energy metabolism via the autonomic nervous system", Annals of the New York Academy of Sciences, vol. 1212, No. 1, Nov. 2010, pp. 114-129.
Kandlikar et al., "Splanchnic sympathetic nerves in the development of mild DOCA-salt hypertension", American Physiological Society, Aug. 25, 2011, pp. H1965-H1973.
Kandzari et al., "Symplicity HTN Program Expanding Therapeutic Options for HTN and New Indications", Slides from Lecture presented at EuroPCR, May 2013, Reference was previously cited on U.S. Appl. No. 17/108,351.
Katholi et al., "Renal nerves in the pathogenesis of hypertension in experimental animals and humans", American Journal of Physiology-Renal Physiology, The American Physiological Society, Jul. 1, 1983, pp. F1-F14.
Katona et al., "Biomedical engineering in heart-brain medicine: A review", Cleveland Clinic Journal of Medicine, vol. 77, No. 3, Supplement 3, Jul. 2010, pp. S46-S50.
Kihara et al., "Impaired vasoreactivity to nitric oxide in experimental diabetic neuropathy", Experimental Neurology, vol. 132, No. 2, Elsevier, Apr. 1995, pp. 180-185, doi.org/10.1016/0014-4886(95)90023-3.
Kimani et al., "Comparative intimal-media morphology of the human splenic and common hepatic arteries", Journal of Morphological Science, vol. 28, No. 1, Jan. 16, 2011, pp. 52-56.
King et al., "Splanchnic Circulation Is a Critical Neural Target in Angiotensin II Salt Hypertension in Rats", American Heart Association, Jul. 23, 2007, pp. 547-556.
Kiuchi et al., "Combined renal and common hepatic artery denervation as a novel approach to reduce cardiometabolic risk: technical approach, feasibility and safety in a pre-clinical model", Clinical Research in Cardiology, vol. 110, Springer, Feb. 26, 2021, pp. 740-753, URL:https://link.springer.com/article/10.1007/s00392-021-01814-1.
Klieverik et al., "Effects of thyrotoxicosis and selective hepatic autonomic denervation on hepatic glucose metabolism in rats", American Journal of Physiology—Endocrinology and Metabolism, vol. 294, Jan. 8, 2008, pp. E513-E520.
Klieverik et al., "Thyroid modulates glucose production via a sympathetic pathway from the hypothalamic paraventricular nucleus to the liver", PNAS, vol. 106, No. 14, Apr. 7, 2009, pp. 5966-5971.
Knuepfer et al., "Direct assessment of organ specific sympathetic nervous system activity in normal and cardiovascular disease states", Experimental physiology, vol. 95, No. 1, National Institutes of Health, Jan. 2010, 3 pp., URL: https://www.ncbi.nlm.nih.gov/pmc/articles/PMC2856076/pdf/nihms172439.pdf.
Kolios et al., "Large blood vessel cooling in heated tissues: a numerical study", Physics in Medicine and Biology, vol. 40, No. 4, Apr. 1, 1995, pp. 477-494.
Kraft et al., "Safety of surgical denervation of the common hepatic artery in insulin-resistant dogs", Physiological Reports, vol. 9, No. 6, John Wiley & Sons, Inc., Mar. 2021, 11 pp., Retrieved from the Internet on Dec. 28, 2023 from URL: https://physoc.onlinelibrary.wiley.com/doi/pdfdirect/10.14814/phy2.14805.
Kraft et al., "Sympathetic Denervation of the Common Hepatic Artery Lessens Glucose Intolerance in the Fat- and Fructose-Fed Dog", Diabetes, vol. 68, No. 6, American Diabetes Association, Jun. 1, 2019, pp. 1143-1155, URL: https://diabetesjournals.org/diabetes/article/68/6/1143/39704/Sympathetic-Denervation-of-the-Common-Hepatic.
Krum et al., "Catheter-based renal sympathetic denervation for resistant hypertension: a multicentre safety and proof-of-principle cohort study", Lancet, vol. 373, Apr. 11, 2009, pp. 1275-1281.
Kumakura et al., "Effects of celiac superior mesenteric ganglionectomy on glucose homeostasis and hormonal changes during oral glucose

(56) References Cited

OTHER PUBLICATIONS tolerance testing in rats", Endrocrine Journal, vol. 60, No. 4, The Japan Endocine Society, Dec. 12, 2012, pp. 525-531.

Lamarche et al., "Hepatic denervation reduces adrenal catecholamine secretion during insulin-induced hypoglycemia", American Journal of Physiology—Regulatory, Integrative and Comparative Physiology, vol. 268, No. 1, Jan. 1995, pp. R50-R57, doi.org/10.1152/ajpregu.1995.268.1.R50.

Lambert et al., "Sympathetic Nervous Activation in Obesity and the Metabolic Syndrome—Causes, consequences and therapeutic implications", Pharmacology & Therapeutics, vol. 126, No. 2, Elsevier Inc., May 1, 2010, pp. 159-172.

Lang et al., "Hepatic regulation of renal function", Experimental Physiology: Translation and Integration, vol. 77, No. 5, John Wiley & Sons, Inc., Sep. 1, 1992, pp. 663-673.

Lautt et al., "Afferent and Efferent Neural Roles in Liver Function", Progress in Neurobiology, vol. 21, Pergamon Press Ltd., May 23, 1983, pp. 323-348.

Lautt et al., "Hepatic glucose balance in response to direct stimulation of sympathetic nerves in the intact liver of cats", Canadian Journal of Physiology and Pharamacology, vol. 56, No. 6, Jan. 12, 1978, pp. 1022-1028.

Lautt et al., "Hepatic parasympathetic neural effect on glucose balance in the intact liver", Canadian Journal of Physiology and Pharmacology, vol. 56, No. 4, Aug. 1, 1978, pp. 678-682.

Lautt et al., "Hepatic parasympathetic neuropathy as cause of maturity-onset diabetes?", General Pharmacology: The Vascular System, vol. 11, No. 4, Pergamon Press Ltd., Oct. 19, 1979, pp. 343-345, doi.org/10.1016/0306-3623(80)90096-8.

Lautt et al., "Rapid insulin sensitivity test", Canadian Journal of Physiology and Pharmacology, vol. 76, No. 12, Dec. 1998, pp. 1080-1086, doi: 10.1139/cjpp-76-12-1080.

Lee et al., "Right Phrenic Nerve Injury Following Electrical Disconnection of the Right Superior Pulmonary Vein", Pace, vol. 27, No. 10, Oct. 2004, pp. 1444-1446.

Lee et al., "The Hepatic Vagus Nerve and the Neural Regulation of Insulin Secretion", Endocrinology, vol. 117, No. 1, The Endocrine Society, Jul. 1, 1985, pp. 307-315.

Lee et al., "The Road Less Traveled: Importance of Lesser Branches of the Celiac Axis in Liver Embolotherapy", RadioGraphhics, vol. 32, RSNA, Jan. 16, 2012, pp. 1121-1132.

Lehmann et al., "Ex situ quantification of the cooling effect of liver vessels on radiofrequency ablation", Langenbecks Archives of Surgery, vol. 394, Springer-Verlag, Mar. 10, 2009, pp. 475-481.

Levy et al., "Hepatic denervation alters first-phase urinary sodium excretion in dogs with cirrhosis", American Journal of Physiology-Renal Physiology, vol. 253, No. 4, Oct. 1, 1987, pp. F664-F671.

Levy et al., "Sodium excretion in dogs with low-grade caval constriction: role of hepatic nerves", American Journal of Physiology-Renal Physiology, vol. 253, No. 4, Oct. 1, 1987, pp. F672-F678.

Licht et al., "Increased Sympathetic and Decreased Parasympathetic Activity Rather Than Changes in Hypothalamic-Pituitary-Adrenal Axis Activity Is Associated with Metabolic Abnormalities", Journal of Clinical Endocrinology and Metabolism, vol. 95, No. 5, May 1, 2010, pp. 2458-2466.

Lindfeldt et al., "Glucose homeostasis after peri-arterial hepatic denervation in partially hepatectomized rats", Research in Experimental Medicine, vol. 193, Springer-Verlag, Jul. 13, 1993, pp. 397-405, https://doi.org/10.1007/BF02576248.

Lindfeldt et al., "Hepatic sympathetic denervation potentiates glucagon-stimulated glycogenolysis and hyperinsulinaemia in the rat", Journal of the Autonomic Nervous System, vol. 19, No. 3, Feb. 20, 1987, pp. 211-217.

Liu et al., "Angiographic Considerations in Patients Undergoing Liver-directed Therapy", Journal of Vasular Interventional Radiology, vol. 16, SIR, Mar. 15, 2005, pp. 911-935.

Liu et al., "Computer modeling of the effect of perfusion on heating patterns in radiofrequency tumor ablation", International Journal of Hyperthermia, vol. 23, No. 1, Oct. 30, 2006, pp. 49-58.

Louis-Sylvestre et al., "Effect of liver denervation on the feeding pattern of rats", American Journal of Physhiology—Regulatory, Integrative and Comparative Physiology, vol. 239, No. 1, The American Physiological Society, Jul. 1, 1980, pp. R66-R70, doi.org/10.1152/ajpregu.1980.239.1.R66.

Loukas et al., "A Review of the Thoracic Splanchnic Nerves and Celiac Ganglia", Clinical Anatomy, vol. 23, No. 5, Wiley-Liss, Inc., Jul. 2010, pp. 512-522.

Mahfoud et al., "Effect of Renal Sympathetic Denervation on Glucose Metabolism in Patients With Resistant Hypertension: A Pilot Study", Circulation, vol. 123, No. 18, Apr. 25, 2011, pp. 1940-1946.

Mancia et al., "The sympathetic nervous system and the metabolic syndrome", Journal of Hypertension, vol. 25, No. 5, Lippincott Williams & Wilkins, May 1, 2007, pp. 909-920.

McCuskey et al., "Anatomy of Efferent Hepatic Nerves", The Anatomical Record Part A, vol. 280A, Wiley, Aug. 30, 2004, pp. 821-826.

Medtronic ATAKR II 4802 Ablation System Technical Manual (2001), Reference was previously cited on U.S. Appl. No. 17/108,351.

Moore et al., "Chronic hepatic artery ligation does not prevent liver from differentiating portal vs. peripheral glucose delivery", American Journal of Physiology—Endocrinology and Metabolism, vol. 285, No. 4, May 23, 2003, pp. E845-853.

Moore et al., "Effect of hepatic denervation on peripheral insulin sensitivity in conscious dogs", American Physiological Society, Feb. 1, 2002, pp. E286-E296, URL: https://journals.physiology.org/doi/full/10.1152/ajpendo.00201.2001.

Murakami et al., "Hepatic Denervation Ameliorates Sodium and Water Retention in Experimental Cirrhosis in Rats", Digestive diseases and sciences, vol. 42, No. 11, Nov. 1997, pp. 2292-2298.

Nathan et al., "Finding New Treatments for Diabetes—How Many, How Fast . . . How Good?", New England Journal of Medicine, vol. 356, No. 5, Massachusetts Medical Society, Feb. 1, 2007, pp. 437-440.

Niijima, "Blood Glucose Levels Modulate Efferent Activity in the Vagal Supply to the Rat Liver", The Journal of Physiology, vol. 364, Great Britain, Oct. 25, 1984, pp. 105-112, doi:10.1113/jphysiol.1985.sp015733.

Niijma et al., "Glucose-Sensitive Afferent Nerve Fibres in the Hepatic Branch of the Vagus Nerve in the Guinea-Pig", Journal of Physiology, vol. 322, No. 1, Wiley, Nov. 1, 1982, pp. 315-323.

Nobin, A. et al., "Organization and Function of the Sympathetic Innervation of Human Liver", Acta Physiological Scandinavia suppl., vol. 452, Jan. 14, 1977, pp. 103-106.

Nonogaki et al., "New insights into sympathetic regulation of glucose and fat metabolism", Diabetologia, vol. 43, Springer, May 2000, pp. 533-549.

Office Action from U.S. Appl. No. 18/312,248 dated Jul. 3, 2024, 10 pp.

Okazaki et al., "Modulation of Insulin Secretion by Hepatic Vagotomy in Cirrhotic Rats", Physiology & Behavior, vol. 53, No. 3, Pergamon Press Ltd., Mar. 1, 1993, pp. 521-525.

Osborn et al., "Sympathetic Signatures of Cardiovascular Disease: A Blueprint for Development of Targeted Sympathetic Ablation Therapies", AHA Journals, vol. 59, No. 3, American Heart Association, Inc, Mar. 2012, pp. 545-547, Retrieved from the Internet on Jan. 2, 2024 from URL: https://www.ahajournals.org/doi/epub/10.1161/HYPERTENSIONAHA.111.182899.

Panescu, Dorin et al., "Three-Dimensional Finite Element Analysis of Current Density and Temperature Distributions During Radio-Frequency Ablation", IEEE Transactions on Biomedical Engineering, vol. 42, No. 9, IEEE, Sep. 1995, pp. 879-890.

Patarrão et al., "A new technique to assess insulin sensitivity in humans: the rapid insulin sensitivity test (RIST)", Proceedings of the Western Pharmacology Society, vol. 50, 2007, pp. 105-109, (Applicant points out, in accordance with MPEP 609.04(a), that the year of publication, 2007, is sufficiently earlier than the effective U.S. filing date, so that the particular month of publication is not an issue.).

Pearce et al., "Blood vessel architectural features and their effect on thermal phenomena", Critical Review, vol. CR75, SPIE Optical Engineering Press, Jan. 24, 2000, pp. 231-277.

(56) References Cited

OTHER PUBLICATIONS

Perseghin et al., "Regulation of Glucose Homeostasis in Humans with Denervated Livers", Glucose Metabolism and Liver Denervation, vol. 100, No. 4, The American Society for Clinical Investigation, Inc., Aug. 1997, pp. 931-941.
Pocai et al., "Hypothalamic KATP channels control hepatic glucose production", Nature, vol. 434, Nature Publishing Group, Apr. 21, 2005, pp. 1026-1031.
Prochnau et al., "Catheter-based renal denervation for drug-resistant hypertension by using a standard electrophysiology catheter", EuroIntervention, vol. 7, No. 9, Jan. 1, 2012, pp. 1077-1080.
Puschel et al., "Control of Hepatocyte Metabolism by Sympathetic and 13 Parasympathetic Hepatic Nerves", The Anatomical Record Part A., vol. 280A, No. 1, Wiley, Sep. 2004, pp. 854-867.
Response to Office Action dated Jul. 3, 2024 from U.S. Appl. No. 18/312,248, filed Sep. 24, 2024, 9 pp.
Rippy et al., "Catheter-based renal sympathetic denervation: chronic preclinical evidence for renal artery safety", Clinical Research in Cardiology, vol. 100, Springer, Jul. 28, 2011, pp. 1095-1101.
Rizza, "Pathogenesis of Fasting and Postprandial Hyperglycemia in Type 2 Diabetes: Implications for Therapy", Diabetes, vol. 59, Nov. 2010, pp. 2697-2707.
Roemer et al., "Optimal power deposition in hyperthermia. I. The treatment goal: The ideal temperature distribution: the role of large blood vessels", International Journal of Hyperthermia, vol. 7, No. 2, Taylor & Francis Ltd., Mar. 1991, pp. 317-341.
Roth et al., "Endovenous Radiofrequency Ablation of Superficial and Perforator Veins", Surgical Clinics of North America, vol. 87, Oct. 1, 2007, pp. 1267-1284.
Sacher et al., "Phrenic Nerve Injury After Atrial Fibrillation Catheter Ablation", Journal of the American College of Cardiology, vol. 47, No. 12, Jun. 20, 2006, pp. 2498-2503.
Schenk, Jr. et al., "Direct Measurement of Hepatic Blood Flow in Surgical Patients", Annals of Surgery, vol. 156, No. 3, Sep. 1962, pp. 463-469.
Schlaich et al., "Renal Denervation in Human Hypertension: Mechanisms Current Findings, and Future Prospects", Current Hypertension Reports, vol. 14, Springer Science+Business Media, Mar. 29, 2012, pp. 247-253.
Schlaich et al., "Renal denervation: a potential new treatment modality for polycystic ovary syndrome?", Journal of Hypertension, vol. 29, Jan. 20, 2011, pp. 991-996.
Schlaich et al., "Renal Sympathetic Nerve Ablation: The New Frontier in the Treatment of Hypertension", Current hypertension reports, vol. 12, Springer Science+Business Media, Jan. 16, 2010, pp. 29-46.
Schlaich et al., "Renal Sympathetic-Nerve Ablation for Uncontrolled Hypertension", New England Journal of Medicine, vol. 361, No. 9, Massachusetts Medical Society, Aug. 27, 2009, pp. 932-934.
Singh et al., "Esophageal Injury and Temperature Monitoring During Atrial Fibrillation Ablation", Circulation: Arrythmia and electrophysiology, vol. 1, No. 3, Aug. 1, 2008, pp. 162-168.
Smith et al., "Radiofrequency neurolysis in a clinical model", Journal of Neurosurgery, vol. 55, No. 2, Aug. 1, 1981, pp. 246-253.
Steigerwald et al., "Morphological assessment of renal arteries after radiofrequency catheter-based sympathetic denervation in a porcine model", Journal of Hypertension, vol. 30, No. 11, Lippincott Williams & Wilkins, Nov. 1, 2012, 10 pp.
Stiimpel et al., "Loss of regulation by sympathetic hepatic nerves of liver metabolism and haemodynamics in chronically streptozotocindiabetes rats", Diabetologia, vol. 39, Springer, Aug. 2, 1995, pp. 161-165.
Stovichek et al., "Comparative evaluation of age-related and organic characteristics of the structure of the adventitial nerve plexuses in human arteries", Archives of Anatomy, Histology and Embryology, vol. 93, No. 9, Sep. 1, 1987, pp. 77-82, Translation not available.
Stovichek et al., "Myeloarchitectonics of visceral nerves during human ontogeny", Archives of Anatomy, Histology and Embryology, vol. 80, No. 1, Jan. 1, 1981, pp. 30-38, Translation not available.
Stovichek et al., "Regularities of the Morphogenesis of Visceral Organ Nervous Connections at Different Stages of Human Postnatal Development", Morphology, vol. 125, No. 3, Jul. 2004, pp. 14-18, Translation not available.
Stovichel et al., "Morphological Regularities of Adventitial Nerve Plexus Variability in Visceral Arteries on Different Stages of Human Postnatal Ontogenesis", Morphology, vol. 112, No. 5, Jul. 1997, pp. 43-48, Translation not available.
Straznicky et al., "Neuroadrenergic Dysfunction Along the Diabetes Continuum: A Comparative Study in Obese Metabolic Syndrome Subjects", Diabetes, vol. 61, No. 10, Oct. 1, 2012, pp. 2506-2516.
Taborsky et al., "Minireview: The Role of the Autonomic Nervous System in Mediating the Glucagon Response to Hypoglycemia", Endocrinology, vol. 153, No. 3, Feb. 7, 2012, pp. 1055-1062.
Takahashi et al., "Effects of hepatic nerve stimulation on blood glucose and glycogenolysis in rat liver: Studies with in vivo microdialysis", Journal of the Autonomic Nervous System, vol. 61, No. 2, Elsevier Science B.V., Nov. 6, 1996, pp. 181-185.
Takahashi et al., "Fasting induces a Large, Leptin-Dependent increase in the intrinsic Action Potential Frequency of Orexigenic Arcuate Nucleus Neuropeptide Y/Agouti-Related Protein Neurons", Endocrinology, vol. 146, No. 3, Mar. 1, 2005, pp. 1043-1047.
Tangwongsan et al., "Fluid Velocity Measurement using Convective Heat Transfer Coefficient Measuring System", IEEE/NIH Life Science Systems and Applications Workshop, IEEE, Nov. 8, 2007, pp. 81-87.
Tavares et al., "Hepatic denervation impairs the assembly and secretion of VLDL-TAG", Cell Biochemistry and Function, vol. 26, Wiley, Jun. 10, 2008, pp. 557-565.
Tentolouris et al., "Perturbed Autonomic Nervous System Function in Metabolic Syndrome", Neuromolecular medicine, vol. 10, Humana Press Inc., Jan. 26, 2008, pp. 169-178.
Tentolouris et al., "Sympathetic System Activity in Obesity and Metabolic Syndrome", Annals New York Academy of Sciences, vol. 1083, No. 1, Apr. 2006, pp. 129-152.
Thompson et al., "Renal Denervation Sparks Device Market Gold Rush", Elsevier Business Intelligence, Medtech Insight, vol. 24, No. 5, May 2012, 1 pp., Reference was previously cited on U.S. Appl. No. 17/108,351.
Tungjitkusolmun et al., "Three-Dimensional Finite-Element Analyses for Radio-Frequency Hepatic Tumor Ablation", IEEE Transactions on Biomedical Engineering, vol. 49, No. 1, IEEE, Aug. 15, 2001, 7 pp.
Tziafalia et al., "Echo-Doppler Measurements of Portal Vein and Hepatic Artery in Asymptomatic Patients with Hepatitis B Virus and Healthy Adults", Journal of Gastrointestinal and Liver Diseases, vol. 15, No. 4, Dec. 1, 2003, pp. 343-346.
Uchida et al., "CT Image Fusion for 3D Depiction of Anatomic Abnormalities of the Hepatic Hillum", American Journal of Roentgenology, vol. 189, No. 4, Mar. 20, 2007, pp. W184-191.
Uchida et al., "Effect of radio frequency catheter ablation parasympathetic denervation: A comparison of three different ablation sites", PACE, vol. 21, No. 11, Wiley, Nov. 1998, pp. 2517-2521.
Ulucakli et al., "Simulation of Radiofrequency Ablation and Thermal Damage to Tissue", IEEE Annual Northeast Bioengineering Conference, IEEE, Apr. 1, 2006, pp. 93-94.
Unger et al., "Glucagonocentric restructuring of diabetes: a pathophysiologic and therapeutic makeover", The Journal of Clinical Investigation, vol. 122, No. 1, Jan. 3, 2012, 10 pp.
Uno et al., "Neuronal Pathway from the liver Modulates Energy Expenditure and Systemic Insulin Sensitivity", Science, vol. 312, No. 5780, Jun. 16, 2006, pp. 1656-1659.
Valvano et al., "Thermal Conductivity and Diffusivity of Biomaterials Measured with Self-Heated Thermistors", International Journal of Thermophysics, vol. 6, No. 3, Plenum Publishing Corporation, May 1985, pp. 301-311.
Van Den Hoek et al., "Intracerebroventricular Administration of Neuropeptide Y Induces Hepatic Insulin Resistance via Sympathetic Innervation", Diabetes, vol. 57, Sep. 2008, pp. 2304-2310.
Vaz et al., "Regional Sympathetic Nervous Activity and Oxygen Consumption in Obese Normotensive Human Subjects", Circulation, vol. 96, No. 10, Nov. 18, 1997, 13 pp.

(56) References Cited

OTHER PUBLICATIONS

Wada et al., "Hepatic denervation does not significantly change the response of the liver to glucagon in conscious dogs", American Journal of Physiology—Endocrinology Metabolism, vol. 268, No. 2, American Physiological Society, Feb. 1, 1995, pp. E194-E203.

Watton et al., "Modelling the mechanical response of elastin for arterial tissue", Journal of Biomechanics, vol. 42, No. 9, Mar. 4, 2009, pp. 1320-1325.

Wiersma et al., "Effect of liver denervation on glucose production during running in guinea pigs", American Journal of Physiology—Regulatory Integrative Comparatice Physiology, vol. 268, No. 1, American Physiological Society, Jan. 1, 1995, pp. R72-R77.

Witkowski et al., "Effects Renal Sympathetic Denervation on Blood Pressure, Sleep Apnea Course, and Glycemic Control in Patients With Resistant Hypertension and Sleep Apnea", Journal of Hypertension, vol. 58, No. 4, Aug. 15, 2011, pp. 559-565.

Wood, "Lethal Effects of High and low Temperatures of Unicellar Organisms", Advanced Biology of Medicine and Physics, vol. 4, Elsevier, Jan. 1, 1956, pp. 119-165.

Wright, "On a relationship Between the Arrhenius Parameters from Thermal Damage Studies", Journal of Biomechanical Engineering, vol. 125, ASME, Apr. 2003, pp. 300-304.

Xie et al., "Induction of insulin resistance by cholinergic blockade with atropine in the cat", Journal of Autonomic Pharmacology, vol. 15, No. 5, Oct. 1995, pp. 361-369, doi.org/10.1111/j.1474-8673.1995.tb00402.x.

Xie et al., "Insulin resistance caused by hepatic cholinergic interruption and reversed by acetylcholine administration", American Journal of Physiology—Endocrinology and Metabolism, vol. 271, No. 9, Sep. 1996, pp. E587-E592, doi.org/10.1152/ajpendo.1996.271.3.E587.

Xie et al., "Insulin resistance of glucose response produced by hepatic denervations", Canadian Journal of Physiology and Pharmacology, vol. 71, Feb. 1993, pp. 175-178.

Xie et al., "Insulin resistance of skeletal muscle produced by hepatic parasympathetic interruption", American Journal of Physiology—Endocrinology and Metabolism, vol. 270, No. 5, American Physiological Society, May 1, 1996, pp. E858-E863.

Yi et al., "A Major Role for Perifornical Orexin Neurons in the Control of Glucose Metabolism in Rats", Diabetes, vol. 58, No. 9, Sep. 1, 2009, pp. 1998-2005.

Yi et al., "Pituitary Adenylate Cyclase-Activating Polypeptide Stimulates Glucose Production via the Hepatic Sympathetic Innervation in Rats", Diabetes, vol. 59, No. 7, Jul. 1, 2010, pp. 1591-1600.

Yi et al., "The role of autonomic nervous liver innervation in the control of energy metabolism", Biochimica et Biophysica Acta, vol. 1802, No. 4, Elsevier, Apr. 2010, pp. 416-431, doi:10.1016/j.bbadis.2010.01.006.

Yu et al., "Microwave Liver Ablation: Influence of Hepatic Vein Size on Heat-sink Effect in Porcine Model", Journal of Vascular Interventional Radiology, vol. 19, No. 7, Jul. 1, 2008, pp. 1087-1092.

Zile et al., "Effects of Autonomic Modulation", Journal of the American College of Cardiology, vol. 59, No. 10, Elsevier Inc, Mar. 6, 2012, pp. 910-912.

\* cited by examiner

CATHETER-BASED DEVICES AND ASSOCIATED METHODS FOR IMMUNE SYSTEM NEUROMODULATION

CROSS-REFERENCE TO RELATED APPLICATIONS

This application is a continuation of U.S. patent application Ser. No. 17/018,625, filed Sep. 11, 2020, titled "CATHETER-BASED DEVICES AND ASSOCIATED METHODS FOR IMMUNE SYSTEM NEUROMODULATION", which is a continuation U.S. patent application Ser. No. 15/788,161, titled "CATHETER-BASED DEVICES AND ASSOCIATED METHODS FOR IMMUNE SYSTEM NEUROMODULATION", filed on Oct. 19, 2017, which is a continuation of U.S. patent application Ser. No. 15/372,305, titled "CATHETER-BASED DEVICES AND ASSOCIATED METHODS FOR IMMUNE SYSTEM NEUROMODULATION", filed on Dec. 7, 2016, which is a continuation of U.S. patent application Ser. No. 14/379,886, titled "IMMUNE SYSTEM NEUROMODULATION AND ASSOCIATED SYSTEMS AND METHODS", filed on Aug. 20, 2014, which is a 371 National Stage of International Application No. PCT/US2013/029685, titled "IMMUNE SYSTEM NEUROMODULATION AND ASSOCIATED SYSTEMS AND METHODS", filed on Mar. 7, 2013, which claims priority to and the benefit of U.S. Provisional Patent Application No. 61/608,422, titled "IMMUNE SYSTEM NEUROMODULATION AND ASSOCIATED SYSTEMS AND METHODS", filed on Mar. 8, 2012, the disclosures of which are all incorporated by reference herein in their entireties.

TECHNICAL FIELD

The present technology relates generally to modulation of nerves of immune system organs and associated systems and methods.

BACKGROUND

The sympathetic nervous system (SNS) is a primarily involuntary bodily control system typically associated with stress responses. Fibers of the SNS extend through tissue in almost every organ system of the human body. For example, some fibers extend from the brain, intertwine along the aorta, and branch out to various organs. As groups of fibers approach specific organs, fibers particular to the organs can separate from the groups. Signals sent via these and other fibers can affect characteristics such as pupil diameter, gut motility, and urinary output. Such regulation can have adaptive utility in maintaining homeostasis or in preparing the body for rapid response to environmental factors. Chronic activation of the SNS, however, is a common maladaptive response that can drive the progression of many disease states.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1A:
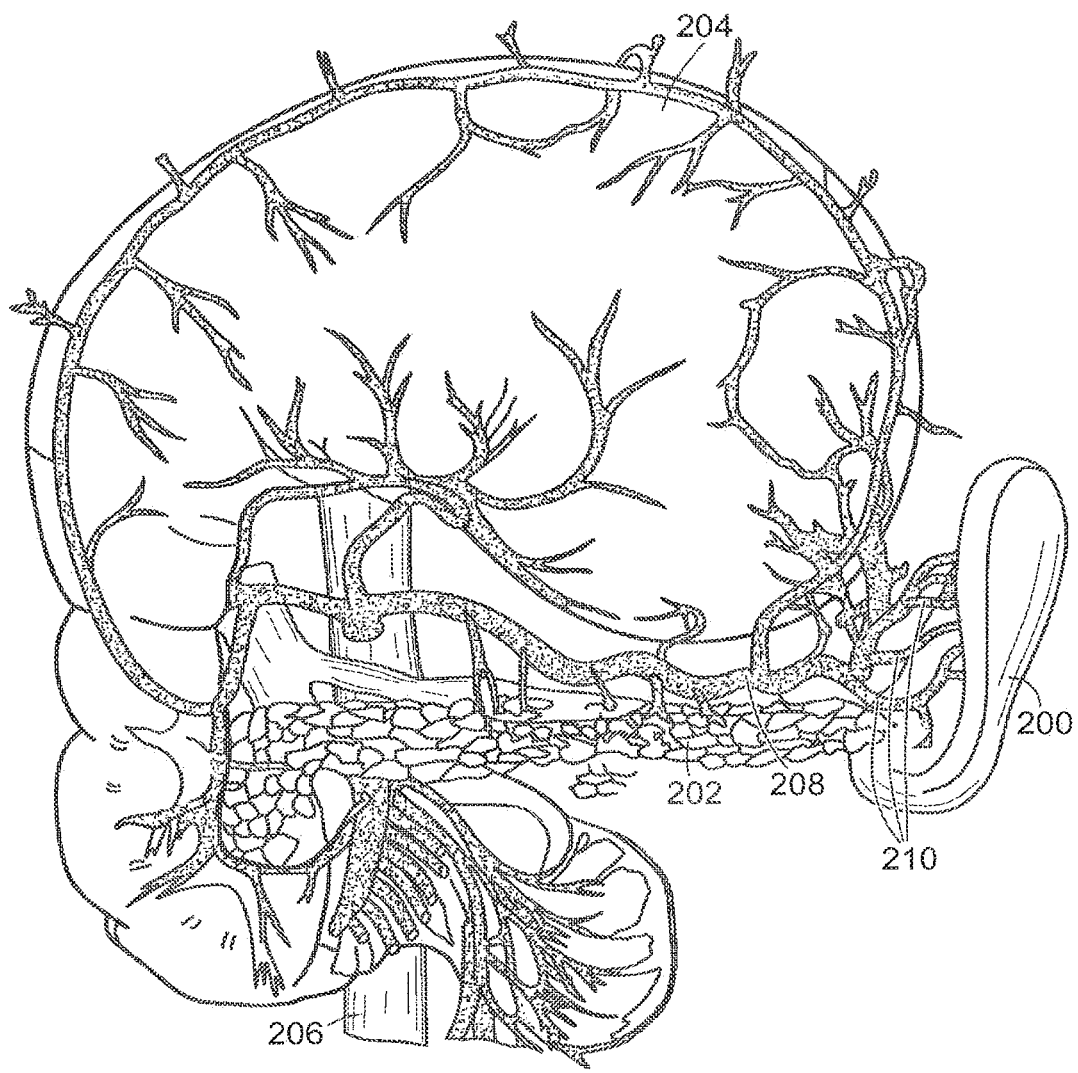
FIG. 1A is an anatomical view illustrating abdominal organs of a human patient, including a spleen, a splenic artery, and nearby organs and vessels.

The present technology is generally directed to modulation of nerves of one or more immune system organs to treat immune system conditions, conditions associated with sympathetic activity (e.g., overactivity or hyperactivity) in immune system organs, and/or conditions associated with central sympathetic activity (e.g., overactivity or hyperactivity). For example, several embodiments are directed to modulation of nerves of one or more immune system organs to treat autoimmune conditions and related conditions. As discussed in greater detail below, immune system neuromodulation can include rendering neural fibers inert, inactive, or otherwise completely or partially reduced in function. This result can be electrically-induced, thermally-induced, chemically-induced, or induced by another mechanism during an immune system neuromodulation procedure, e.g., a procedure including percutaneous transluminal intravascular access.

Specific details of several embodiments of the present technology are described herein with reference to FIGS. 1A-3. The embodiments can include, for example, modulating nerves proximate (e.g., at or near) the splenic artery, the splenic veins, the thymic artery, the thymic veins, another portion of a vessel or duct of an immune system organ, and/or other suitable structures. Although many of the embodiments are described herein with respect to thermally-induced, electrically-induced, and chemically-induced approaches, other treatment modalities in addition to those described herein are within the scope of the present technology. Additionally, other embodiments of the present technology can have different configurations, components, or procedures than those described herein. A person of ordinary skill in the art, therefore, will accordingly understand that the technology can have other embodiments with additional elements and that the technology can have other embodiments without several of the features shown and described below with reference to FIGS. 1A-3.

As used herein, the terms "distal" and "proximal" define a position or direction with respect to the treating clinician or clinician's control device. "Proximal" and "proximally" can refer to a position near or in a direction toward the clinician or clinician's control device. "Distal" or "distally" can refer to a position distant from or in a direction away from the clinician or clinician's control device.

I. Immune System

The human immune system has two categories of defenses: innate and adaptive. The innate immune system response is non-specific, meaning it responds to pathogens in a generic way and does not confer long-lasting immunity against a pathogen. The innate system includes both humoral and chemical barriers and cellular barriers that utilize phagocytes (macrophages, neutrophils, and dendritic cells), mast cells, eosinophils, basophils, and natural killer cells. The adaptive immune system allows for stronger immune responses and immunological memory, meaning that a particular pathogen is remembered based on specific antigens. The adaptive immune system requires recognition of non-self-antigens during a process called antigen recognition. The primary cells of the adaptive immune system are lymphocytes, of which B cells and T cells are the most common.

Organs involved in the immune system response include the spleen, thymus, lymph nodes, and bone marrow. The spleen is located in the left upper quadrant of the abdomen, the thymus is located atop the pericardium within the chest cavity, and the lymph nodes and bone marrow are distributed throughout the body. The sympathetic nervous system appears to provide most of the efferent autonomic control over the immune system organs, while most direct afferent input from the immune system appears to come from the bone marrow and lymph nodes.

II. Autoimmune Conditions

Autoimmune conditions are the result of an inappropriate immune response against substances and tissues normally present in the body. Specialized cells located in the thymus and bone marrow normally present immature lymphocytes with self-antigens and eliminate those that recognize self-antigens. In subjects with autoimmune conditions, however, the immune system is unable to tell the difference between healthy body tissue and foreign antigens and, therefore, attacks the healthy body tissue. This can result in a hypersensitivity reaction similar to the response in allergic conditions.

Autoimmune condition flares are often linked to psychological stressors, and the reaction to such stressors appears to have a neural component. For example, adaptational stress responses involve activation of both the hypothalamus-pituitary-adrenal (HPA) axis and the autonomic nervous system (ANS), and both of these axes are thought to communicate bidirectionally with the immune system. Activation of the HPA axis and ANS in response to an external stressor results in the release of cortisol and catecholamines. These stress hormones generally downregulate immune and inflammatory responses, but also influence the central nervous system.

The central sympathetic system regulates some aspects of the immune system, e.g., T-cell differentiation. Activation of the sympathetic nervous system primarily inhibits the activity of cells associated with the innate immune system while either enhancing or inhibiting the activity of cells associated with the acquired/adaptive immune system. The specific role of the sympathetic nerves depends on a variety of factors. For example, in a mouse model of systemic lupus erythematosus (SLE), alterations in sympathetic innervation have been linked to disease pathogenesis, which strongly supports the hypothesis that the sympathetic nervous system can modulate expression of autoimmune lymphoproliferative disease.

Current therapies for autoimmune conditions include anti-inflammatory drugs such as steroids and immunosuppressive agents that locally or systemically modify the immune system (e.g., TNFa antagonists and B cell depleting agents). However, these therapies generally require life-long adherence, and many patients still experience acute disease flares.

III. Immune System Neuromodulation

Immune system neuromodulation is the partial or complete incapacitation or other effective disruption or regulation of immune system nerves, e.g., nerves terminating in or originating from one or more immune system organs (including, but not limited to, the spleen, lymph nodes, bone marrow, thymus, and other suitable organs) or in structures closely associated with the immune system organs. In particular, immune system neuromodulation comprises inhibiting, reducing, blocking, pacing, upregulating, and/or downregulating neural communication along neural fibers (e.g., efferent and/or afferent neural fibers) innervating one or more immune system organs. Such incapacitation, disruption, and/or regulation can be long-term (e.g., permanent or for periods of months, years, or decades) or short-term (e.g., for periods of minutes, hours, days, or weeks). While long-term disruption of the immune system nerves can be desirable for alleviating symptoms and other sequelae associated with autoimmune conditions and other immune system conditions over longer periods of time, short-term modulation of the immune system nerves may also be desirable, for example, to generate a temporary reduction in symptoms or to address other issues.

As noted previously, there is significant sympathetic input to all components of the immune system, and immune system autonomic neural activity (increased sympathetic drive or decreased parasympathetic drive, or a change in the ratio thereof) can cause or exacerbate various immune system conditions, including for example autoimmune conditions such as multiple sclerosis, lupus, psoriasis, and other immune system conditions. Immune system neuromodulation is expected to be useful in treating these conditions, for example by reducing mechanisms of inflammation and modulating the immune response. For example, the disclosed methods and systems for immune system neuromodulation are expected to cause an improvement (e.g., a reduction) in one or more markers of inflammation, (e.g., interleukins, high-sensitivity C-reactive proteins, erythrocyte sedimentation rate (ESR), heat shock proteins, and/or other suitable markers) in patients diagnosed with autoimmune conditions and/or other patients. Similarly, the disclosed methods and systems for immune system neuromodulation are expected to reduce the need for steroid or immune modulating agents (e.g., tumor necrosis factor inhibitors) in patients diagnosed with autoimmune diseases and/or other patients.

Furthermore, afferent sympathetic activity from immune system organs can contribute to central sympathetic tone or drive. Accordingly, immune system neuromodulation is expected to be useful in treating clinical conditions associated with central sympathetic activity (e.g., overactivity or hyperactivity), particularly conditions associated with central sympathetic overstimulation. Conditions associated with central sympathetic activity (e.g., overactivity or hyperactivity) include, for example, hypertension, heart failure, acute myocardial infarction, metabolic syndrome, insulin resistance, diabetes, left ventricular hypertrophy, chronic and end stage renal disease, inappropriate fluid retention in heart failure, cardio-renal syndrome, polycystic kidney disease, polycystic ovary syndrome, osteoporosis, erectile dysfunction, and sudden death, among other conditions.

In certain patients, reducing sympathetic drive in one or more immune system organs, reducing central sympathetic drive, and/or other benefits from immune system neuromodulation are expected to outweigh the complete or partial loss of sympathetic-nerve functionality in treated immune system organs.

Several properties of the immune system organ vasculature may inform the design of treatment devices and associated methods for achieving immune system neuromodulation (e.g., via intravascular access), and impose specific design requirements for such devices. Specific design requirements may include accessing the immune system organ blood vessels (e.g., splenic artery, splenic vein, thymic artery, thymic vein), facilitating stable contact between the energy delivery elements of such devices and a luminal surface or wall of the immune system organ blood vessel, and/or effectively modulating the immune system nerves with the neuromodulatory apparatus.

Potential targets for immune system neuromodulation include nerves innervating immune system organs such as the spleen, thymus, and lymph nodes. Among the immune system organs, the spleen can be a particularly well-suited target for neuromodulation. In addition to acting as a blood filter and blood reserve, the spleen plays an important role in the immune system by synthesizing antibodies in its white pulp and removing antibody-coated bacteria and blood cells by way of blood and lymph node circulation. Further, the spleen contains in its blood reserves half of the body's monocytes, which turn into dendritic cells upon migrating to injured tissue.

Splenic nerve activity can have a variety of effects on other organs and on the central sympathetic system. For example, the splenorenal reflex can include increased sympathetic efferent communication to renal nerves in response to increased afferent communication from splenic nerves. The increased efferent communication to renal nerves can decrease renal blood flow and trigger the renin-angiotensin-aldosterone system, ultimately causing an increase in blood pressure. Splenic afferent activity also can affect cardiopulmonary sympathetic nerve activity. The mechanism of the sympathetic responses to splenic nerve activity can originate, for example, in the spine or the brain. Increases in splenic afferent activity can occur, for example, when mechanoreceptors of the spleen sense increases in postcapillary venous pressure. Splenic efferent activity also can have systemic significance. For example, the spleen can regulate blood volume, e.g., by releasing blood to counteract hypovolemia and/or causing fluid to move from blood into lymph to counteract hypervolemia. In addition to its role in treating autoimmune conditions and other immune system conditions, splenic neuromodulation may have anticoagulant effects. Therefore, splenic neuromodulation may also be used in situations where anticoagulant or antiplatelet effects are desired.

A Selected Examples of Neuromodulation Modalities

Various techniques can be used to partially or completely incapacitate neural pathways, such as those innervating the immune system organs. Immune system neuromodulation in accordance with embodiments of the present technology, for example, can be electrically-induced, thermally-induced, chemically-induced, or induced in another suitable manner or combination of manners at one or more suitable treatment locations during a treatment procedure. For example, the purposeful application of radio frequency (RF) energy (monopolar and/or bipolar), pulsed RF energy, microwave energy, optical energy, ultrasound energy (e.g., intravascularly delivered ultrasound, extracorporeal ultrasound, high-intensity focused ultrasound (HIFU)), magnetic energy, direct heat, cryotherapeutic energy, chemicals (e.g., drugs or other agents), or combinations thereof to tissue at a treatment location can induce one or more desired effects at the treatment location, e.g., broadly across the treatment location or at localized regions of the treatment location.

FIG. 1A is an anatomical view illustrating the abdominal organs, including the spleen 20, splenic artery 28, and splenic branch arteries 21. Referring to FIG. 1A, treatment procedures in accordance with embodiments of the present technology can include applying a treatment modality at one or more treatment locations proximate a structure having a relatively high concentration of immune system nerves. In some embodiments, for example, the treatment locations can be proximate portions of the splenic artery 28, an ostium of the splenic artery 28, a splenic branch artery 21, an ostium of a splenic branch artery 21, the splenic vein, an ostium of the splenic vein, or a branch of the splenic vein, another portion of a vessel or duct of an immune system organ, and/or another suitable structure.

Figure 1B:
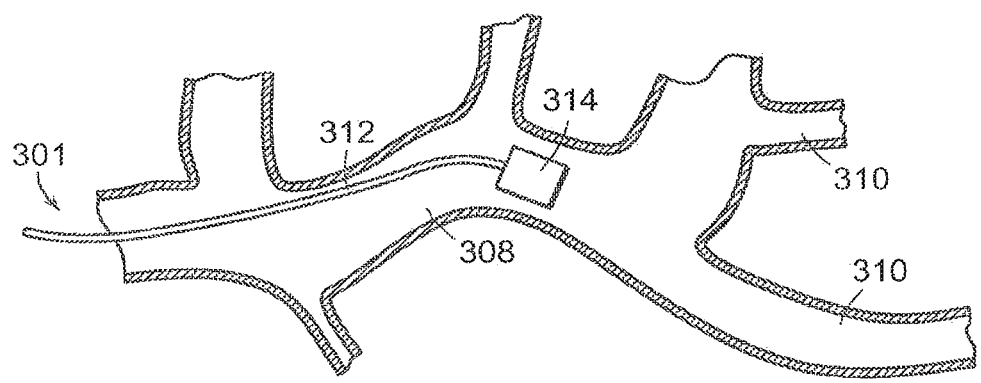
FIG. 1B is a partially cross-sectional view illustrating neuromodulation at a treatment location within a splenic artery in accordance with an embodiment of the present technology.
Figure 1C:
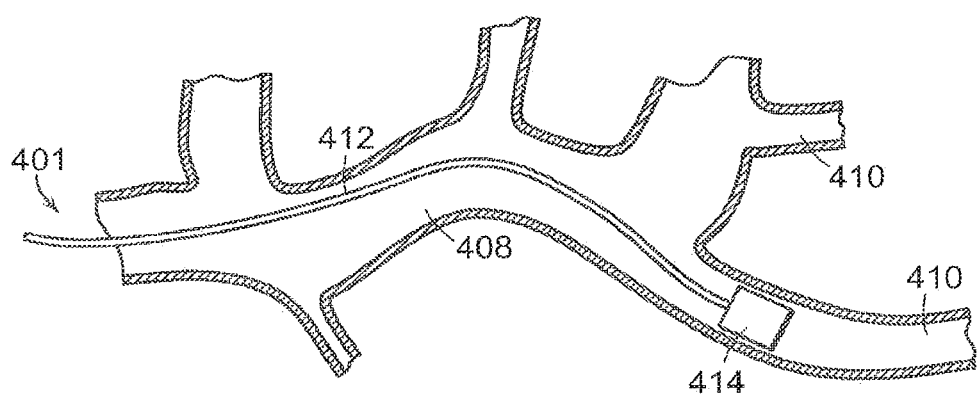
FIG. 1C is a partially cross-sectional view illustrating neuromodulation at a treatment location within a splenic branch artery in accordance with an embodiment of the present technology.

FIGS. 1B and 1C, for example, are cross-sectional views illustrating, respectively, neuromodulation at treatment locations within the splenic artery and a splenic branch artery. As shown in FIG. 1B, a treatment device 31 including a shaft 32 and a therapeutic element 34 can be extended toward the splenic artery 38 to locate the therapeutic element 34 at a treatment location within the splenic artery 38. Similarly, as shown in FIG. 1C, a treatment device 41 can be extended toward a splenic branch artery 40 to locate the therapeutic element 44 at a treatment location within the splenic branch artery 40. The therapeutic element 34 or 44 can be configured for neuromodulation at the treatment locations via a suitable treatment modality, e.g., cryotherapeutic, direct heat, electrode-based, transducer-based, chemical-based, or another suitable treatment modality.

The treatment location can be proximate (e.g., at or near) a vessel or duct wall (e.g., a wall of the splenic artery, the splenic vein, a splenic branch artery, another portion of a vessel or duct of an immune system organ, and/or another suitable structure), and the treated tissue can include tissue proximate the treatment location. For example, with regard to the splenic artery 38, a treatment procedure can include modulating nerves in the splenic plexus, which lay at least partially within or adjacent to the adventitia of the splenic artery. In some embodiments it may be desirable to modulate immune system nerves from a treatment location within a vessel and in close proximity to an immune system organ, e.g., closer to the immune system organ than to a trunk of the vessel. This can increase the likelihood of modulating nerves specific to the immune system organ, while decreasing the likelihood of modulating nerves that extend to other organs. Vessels can decrease in diameter and become more tortuous as they extend toward an immune system organ. Accordingly, modulating immune system nerves from a treatment location in close proximity to an immune system organ can include using a device (e.g., a treatment device 31 or 41) having size, flexibility, torque-ability, kink resistance, and/or other characteristics suitable for accessing narrow and/or tortuous portions of vessels.

In some embodiments, the purposeful application of energy (e.g., electrical energy, thermal energy, etc.) to tissue can induce one or more desired thermal heating and/or cooling effects on localized regions of the splenic artery, for example, and adjacent regions along all or a portion of the splenic plexus, which lay at least partially within or adjacent to the adventitia of the splenic artery. Some embodiments of the present technology, for example, include cryotherapeutic immune system neuromodulation (alone or in combination with another treatment modality), which can include cooling tissue at a treatment location in a manner that modulates neural function. For example, sufficiently cooling at least a portion of a sympathetic nerve can slow or potentially block conduction of neural signals to produce a prolonged or permanent reduction in sympathetic activity. The mechanisms of cryotherapeutic tissue damage include, for example, direct cell injury (e.g., necrosis), vascular or luminal injury (e.g., starving the cells of nutrients by damaging supplying blood vessels), and sublethal hypothermia with subsequent apoptosis. Exposure to cryotherapeutic cooling can cause acute cell death (e.g., immediately after exposure) and/or delayed cell death (e.g., during tissue thawing and subsequent hyperperfusion). Several embodiments of the present technology include cooling a structure at or near an inner surface of a vessel or duct wall such that proximate (e.g., adjacent) tissue is effectively cooled to a depth where sympathetic nerves reside. For example, a cooling structure can be cooled to the extent that it causes therapeutically effective cryogenic neuromodulation. Sufficiently cooling at least a portion of a sympathetic immune system nerve may slow or potentially block conduction of neural signals to produce a prolonged or permanent reduction in immune system sympathetic activity. In some embodiments, a cryotherapeutic treatment modality can include cooling that is not configured to cause neuromodulation. For example, the cooling can be at or above cryogenic temperatures and can be used to control neuromodulation via another treatment modality, e.g., to reduce damage to non-targeted tissue when targeted tissue adjacent to the non-targeted tissue is heated.

Cryotherapeutic treatment can be beneficial in certain embodiments. For example, rapidly cooling tissue can provide an analgesic effect such that cryotherapeutic treatment can be less painful than other treatment modalities. Neuromodulation using cryotherapeutic treatment can therefore require less analgesic medication to maintain patient comfort during a treatment procedure compared to neuromodulation using other treatment modalities. Additionally, reducing pain can reduce patient movement and thereby increase operator success and/or reduce procedural complications. Cryogenic cooling also typically does not cause significant collagen tightening, and therefore is not typically associated with vessel or duct stenosis. In some embodiments, cryotherapeutic treatment can include cooling at temperatures that can cause therapeutic elements to adhere to moist tissue. This can be beneficial because it can promote stable, consistent, and continued contact during treatment. The typical conditions of treatment can make this an attractive feature because, for example, patients can move during treatment, catheters associated with therapeutic elements can move, and/or respiration can cause the spleen and other immune system organs to rise and fall and thereby move their associated vessels and ducts. In addition, blood flow is pulsatile and can cause structures to pulse. Cryogenic adhesion also can facilitate intravascular and intraluminal positioning, particularly in relatively small structures (e.g., relatively short arteries) in which stable positioning can be difficult to achieve.

As an alternative to or in conjunction with cryotherapeutic cooling, other suitable energy delivery techniques, such as electrode-based or transducer-based approaches, can be used for therapeutically-effective immune system neuromodulation. Electrode-based or transducer-based treatment, for example, can include delivering electrical energy and/or another form of energy to tissue and/or heating tissue at a treatment location in a manner that modulates neural function. For example, sufficiently stimulating and/or heating at least a portion of a sympathetic immune system nerve can slow or potentially block conduction of neural signals to produce a prolonged or permanent reduction in sympathetic activity. As noted previously, suitable energy modalities include, for example, RF energy (monopolar and/or bipolar), pulsed RF energy, microwave energy, ultrasound energy (e.g., intravascularly delivered ultrasound, extracorporeal ultrasound, HIFU), laser energy, optical energy, magnetic energy, direct heat, or other suitable energy modalities alone or in combination. Where a system uses a monopolar configuration, a return electrode or ground patch fixed externally on the subject can be used. Moreover, electrodes (or other energy delivery elements) can be used alone or with other electrodes in a multi-electrode array. Examples of suitable multi-electrode devices are described in U.S. patent application Ser. No. 13/281,360, filed Oct. 25, 2011, and incorporated herein by reference in its entirety. Other suitable devices and technologies, such as cryotherapeutic devices, are described in U.S. patent application Ser. No. 13/279,330, filed Oct. 23, 2011, and additional thermal devices are described in U.S. patent application Ser. No. 13/279,205, filed Oct. 21, 2011, each of which are incorporated herein by reference in their entireties.

Thermal effects can include both thermal ablation and non-ablative thermal alteration or damage (e.g., via sustained heating and/or resistive heating) to partially or completely disrupt the ability of a nerve to transmit a signal. Desired thermal heating effects may include, for example, raising the temperature of target neural fibers to a target temperature to achieve non-ablative thermal alteration, or to or above a higher target temperature to achieve ablative thermal alteration. For example, a target temperature for non-ablative thermal alteration may be greater than body temperature (e.g., about 37° C.) but less than about 45° C., while a target temperature for ablative thermal alteration may be greater than about 45° C. Exposure to thermal energy between about body temperature and about 45° C. may induce non-ablative thermal alteration via moderate heating of target neural fibers or of vascular or luminal structures that perfuse the target neural fibers. In cases where vascular or luminal structures are affected, the target neural fibers may be denied perfusion, resulting in necrosis of the neural tissue. For example, this may induce non-ablative thermal alteration in the fibers or structures. Exposure to thermal energy greater than about 45° C. (e.g., greater than about 60° C.) may induce thermal ablation via substantial heating of target neural fibers or of vascular or luminal structures that perfuse the target fibers. In some patients, it may be desirable to achieve temperatures that thermally ablate the target neural fibers or the vascular or luminal structures, but that are less than about 90° C., e.g., less than about 85° C., less than about 80° C., or less than about 75° C. Other embodiments can include heating tissue to a variety of other suitable temperatures.

In some embodiments, immune system neuromodulation can include a chemical-based treatment modality alone or in combination with another treatment modality. Neuromodulation using chemical-based treatment can include delivering one or more chemicals (e.g., drugs or other agents) to tissue at a treatment location in a manner that modulates neural function. The chemical, for example, can be selected to affect the treatment location generally or to selectively affect some structures at the treatment location over other structures. For example, the chemical(s) can be guanethidine, ethanol, phenol, vincristine, a neurotoxin, or another suitable agent selected to alter, damage, or disrupt nerves. In some embodiments, energy (e.g., light, ultrasound, or another suitable type of energy) can be used to activate the chemical(s) and/or to cause the chemical(s) to become more bioavailable. A variety of suitable techniques can be used to deliver chemicals to tissue at a treatment location. For example, chemicals can be delivered via one or more devices, such as needles originating outside the body or within the vasculature or delivery pumps (see, e.g., U.S. Pat. No. 6,978,174, the disclosure of which is hereby incorporated by reference in its entirety). In an intravascular example, a catheter can be used to intravascularly position a therapeutic element including a plurality of needles (e.g., micro-needles) that can be retracted or otherwise blocked prior to deployment. In other embodiments, a chemical can be introduced into tissue at a treatment location via simple diffusion through a vessel or duct wall, electrophoresis, or another suitable mechanism. Similar techniques can be used to introduce chemicals that are not configured to cause neuromodulation, but rather to facilitate neuromodulation via another treatment modality. Examples of such chemicals include, but are not limited to, anesthetic agents and contrast agents.

In some embodiments, a treatment procedure can include applying a suitable treatment modality at a treatment location in a testing step followed by a treatment step. The testing step, for example, can include applying the treatment modality at a lower intensity and/or for a shorter duration than during the treatment step. This can allow an operator to determine (e.g., by neural activity sensors and/or patient feedback) whether nerves proximate to the treatment location are suitable for modulation. Performing a testing step can be particularly useful for treatment procedures in which targeted nerves are closely associated with nerves that could cause undesirable side effects if modulated during a subsequent treatment step.

IV. Methods for Treatment of Immune System Conditions

Sympathetic neural activity in immune system organs can cause or exacerbate immune system conditions, e.g., autoimmune conditions such as multiple sclerosis, lupus, psoriasis, and other immune system conditions. As noted previously, disclosed herein are several embodiments of methods directed to treatment of autoimmune conditions and other immune system conditions, as well as conditions associated with sympathetic activity (e.g., overactivity or hyperactivity) in the immune system organs and/or conditions associated with central sympathetic activity (e.g., overactivity or hyperactivity), using immune system neuromodulation. The methods disclosed herein may provide various advantages over a number of conventional approaches and techniques in that they allow for the potential targeting of elevated sympathetic drive, which may either be a cause of autoimmune conditions and other immune system conditions or a key mediator of the multiple manifestations of these conditions. Also, the disclosed methods provide for localized treatment and limited duration treatment regimens, thereby reducing patient long-term compliance issues.

In certain embodiments, the methods provided herein comprise performing immune system neuromodulation, thereby decreasing sympathetic immune system nerve activity. Immune system neuromodulation may be repeated one or more times at various intervals until a desired sympathetic nerve activity level or another therapeutic benchmark (e.g., target antibody titer, target white blood cell (WBC) count, etc.) is reached. In one embodiment, for example, a decrease in sympathetic nerve activity may be observed via a marker of sympathetic nerve activity such as plasma norepinephrine (noradrenaline) in autoimmune patients. Other measures or markers of sympathetic nerve activity can include muscle sympathetic nerve activity (MSNA), norepinephrine spillover, and/or heart rate variability.

In certain embodiments of the methods provided herein, immune system neuromodulation is expected to result in a decrease in sympathetic nerve activity over a specific timeframe. For example, in certain of these embodiments, sympathetic nerve activity levels are decreased over an extended timeframe, e.g., within about 1 month, 2 months, 3 months, 6 months, 9 months or 12 months post-neuromodulation.

In several embodiments, the methods disclosed herein may comprise an additional step of measuring sympathetic nerve activity levels, and in certain of these embodiments, the methods can further comprise comparing the activity level to a baseline activity level. Such comparisons can be used to monitor therapeutic efficacy and to determine when and if to repeat the neuromodulation procedure. In certain embodiments, a baseline nerve activity level is derived from the subject undergoing treatment. For example, baseline nerve activity level may be measured in the subject at one or more timepoints prior to treatment. A baseline nerve activity value may represent sympathetic nerve activity at a specific timepoint before neuromodulation, or it may represent an average activity level at two or more timepoints prior to neuromodulation. In certain embodiments, the baseline value is based on nerve activity immediately prior to treatment (e.g., after the subject has already been catheterized). Alternatively, a baseline value may be derived from a standard value for nerve activity observed across the population as a whole or across a particular subpopulation. In certain embodiments, post-neuromodulation nerve activity levels are measured in extended timeframes post-neuromodulation, e.g., 3 months, 6 months or 12 months post-neuromodulation.

In certain embodiments of the methods provided herein, the methods are designed to decrease sympathetic nerve activity to a target level. In these embodiments, the methods include a step of measuring nerve activity levels post-neuromodulation (e.g., 6 months post-treatment, 12 months post-treatment, etc.) and comparing the resultant activity level to a baseline activity level as discussed above. In certain of these embodiments, the treatment is repeated until the target nerve activity level is reached. In other embodiments, the methods are simply designed to decrease nerve activity below a baseline level without requiring a particular target activity level.

Immune system neuromodulation may be performed on a patient diagnosed with an immune system condition such as an autoimmune condition to reduce or prevent an increase in one or more measurable physiological parameters corresponding to the condition. In some embodiments, for example, immune system neuromodulation may prevent an increase in, maintain, or reduce the occurrence or severity of fatigue, fever, joint pain, stiffness, or swelling, skin lesions, blood markers of inflammation (e.g., ESR, hsCRP, IL-1, IL-6), new demyelinated lesions in the central nervous system (CNS), shortness of breath, chest pain, headaches, confusion, clumsiness, tingling, or weakness in patients diagnosed with an autoimmune condition. A reduction in a physiological parameter associated with an immune system condition may be determined by qualitative or quantitative analysis before and after (e.g., 1, 3, 6, or 12 months after) an immune system neuromodulation procedure.

As discussed previously, the progression of autoimmune conditions and other immune system conditions may be related to sympathetic overactivity and, correspondingly, the degree of sympathoexcitation in a patient may be related to the severity of the clinical presentation of the autoimmune condition and other immune system conditions. The nerves of the immune system may be positioned to be both a cause (via afferent nerve fibers) and a target (via efferent sympathetic nerves) of elevated central sympathetic drive. In some embodiments, immune system neuromodulation can be used to reduce central sympathetic drive in a patient diagnosed with an immune condition in a manner that treats the patient for the immune condition. In some embodiments, for example, MSNA can be reduced by at least about 10% in the patient within about three months after at least partially inhibiting sympathetic neural activity in nerves proximate an artery innervating an immune system organ. Similarly, in some instances immune system norepinephrine spillover to plasma can be reduced at least about 20% in the patient within about three months after at least partially inhibiting sympathetic neural activity in nerves proximate an artery innervating an immune system organ. Additionally, measured immune system norepinephrine content (e.g., assessed in real-time via intravascular blood collection techniques) can be reduced (e.g., by at least about 5%, 10%, or by at least 20%) in the patient within about three months after at least partially inhibiting sympathetic neural activity in nerves proximate an artery innervating an immune system organ.

In one prophetic example, a patient diagnosed with an autoimmune condition can be subjected to a baseline assessment indicating a first set of measurable parameters corresponding to the autoimmune condition. Such parameters can include, for example, antibody titers, WBC counts, blood markers of inflammation (e.g., ESR, hsCRP, IL-1, IL-6), imaging of the CNS for areas of demyelination, fatigue, fever, joint pain, stiffness, or swelling, skin lesions, shortness of breath, chest pain, headaches, confusion, clumsiness, tingling, or weakness. Following baseline assessment, the patient is subjected to an immune system neuromodulation procedure. Such a procedure can, for example, include any of the treatment modalities described herein or another treatment modality in accordance with the present technology. The treatment can be performed on nerves proximate the splenic artery, the splenic vein, and/or another portion of a vessel or duct of an immune system organ. Following the treatment (e.g., 1, 3, 6, or 12 months after treatment), the patient can be subjected to a follow-up assessment. The follow-up assessment can indicate a measurable improvement in one or more physiological parameters corresponding to the autoimmune condition. Additionally, one could measure the dose of immunosuppressant and immune modulating drugs required for maintenance therapy both before and after an immune system neuromodulation procedure, with a reduction in medications being deemed as a marker of successful therapy.

The methods described herein address the sympathetic excess that is thought to be an underlying cause of autoimmune conditions and other immune system conditions or a central mechanism through which these immune system conditions manifest their multiple deleterious effects on patients. In contrast, known therapies currently prescribed for autoimmune conditions and other immune system conditions typically address only specific manifestations of these conditions. Additionally, these known therapies can have significant limitations including limited efficacy, and frequently require the patient to remain compliant with the treatment regimen over time. In contrast, immune system neuromodulation can be a one-time treatment that would be expected to have durable benefits to inhibit the long-term disease progression and thereby achieve a favorable patient outcome. Unlike pharmacologic treatments that affect the entire body, it could also be a more targeted therapy, preferentially affecting the immune system organs.

In some embodiments, patients diagnosed with an immune system condition can be treated with immune system neuromodulation alone. However, in other embodiments patients diagnosed with autoimmune conditions and other immune system conditions can be treated with combinations of therapies for treating both primary causative modes of these conditions as well as sequelae of these conditions. For example, combinations of therapies can be tailored based on specific manifestations of the disease in a particular patient.

Treatment of an immune system condition may refer to preventing the condition, slowing the onset or rate of development of the condition, reducing the risk of developing the condition, preventing or delaying the development of symptoms associated with the condition, reducing or ending symptoms associated with the condition, generating a complete or partial regression of the condition, or some combination thereof.

V. Selected Examples of Immune System Neuromodulation Systems and Devices

Figure 2:
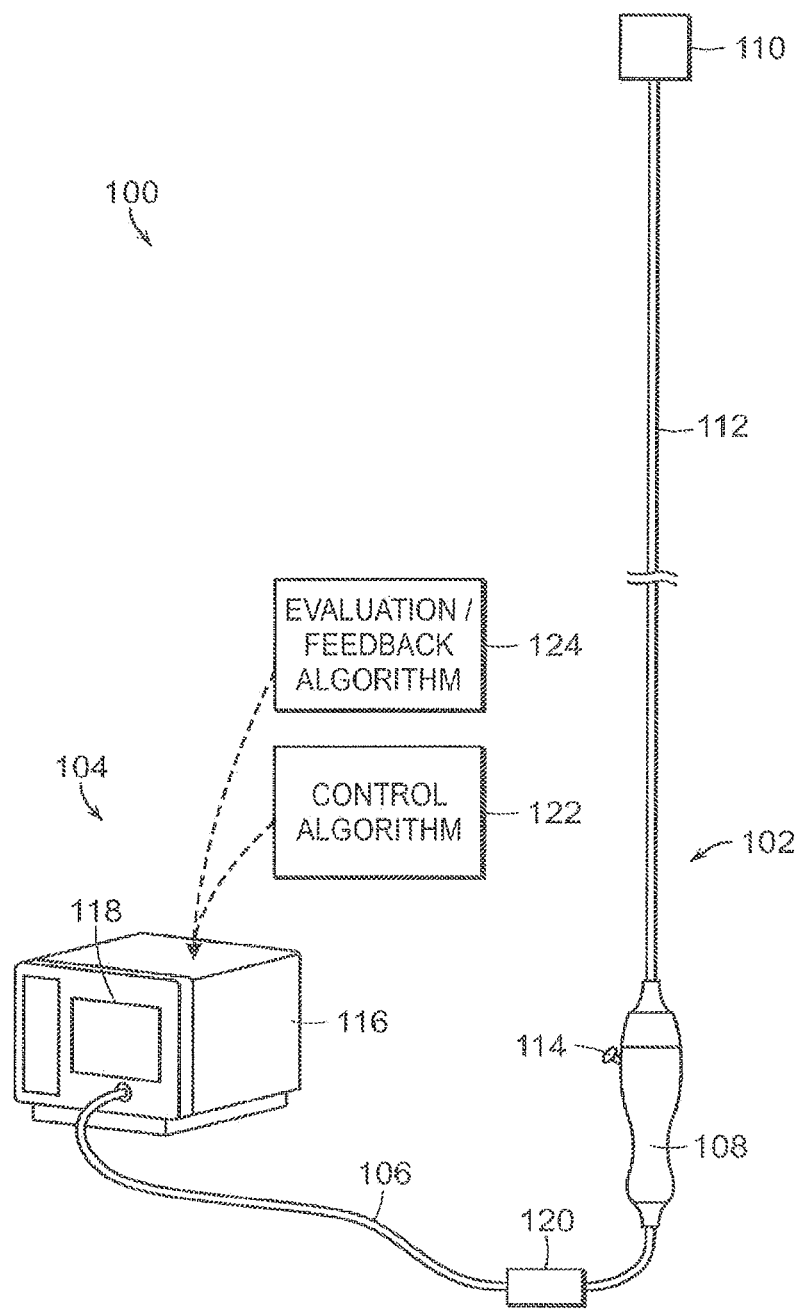
FIG. 2 is a partially schematic view illustrating a neuromodulation system configured in accordance with an embodiment of the present technology.

FIG. 2 is a partially schematic diagram illustrating an immune system neuromodulation system 100 ("system 100") configured in accordance with an embodiment of the present technology. The system 100 can include a treatment device 102, an energy source or console 104 (e.g., an RF energy generator, a cryotherapy console, etc.), and a cable 106 extending between the treatment device 102 and the console 104. The treatment device 102 can include a handle 108, a neuromodulation assembly 110, and an elongated shaft 112 extending between the handle 108 and the neuromodulation assembly 110. The shaft 112 can be configured to locate the neuromodulation assembly 110 intravascularly or intraluminally at a treatment location (e.g., in or near the splenic artery, the splenic vein, another portion of a vessel or duct of an immune system organ, and/or another suitable structure), and the neuromodulation assembly 110 can be configured to provide or support therapeutically-effective neuromodulation at the treatment location. In some embodiments, the shaft 112 and the neuromodulation assembly 110 can be 3, 4, 5, 6, or 7 French or another suitable size. Furthermore, the shaft 112 and the neuromodulation assembly 110 can be partially or fully radiopaque and/or can include radiopaque markers corresponding to measurements, e.g., every 5 cm.

Intravascular delivery can include percutaneously inserting a guide wire (not shown) within the vasculature and moving the shaft 112 and the neuromodulation assembly 110 along the guide wire until the neuromodulation assembly 110 reaches the treatment location. For example, the shaft 112 and the neuromodulation assembly 110 can include a guide-wire lumen (not shown) configured to receive the guide wire in an over-the-wire (OTW) or rapid-exchange configuration (RX). Other body lumens (e.g., ducts or internal chambers) can be treated, for example, by non-percutaneously passing the shaft 112 and neuromodulation assembly 110 through externally accessible passages of the body or other suitable methods. In some embodiments, a distal end of the neuromodulation assembly 110 can terminate in an atraumatic rounded tip or cap (not shown). The treatment device 102 can also be a steerable or non-steerable catheter device configured for use without a guide wire.

The neuromodulation assembly 110 can have a single state or configuration, or it can be convertible between a plurality of states or configurations. For example, the neuromodulation assembly 110 can be configured to be delivered to the treatment location in a delivery state and to provide or support therapeutically-effective neuromodulation in a deployed state. In these and other embodiments, the neuromodulation assembly 110 can have different sizes and/or shapes in the delivery and deployed states. For example, the neuromodulation assembly 110 can have a low-profile configuration in the delivery state and an expanded configuration in the deployed state. In another example, the neuromodulation assembly 110 can be configured to deflect into contact with a vessel wall in a delivery state. The neuromodulation assembly 110 can be converted (e.g., placed or transformed) between the delivery and deployed states via remote actuation, e.g., using an actuator 114 of the handle 108. The actuator 114 can include a knob, a pin, a lever, a button, a dial, or another suitable control component. In other embodiments, the neuromodulation assembly 110 can be transformed between the delivery and deployed states using other suitable mechanisms or techniques.

In some embodiments, the neuromodulation assembly 110 can include an elongated member (not shown) that can be configured to curve (e.g., arch) in the deployed state, e.g., in response to movement of the actuator 114. For example, the elongated member can be at least partially helical in the deployed state. In other embodiments, the neuromodulation assembly 110 can include a balloon (not shown) that can be configured to be at least partially inflated in the deployed state. An elongated member, for example, can be well suited for carrying one or more heating elements, electrodes, or transducers and for delivering direct heat, electrode-based, or transducer-based treatment. A balloon, for example, can be well suited for containing refrigerant (e.g., during or shortly after liquid-to-gas phase change) and for delivering cryotherapeutic treatment. In some embodiments, the neuromodulation assembly 110 can be configured for intravascular, transvascular, intraluminal, and/or transluminal delivery of chemicals. For example, the neuromodulation assembly 110 can include one or more openings (not shown), and chemicals (e.g., drugs or other agents) can be deliverable through the openings. For transvascular and transluminal delivery, the neuromodulation assembly 110 can include one or more needles (not shown) (e.g., retractable needles) and the openings can be at end portions of the needles.

The console 104 is configured to control, monitor, supply, or otherwise support operation of the treatment device 102. In other embodiments, the treatment device 102 can be self-contained and/or otherwise configured for operation without connection to the console 104. As shown in FIG. 1, the console 104 can include a primary housing 116 having a display 118. The system 100 can include a control device 120 along the cable 106 configured to initiate, terminate, and/or adjust operation of the treatment device 102 directly and/or via the console 104. In other embodiments, the system 100 can include another suitable control mechanism. For example, the control device 120 can be incorporated into the handle 108. The console 104 can be configured to execute an automated control algorithm 122 and/or to receive control instructions from an operator. Furthermore, the console 104 can be configured to provide feedback to an operator before, during, and/or after a treatment procedure via the display 118 and/or an evaluation/feedback algorithm 124. In some embodiments, the console 104 can include a processing device (not shown) having processing circuitry, e.g., a microprocessor. The processing device can be configured to execute stored instructions relating to the control algorithm 122 and/or the evaluation/feedback algorithm 124. Furthermore, the console 104 can be configured to communicate with the treatment device 102, e.g., via the cable 106. For example, the neuromodulation assembly 110 of the treatment device 102 can include a sensor (not shown) (e.g., a recording electrode, a temperature sensor, a pressure sensor, or a flow rate sensor) and a sensor lead (not shown) (e.g., an electrical lead or a pressure lead) configured to carry a signal from the sensor to the handle 108. The cable 106 can be configured to carry the signal from the handle 108 to the console 104.

The console 104 can have different configurations depending on the treatment modality of the treatment device 102. For example, when the treatment device 102 is configured for electrode-based or transducer-based treatment, the console 104 can include an energy generator (not shown) configured to generate RF energy, pulsed RF energy, microwave energy, optical energy, ultrasound energy (e.g., intravascularly delivered ultrasound, extracorporeal ultrasound, HIFU), magnetic energy, direct heat energy, or another suitable type of energy. In some embodiments, the console 104 can include an RF generator operably coupled to one or more electrodes (not shown) of the neuromodulation assembly 110. When the treatment device 102 is configured for cryotherapeutic treatment, the console 104 can include a refrigerant reservoir (not shown) and can be configured to supply the treatment device 102 with refrigerant, e.g., pressurized refrigerant in liquid or substantially liquid phase. Similarly, when the treatment device 102 is configured for chemical-based treatment, the console 104 can include a chemical reservoir (not shown) and can be configured to supply the treatment device 102 with one or more chemicals. In some embodiments, the treatment device 102 can include an adapter (not shown) (e.g., a luer lock) configured to be operably coupled to a syringe (not shown). The adapter can be fluidly connected to a lumen (not shown) of the treatment device 102, and the syringe can be used, for example, to manually deliver one or more chemicals to the treatment location, to withdraw material from the treatment location, to inflate a balloon (not shown) of the neuromodulation assembly 110, to deflate a balloon of the neuromodulation assembly 110, or for another suitable purpose. In other embodiments, the console 104 can have other suitable configurations.

In certain embodiments, a neuromodulation device for use in the methods disclosed herein may combine two or more energy modalities. For example, the device may include both a hyperthermic source of ablative energy and a hypothermic source, making it capable of, for example, performing both RF neuromodulation and cryo-neuromodulation. The distal end of the treatment device may be straight (for example, a focal catheter), expandable (for example, an expanding mesh or cryoballoon), or have any other configuration. For example, the distal end of the treatment device can be at least partially helical/spiral in the deployed state. Additionally or alternatively, the treatment device may be configured to carry out one or more non-ablative neuromodulatory techniques. For example, the device may comprise a means for diffusing a drug or pharmaceutical compound at the target treatment area (e.g., a distal spray nozzle).

VI. Selected Examples of Treatment Procedures for Immune System Neuromodulation

Referring back to FIGS. 1B and 2B, in some embodiments the shaft 32 or 42 and the therapeutic element 34 or 44 can be portions of a treatment device at least partially corresponding to the treatment device 102 shown in FIG. 2. The therapeutic element 34 or 44, for example, can be configured to radially expand into a deployed state at the treatment location. In the deployed state, the therapeutic element 34 or 44 can be configured to contact an inner wall of a vessel and to form a suitable lesion or pattern of lesions without the need for repositioning. For example, the therapeutic element 34 or 44 can be configured to form a single lesion or a series of lesions, e.g., overlapping or nonoverlapping. In some embodiments, the lesion or pattern of lesions can extend around generally the entire circumference of the vessel, but can still be non-circumferential at longitudinal segments or zones along a lengthwise portion of the vessel. This can facilitate precise and efficient treatment with a low possibility of vessel stenosis. In other embodiments, the therapeutic element 34 or 44 can be configured cause a partially-circumferential lesion or a fully-circumferential lesion at a single longitudinal segment or zone of the vessel. During treatment, the therapeutic element 34 or 44 can be configured for partial or full occlusion of a vessel. Partial occlusion can be useful, for example, to reduce ischemia, while full occlusion can be useful, for example, to reduce interference (e.g., warming or cooling) caused by blood flow through the treatment location. In some embodiments, the therapeutic element 34 or 44 can be configured to form therapeutically-effective neuromodulation (e.g., using ultrasound energy) without contacting a vessel wall.

A variety of other suitable treatment locations are also possible in and around the splenic artery 38 and 48, splenic branch arteries 30 and 40, splenic vein, other portions of vessels or ducts of immune system organs, and/or other suitable structures. For example, in some cases, it can be more convenient to treat the splenic artery 38 or 48 at its trunk, where it meets the celiac artery. It may also be possible to achieve the desired denervation by targeting the celiac artery, but in such a case one would need to demonstrate that modulating the nerves did not cause significant adverse consequences in other structures receiving innervation from nerves proximate to the celiac trunk.

Furthermore, a treatment procedure can include treatment at any suitable number of treatment locations, e.g., a single treatment location, two treatment locations, or more than two treatment locations. In some embodiments, different treatment locations can correspond to different portions of the splenic artery 38 or 48, the splenic branch arteries 30 or 40, the splenic vein, other portions of vessels and ducts of immune system organs, and/or other suitable structures proximate tissue having relatively high concentrations of immune system nerves. The shaft 32 or 42 can be steerable (e.g., via one or more pull wires, a steerable guide or sheath catheter, etc.) and can be configured to move the therapeutic element 34 or 44 between treatment locations. At each treatment location, the therapeutic element 34 or 44 can be activated to cause modulation of nerves proximate the treatment location. Activating the therapeutic element 34 or 44 can include, for example, heating, cooling, stimulating, or applying another suitable treatment modality at the treatment location. Activating the therapeutic element 34 or 44 can further include applying various energy modalities at varying power levels or intensities or for various durations for achieving modulation of nerves proximate the treatment location. In some embodiments, power levels, intensities, and/or treatment duration can be determined and employed using various algorithms for ensuring modulation of nerves at select distances (e.g., depths) away from the treatment location. Furthermore, as noted previously, in some embodiments, the therapeutic element 34 or 44 can be configured to introduce (e.g., inject) a chemical (e.g., a drug or another agent) into target tissue at the treatment location. Such chemicals or agents can be applied at various concentrations depending on treatment location and the relative depth of the target nerves.

The splenic artery branches off the celiac artery, which in turn branches from the abdominal aorta, so the least invasive access route for the therapeutic element 34 or 44 to be positioned at a treatment location within the splenic artery would typically be through femoral, brachial, or radial access to the abdominal aorta. However, other suitable catheterization paths may be used. Catheterization can be guided, for example, using imaging, e.g., magnetic resonance, computed tomography, fluoroscopy, ultrasound, intravascular ultrasound, optical coherence tomography, or another suitable imaging modality. The therapeutic element 34 or 44 can be configured to accommodate the anatomy of the splenic artery 38 or 48, splenic branch artery 30 or 40, the splenic vein, another portion of a vessel or duct of an immune system organ, and/or another suitable structure. For example, the therapeutic element 34 or 44 can include a balloon (not shown) configured to inflate to a size generally corresponding to the internal size of the splenic artery 38 or 48, splenic branch artery 30 or 40, splenic vein, another portion of a vessel or duct of an immune system organ, and/or another suitable structure. In some embodiments, the therapeutic element 34 or 44 can be an implantable device and a treatment procedure can include locating the therapeutic element 34 or 44 at the treatment location using the shaft 32 or 42, fixing the therapeutic element 34 or 44 at the treatment location, separating the therapeutic element 34 or 44 from the shaft 32 or 42, and withdrawing the shaft 32 or 42. Other treatment procedures for modulation of immune system nerves in accordance with embodiments of the present technology are also possible.

As mentioned previously, the methods disclosed herein may use a variety of suitable energy modalities, including RF energy, pulsed RF energy, microwave energy, laser energy, optical energy, ultrasound energy (e.g., intravascularly delivered ultrasound, extracorporeal ultrasound, HIFU), magnetic energy, direct heat, cryotherapy, or a combination thereof. Alternatively or in addition to these techniques, the methods may utilize one or more non-ablative neuromodulatory techniques. For example, the methods may utilize non-ablative SNS denervation by removal of target nerves, injection of target nerves with a destructive drug or pharmaceutical compound, or treatment of the target nerves with non-ablative energy modalities. In certain embodiments, the amount of reduction of the sympathetic nerve activity may vary depending on the specific technique being used.

In one example, the treatment device 102 set forth in FIG. 2 can be an RF energy emitting device and RF energy can be delivered through energy delivery elements or electrodes to one or more locations along the inner wall of a first immune system blood vessel (e.g., a splenic artery or vein) for predetermined periods of time (e.g., 120 seconds). An objective of a treatment may be, for example, to heat tissue to a desired depth (e.g., at least about 3 mm) to a temperature (e.g., about 65° C.) that would modulate one or more nerve fibers associated with or adjacent to one or more lesions formed in the vessel wall. A clinical objective of the procedure typically is to neuromodulate a sufficient number of immune system nerves (efferent and/or afferent nerves) to cause a reduction in sympathetic tone or drive to one or more immune system organs without, for example, disrupting immune system function and while minimizing vessel trauma. If the objective of a treatment is met (e.g., tissue is heated to about 65° C. to a depth of about 3 mm) the probability of modulating immune system nerve tissue (e.g., altering nerve function) is high. In some embodiments, a single neuromodulation treatment procedure can provide for sufficient modulation of target sympathetic nerves (e.g., modulation of a sufficient number of nerve fibers) to provide a desired clinical outcome. In other embodiments, more than one treatment may be beneficial for modulating a desired number or volume of target nerve fibers, and thereby achieving clinical success. In other embodiments, an objective may include reducing or eliminating immune system nerve function completely.

In a specific example of using RF energy for immune system nerve modulation, a clinician can commence treatment, which causes the control algorithm 122 (FIG. 2) to initiate instructions to the generator (not shown) to gradually adjust its power output to a first power level (e.g., 5 watts) over a first time period (e.g., 15 seconds). The power increase during the first time period is generally linear. As a result, the generator increases its power output at a generally constant rate of power/time, i.e., in a linear manner. Alternatively, the power increase may be non-linear (e.g., exponential or parabolic) with a variable rate of increase. Once the first power level and the first time are achieved, the algorithm may hold at the first power level until a second predetermined period of time has elapsed (e.g., 3 seconds). At the conclusion of the second period of time, power is again increased by a predetermined increment (e.g., 1 watt) to a second power level over a third predetermined period of time (e.g., 1 second). This power ramp in predetermined increments of about 1 watt over predetermined periods of time may continue until a maximum power $p_{MAX}$ is achieved or some other condition is satisfied. In one embodiment, $p_{MAX}$ is 8 watts. In another embodiment $p_{MAX}$ is 10 watts, or in a further embodiment, $p_{MAX}$ is 6.5 watts. In some embodiments, $p_{MAX}$ can be about 6 watts to about 10 watts. Optionally, the power may be maintained at the maximum power $p_{MAX}$ for a desired period of time or up to the desired total treatment time (e.g., up to about 120 seconds), or until a specified temperature is reached or maintained for a specified time period.

In another specific example, the treatment device 102 in FIG. 2 can be a cryogenic device and cryogenic cooling can be applied for one or more cycles (e.g., for 30 second increments, 60 second increments, 90 second increments, etc.) in one or more locations along the circumference and/or length of the first immune system blood vessel. The cooling cycles can be, for example, fixed periods or can be fully or partially dependent on detected temperatures (e.g., temperatures detected by a thermocouple (not shown) of the neuromodulation assembly 110). In some embodiments, a first stage can include cooling tissue until a first target temperature is reached. A second stage can include maintaining cooling for a set period, such as 15-180 seconds (e.g., 90 seconds). A third stage can include terminating or decreasing cooling to allow the tissue to warm to a second target temperature higher than the first target temperature. A fourth stage can include continuing to allow the tissue to warm for a set period, such as 10-120 seconds (e.g., 60 seconds). A fifth stage can include cooling the tissue until the first target temperature (or a different target temperature) is reached. A sixth stage can include maintaining cooling for a set period, such as 15-180 seconds (e.g., 90 seconds). A seventh stage can, for example, include allowing the tissue to warm completely (e.g., to reach a body temperature).

The neuromodulation assembly 110 can then be located at a second target site in or near a second immune system blood vessel (e.g., a splenic artery or vein), and correct positioning of the assembly 110 can be determined. In selected embodiments, a contrast material can be delivered distally beyond the neuromodulation assembly 110 and fluoroscopy and/or other suitable imaging techniques can be used to locate the second immune system vessel. The method continues by applying targeted heat or cold to effectuate immune system neuromodulation at the second target site to cause partial or full denervation of the immune system organ associated with the second target site.

After providing the therapeutically-effective neuromodulation energy (e.g., cryogenic cooling, RF energy, ultrasound energy, etc.), the method may also include determining whether the neuromodulation therapeutically treated an immune system condition, a condition associated with sympathetic activity in an immune system organ, or a condition associated with central sympathetic activity or otherwise sufficiently modulated nerves or other neural structures proximate the first and second target sites. For example, the process of determining whether the neuromodulation therapeutically treated the nerves can include determining whether nerves were sufficiently modulated or otherwise disrupted to reduce, suppress, inhibit, block or otherwise affect the afferent and/or efferent immune system signals (e.g., by evaluation of suitable biomarkers, stimulation and recording of nerve signals, etc.). In a further embodiment, patient assessment could be performed at time intervals (e.g., 1 month, 3 months, 6 months, 12 months) following neuromodulation treatment. For example, the patient can be assessed for measurements of perceived fatigue, fever, joint pain, stiffness, or swelling, skin lesions, shortness of breath, chest pain, headaches, confusion, clumsiness, tingling, or weakness, or for one or more physiological parameters selected from, for example, MSNA, norepinephrine spillover to plasma, whole body norepinephrine spillover, heart rate variability, antibody titer, or WBC count.

In other embodiments, various steps in the method can be modified, omitted, and/or additional steps may be added. In further embodiments, the method can have a delay between applying therapeutically-effective neuromodulation energy at a first target site at or near a first immune system blood vessel and applying therapeutically-effective neuromodulation energy at a second target site at or near a second immune system blood vessel. For example, neuromodulation of the first immune system blood vessel can take place at a first treatment session, and neuromodulation of the second immune system blood vessel can take place at a second treatment session at a later time.

As discussed previously, treatment procedures for modulation of immune system nerves in accordance with embodiments of the present technology are expected to improve at least one condition associated with an immune system condition and/or with sympathetic activity in an immune system organ or a condition associated with central sympathetic activity. For example, with respect to an autoimmune condition, modulation of immune system nerves in accordance with embodiments of the present technology is expected to reduce, maintain, or prevent an increase in fatigue, fever, joint pain, stiffness, or swelling, skin lesions, shortness of breath, chest pain, headaches, confusion, clumsiness, tingling, or weakness. With respect to central sympathetic activity (e.g., overactivity or hyperactivity), for example, modulation of immune system nerves is expected to reduce MSNA and/or whole body norepinephrine spillover in patients. These and other clinical effects are expected to be detectable immediately after a treatment procedure or after a delay, e.g., of 1, 2, or 3 months. In some embodiments, it may be useful to repeat immune system neuromodulation at the same treatment location or a different treatment location after a suitable delay, e.g., 1, 2, or 3 years. In still other embodiments, however, other suitable treatment regimens or techniques may be used.

VII. Pertinent Anatomy and Physiology

The following discussion provides further details regarding pertinent patient anatomy and physiology. This section is intended to supplement and expand upon the previous discussion regarding the relevant anatomy and physiology, and to provide additional context regarding the disclosed technology and the therapeutic benefits associated with immune system neuromodulation.

A. The Sympathetic Nervous System

The SNS is a branch of the autonomic nervous system along with the enteric nervous system and parasympathetic nervous system. It is always active at a basal level (called sympathetic tone) and becomes more active during times of stress. Like other parts of the nervous system, the SNS operates through a series of interconnected neurons. Sympathetic neurons are frequently considered part of the peripheral nervous system (PNS), although many lie within the CNS. Sympathetic neurons of the spinal cord (which is part of the CNS) communicate with peripheral sympathetic neurons via a series of sympathetic ganglia. Within the ganglia, spinal cord sympathetic neurons join peripheral sympathetic neurons through synapses. Spinal cord sympathetic neurons are therefore called presynaptic (or preganglionic) neurons, while peripheral sympathetic neurons are called postsynaptic (or postganglionic) neurons.

At synapses within the sympathetic ganglia, preganglionic sympathetic neurons release acetylcholine, a chemical messenger that binds and activates nicotinic acetylcholine receptors on postganglionic neurons. In response to this stimulus, postganglionic neurons principally release noradrenaline (norepinephrine). Prolonged activation may elicit the release of adrenaline from the adrenal medulla.

Once released, norepinephrine binds adrenergic receptors on peripheral tissues. Binding to adrenergic receptors causes a neuronal and hormonal response. The physiologic manifestations include pupil dilation, increased heart rate, occasional vomiting, and increased blood pressure. Increased sweating is also seen due to binding of cholinergic receptors of the sweat glands.

The SNS is responsible for up- and down-regulation of many homeostatic mechanisms in living organisms. Fibers from the SNS innervate tissues in almost every organ system, providing at least some regulatory function to physiological features as diverse as pupil diameter, gut motility, and urinary output. This response is also known as the sympathoadrenal response of the body, as the preganglionic sympathetic fibers that end in the adrenal medulla (but also all other sympathetic fibers) secrete acetylcholine, which activates the secretion of adrenaline (epinephrine) and to a lesser extent noradrenaline (norepinephrine). Therefore, this response that acts primarily on the cardiovascular system is mediated directly via impulses transmitted through the SNS and indirectly via catecholamines secreted from the adrenal medulla.

Science typically looks at the SNS as an automatic regulation system, that is, one that operates without the intervention of conscious thought. Some evolutionary theorists suggest that the SNS operated in early organisms to maintain survival as the SNS is responsible for priming the body for action. One example of this priming is in the moments before waking, in which sympathetic outflow spontaneously increases in preparation for action.

1. The Sympathetic Chain

Figure 3:
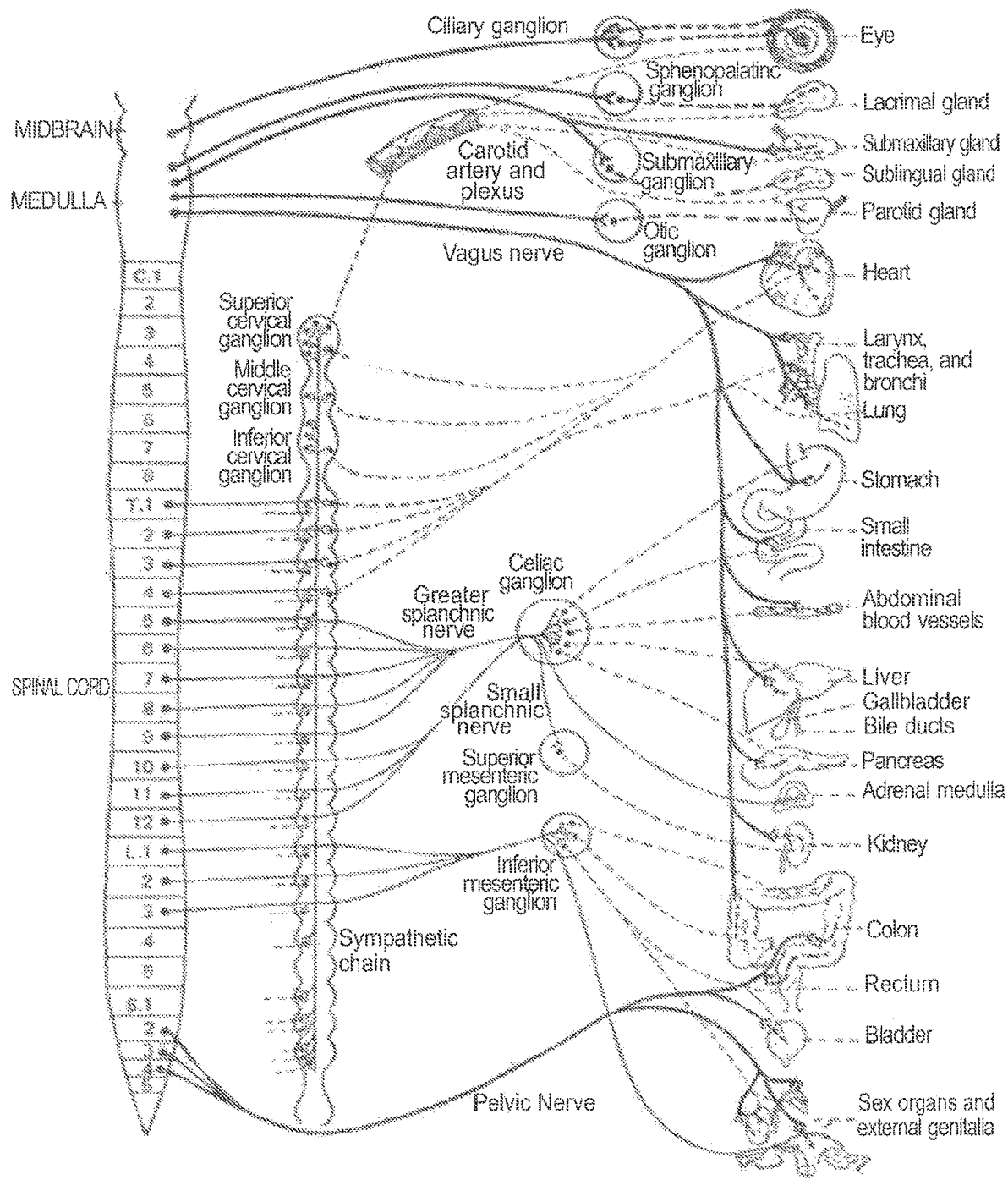
FIG. 3 is a conceptual illustration of the SNS and how the brain communicates with the body via the SNS.

As shown in FIG. 3, the SNS provides a network of nerves that allows the brain to communicate with the body. Sympathetic nerves originate inside the vertebral column, toward the middle of the spinal cord in the intermediolateral cell column (or lateral horn), beginning at the first thoracic segment of the spinal cord and are thought to extend to the second or third lumbar segments. Because its cells begin in the thoracic and lumbar regions of the spinal cord, the SNS is said to have a thoracolumbar outflow. Axons of these nerves leave the spinal cord through the anterior rootlet/root. They pass near the spinal (sensory) ganglion, where they enter the anterior rami of the spinal nerves. However, unlike somatic innervation, they quickly separate out through white rami connectors that connect to either the paravertebral (which lie near the vertebral column) or prevertebral (which lie near the aortic bifurcation) ganglia extending alongside the spinal column.

In order to reach the target organs and glands, the axons travel long distances in the body. Many axons relay their message to a second cell through synaptic transmission. The first cell (the presynaptic cell) sends a neurotransmitter across the synaptic cleft (the space between the axon terminal of the first cell and the dendrite of the second cell) where it activates the second cell (the postsynaptic cell). The message is then propagated to the final destination.

In the SNS and other neuronal networks of the peripheral nervous system, these synapses are located at sites called ganglia, discussed above. The cell that sends its fiber to a ganglion is called a preganglionic cell, while the cell whose fiber leaves the ganglion is called a postganglionic cell. As mentioned previously, the preganglionic cells of the SNS are located between the first thoracic (T1) segment and third lumbar (L3) segments of the spinal cord. Postganglionic cells have their cell bodies in the ganglia and send their axons to target organs or glands. The ganglia include not just the sympathetic trunks but also the cervical ganglia (superior, middle and inferior), which sends sympathetic nerve fibers to the head and thorax organs, and the celiac and mesenteric ganglia (which send sympathetic fibers to the gut).

Further Examples

1. A method of treating a human patient diagnosed with an immune system condition, the method comprising:
    intravascularly positioning a neuromodulation assembly within an immune system blood vessel of the patient and adjacent to a target immune system nerve of the patient; and
    reducing sympathetic neural activity in the patient by delivering energy to the immune system nerve via the neuromodulation assembly to modulate a function of the immune system nerve,
    wherein reducing sympathetic neural activity improves a measurable physiological parameter corresponding to the immune system condition of the patient.

2. The method of example 1 wherein the immune system condition is an autoimmune condition.

3. The method of example 2 wherein the autoimmune condition is selected from the group consisting of multiple sclerosis, lupus, and psoriasis.

4. The method of any one of examples 1-3 wherein reducing sympathetic neural activity in the patient in a manner that improves a measurable physiological
parameter corresponding to the immune system condition comprises reducing muscle sympathetic nerve activity in the patient.

5. The method of any one of examples 1-3 wherein reducing sympathetic neural activity in the patient in a manner that improves a measurable physiological parameter corresponding to the immune system condition comprises reducing whole body norepinephrine spillover in the patient.

6. The method of any one of examples 1-5 wherein intravascularly positioning a neuromodulation assembly within an immune system blood vessel comprises positioning the neuromodulation assembly in at least one of the splenic artery, splenic branch artery, or splenic vein.

7. The method of any one of examples 1-6 wherein reducing sympathetic neural activity in the patient by delivering energy to the immune system nerve comprises at least partially inhibiting afferent neural activity.

8. The method of any one of examples 1-6 wherein reducing sympathetic neural activity in the patient by delivering energy to the immune system nerve comprises at least partially inhibiting efferent neural activity.

9. The method of any one of examples 1-8 wherein reducing sympathetic neural activity in the patient by delivering energy to the immune system nerve comprises partially ablating the target immune system nerve.

10. The method of any one of examples 1-9 wherein reducing sympathetic neural activity in the patient by delivering energy to the immune system nerve via the neuromodulation assembly comprises delivering an energy field to the target immune system nerve via the neuromodulation assembly.

11. The method of example 10 wherein delivering an energy field to the target immune system nerve comprises delivering radio frequency (RF) energy via the neuromodulation assembly.

12. The method of example 10 wherein delivering an energy field to the target immune system nerve comprises delivering ultrasound energy via the neuromodulation assembly.

13. The method of example 12 wherein delivering ultrasound energy comprises delivering high intensity focused ultrasound energy via the neuromodulation assembly.

14. The method of example 10 wherein delivering an energy field to the target immune system nerve comprises delivering laser energy via the neuromodulation assembly.

15. The method of example 10 wherein delivering an energy field to the target immune system nerve comprises delivering microwave energy via the neuromodulation assembly.

16. The method of any one of examples 1-15, further comprising removing the neuromodulation assembly from the patient after delivering energy to the immune system nerve via the neuromodulation assembly to modulate a function of the immune system nerve.

17. A method, comprising:
percutaneously introducing a neuromodulation assembly at a distal portion of a treatment device proximate to neural fibers innervating an immune system organ of a human subject diagnosed with an immune system condition;
partially disrupting function of the neural fibers via the neuromodulation assembly; and removing the neuromodulation assembly from the subject after treatment, wherein partial disruption of the function of the neural fibers therapeutically treats one or more symptoms associated with the immune system condition of the subject.

18. The method of example 17 wherein partially disrupting function of the neural fibers via the neuromodulation assembly comprises delivering a chemical agent to tissue at a treatment location proximate the neural fibers in a manner that modulates sympathetic neural activity of the neural fibers.

19. The method of example 17 wherein partially disrupting function of the neural fibers via the neuromodulation assembly comprises thermally modulating the neural fibers via at least one wall-contact electrode.

20. The method of example 17 wherein partially disrupting function of the neural fibers via the neuromodulation assembly comprises thermally modulating the neural fibers via a multi-electrode array positioned within an immune system blood vessel of the patient.

22. The method of example 17 wherein partially disrupting function of the neural fibers via the neuromodulation assembly comprises cryotherapeutically cooling the neural fibers via the neuromodulation assembly.

22. A device for carrying out the method of any of examples 1-21.

CONCLUSION

The above detailed descriptions of embodiments of the present technology are for purposes of illustration only and are not intended to be exhaustive or to limit the present technology to the precise form(s) disclosed above. Various equivalent modifications are possible within the scope of the present technology, as those skilled in the relevant art will recognize. For example, while steps may be presented in a given order, alternative embodiments may perform steps in a different order. The various embodiments described herein and elements thereof may also be combined to provide further embodiments. In some cases, well-known structures and functions have not been shown or described in detail to avoid unnecessarily obscuring the description of embodiments of the present technology.

Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout the disclosure to mean including at least the recited feature(s) such that any greater number of the same feature(s) and/or additional types of other features are not precluded. It will also be appreciated that various modifications may be made to the described embodiments without deviating from the present technology. Further, while advantages associated with certain embodiments of the present technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

What is claimed is:

1. A method of treating a condition associated with inflammation, the method comprising:
intravascularly positioning a neuromodulation catheter at a treatment location within a celiac artery or a branch of the celiac artery of the patient;
delivering, via the neuromodulation catheter, ablative therapy to neural fibers proximate the celiac artery or the branch of the celiac artery of the patient to render the neural fibers inert, inactive, or reduced in function to reduce inflammation to modify a level or activity of one or more markers of inflammation including interleukins, high-sensitivity C-reactive proteins, erythrocyte sedimentation rate (ESR) or heat shock proteins; and comparing the level or activity after delivery of the ablative therapy to a baseline activity level that is measured prior to delivery of the ablative therapy, wherein the baseline activity level represents an average activity level at two or more timepoints prior to delivery of the ablative therapy.

2. The method of claim 1, wherein delivering the ablative therapy comprises delivering the ablative therapy at the treatment location until the level or activity of the one or more markers of inflammation reaches a benchmark that is based on the comparison.

3. The method of claim 1, wherein the ablative therapy modulates an immune response to treat an autoimmune condition associated with the inflammation.

4. The method of claim 1, wherein the ablative therapy reduces or prevents an increase in the level or activity of the one or more markers of inflammation.

5. The method of claim 1, wherein delivering the ablative therapy comprises delivering electrical energy, ultrasound energy, thermal energy, or a chemical to the neural fibers.

6. The method of claim 1, wherein the ablative therapy results in a reduction in occurrence of a severity of fatigue, fever, joint pain, stiffness, swelling, skin lesions, new demyelinated lesions, shortness of breath, chest pain, headaches, confusion, clumsiness, tingling or weakness.

7. The method of claim 1, further comprising:

determining whether to deliver additional ablative therapy to the neural fibers proximate the celiac artery or the branch of the celiac artery of the patient to render the neural fibers inert, inactive, or reduced in function based on the comparing of the level or activity after delivery of the ablative therapy to the baseline activity level.

8. A method of treating a condition associated with inflammation, the method comprising:

intravascularly positioning a neuromodulation catheter including an energy delivery element at a treatment location within a celiac artery or a branch of the celiac artery of the patient;

delivering, via the energy delivery element positioned at the treatment location, ablative energy to neural fibers proximate the celiac artery or the branch of the celiac artery of the patient to render the neural fibers inert, inactive, or reduced in function to reduce inflammation, wherein the delivery of the ablative energy improves a level or activity of one or more markers of inflammation; and comparing the level or activity after delivery of the ablative energy to a baseline activity level that is measured prior to delivery of the ablative energy to determine a comparison, wherein the baseline activity level represents an average activity level at two or more timepoints prior to delivery of the ablative energy, wherein delivering the ablative energy is repeated at the treatment location until the level or activity of one or more markers of inflammation reaches a benchmark that is based on the comparison.

9. The method of claim 8, wherein the ablative energy modulates an immune response to treat an autoimmune condition associated with the inflammation.

10. The method of claim 8, wherein the ablative energy reduces or prevents an increase in the level or activity of the one or more markers of inflammation.

11. The method of claim 8, wherein delivering the ablative energy to the neural fibers includes delivering radio frequency (RF) energy via the energy delivery element.

12. The method of claim 8, wherein delivering the ablative energy to the neural fibers includes delivering ultrasound energy via the energy delivery element.

13. A system comprising:

a neuromodulation catheter configured to be positioned at a treatment location within a celiac artery or a branch of the celiac artery of the patient;

a treatment device configured to deliver, via the neuromodulation catheter, ablative therapy to neural fibers proximate the celiac artery or the branch of the celiac artery of the patient to render the neural fibers inert, inactive, or reduced in function to reduce inflammation to improve a level or activity of one or more markers of inflammation including interleukins, high-sensitivity C-reactive proteins, erythrocyte sedimentation rate (ESR) or heat shock proteins; and processing circuitry configured to compare the level or activity after delivery of the ablative therapy to a baseline activity level that is measured prior to delivery of the ablative therapy, wherein the baseline activity level represents an average activity level at two or more timepoints prior to delivery of the ablative therapy.

14. The system of claim 13, wherein the treatment device comprises an energy generator configured to deliver energy to the neural fibers via the neuromodulation catheter, the ablative therapy comprising the energy.

15. The system of claim 14, wherein the energy comprises radiofrequency energy, microwave energy, optical energy, ultrasound energy, magnetic energy, or direct heat energy.

16. The system of claim 13, wherein the treatment device comprises a cryotherapy console configured to delivery cryotherapy to the neural fibers via the neuromodulation catheter, the ablative therapy comprising the cryotherapy.

17. The system of claim 13, wherein the treatment device comprises a chemical reservoir, the ablative therapy comprising a chemical-based treatment.

18. The system of claim 13, wherein the ablative therapy modulates an immune response to treat an autoimmune condition associated with the inflammation.

19. The system of claim 13, wherein the processing circuitry is configured to compare the level or activity after delivery of the ablative therapy to the baseline activity level to determine a comparison, and wherein the processing circuitry is configured to determine whether to deliver additional ablative therapy to the neural fibers proximate the celiac artery or the branch of the celiac artery of the patient to render the neural fibers inert, inactive, or reduced in function based on the comparison.

* * * * *